US007280106B2

(12) United States Patent
Hong et al.

(10) Patent No.: US 7,280,106 B2
(45) Date of Patent: Oct. 9, 2007

(54) APPARATUS AND METHOD FOR GENERATING TEXTURE MAPS FOR USE IN 3D COMPUTER GRAPHICS

(75) Inventors: Qi He Hong, Bracknell (GB); Adam Michael Baumberg, Bracknell (GB); Alexander Ralph Lyons, Bracknell (GB)

(73) Assignee: Canon Europa N.V., Amstelveen (NL)

( * ) Notice: Subject to any disclaimer, the term of this patent is extended or adjusted under 35 U.S.C. 154(b) by 553 days.

(21) Appl. No.: 10/685,606

(22) Filed: Oct. 16, 2003

(65) Prior Publication Data

US 2005/0190179 A1    Sep. 1, 2005

(30) Foreign Application Priority Data

Oct. 21, 2002   (GB)   ................. 0224449.9

(51) Int. Cl.
    *G06T 17/00*    (2006.01)
(52) U.S. Cl. .................. 345/420; 345/419; 345/582
(58) Field of Classification Search .............. None
    See application file for complete search history.

(56) References Cited

U.S. PATENT DOCUMENTS

| 5,825,369 A | 10/1998 | Rossignac et al. ........... 345/440 |
| 6,064,394 A | 5/2000 | Morrison ................. 345/430 |
| 6,362,819 B1* | 3/2002 | Dalal et al. ................. 345/423 |
| 2002/0061130 A1 | 5/2002 | Kirk et al. ................. 382/154 |
| 2002/0085748 A1 | 7/2002 | Baumberg ................. 382/154 |
| 2002/0095276 A1 | 7/2002 | Rong et al. ................. 703/2 |
| 2002/0186216 A1 | 12/2002 | Baumberg et al. ........... 345/422 |
| 2002/0190982 A1 | 12/2002 | Kotcheff et al. ............ 345/420 |

(Continued)

FOREIGN PATENT DOCUMENTS

EP    0 898 245 A1    2/1999

(Continued)

OTHER PUBLICATIONS

Cignoni, P. and Montani, C. and Rocchini, C. and Scopigno, R. and Tarini, M.- "Preserving attribute values on simplified meshes by resampling detail textures", The Visual Computer Journal, vol. 15, No. 10, pp. 519-539, Pub 1999 by Springer.*

(Continued)

*Primary Examiner*—Ulka Chauhan
*Assistant Examiner*—Daniel F Hajnik
(74) *Attorney, Agent, or Firm*—Fitzpatrick, Cella, Harper & Scinto

(57) ABSTRACT

A texture map (188) for texturing a polygon mesh 3D computer model (150) during rendering is generated by defining a respective triangle within the texture map for each triangle in the polygon mesh to create a texture coordinate map (170), and allocating image data to each defined triangle. To generate the texture coordinate map, the triangles in the polygon mesh are processed to generate a plurality of lists, each list identifying adjacent triangles in the mesh having shapes which can be packed into strips (173-179) of the texture coordinate map without significant shape distortion. The triangle lists are then packed into the texture coordinate map strips. No padding is defined between triangles in the same list, only between triangles of different lists. Image data is allocated to each triangle.

40 Claims, 36 Drawing Sheets

U.S. PATENT DOCUMENTS

| | | |
|---|---|---|
| 2003/0085890 A1 | 5/2003 | Baumberg et al. ........... 345/420 |
| 2003/0085891 A1 | 5/2003 | Lyons et al. ................. 345/420 |
| 2003/0206165 A1* | 11/2003 | Hoppe et al. ............... 345/420 |

FOREIGN PATENT DOCUMENTS

| | | |
|---|---|---|
| EP | 1 160 731 A2 | 12/2001 |
| EP | 1 204 073 A2 | 5/2002 |
| GB | 2 369 260 A | 5/2002 |
| GB | 2 369 541 A | 5/2002 |
| WO | WO 00/04506 A1 | 1/2000 |
| WO | WO 01/39124 A2 | 5/2001 |

OTHER PUBLICATIONS

M. Maruya, "Transforming Object-Surface Texture Data Into A Texture Map," NEC Research and Development, Nippon Electric, Ltd., Tokyo, Japan, vol. 36, No. 2, Apr. 1, 1995, pp. 335-340, XP000522223, ISSN: 0547-051X.

P. Cignoni, et al., "A General Method For Preserving Attribute Values On Simplified Meshes," IEEE Visualization '98 Proceedings, Research Triangle Park, N.C., USA, Oct. 18-23, 1998, Piscataway, N.J., USA, pp. 59-66, 518, XP010321008, ISBN: 0-8186-9176-X.

N. Carr, et al., "The Solid Map: Methods For Generating A 2-D Texture Map For Solid Texturing," Proc. Western Computer Graphics Symposium, Mar. 2000, pp. 170-190, XP001179246.

Maruya, M.,"*Generating A Texture Map From Object-Surface Texture Data*,"EUROGRAPHICS '95, vol. 14, No. 3, pp. C387-C405 (1995).

Sorkine, O., et al., "*Warped textures For UV Mapping Encoding*,"EUROGRAPHICS 2001.

Evans, F., et al., "*Optimizing Triangle Strips For Fast Rendering*,"IEEE Visualization '96 Proceedings, pp. 319-326, Oct. 1996.

* cited by examiner

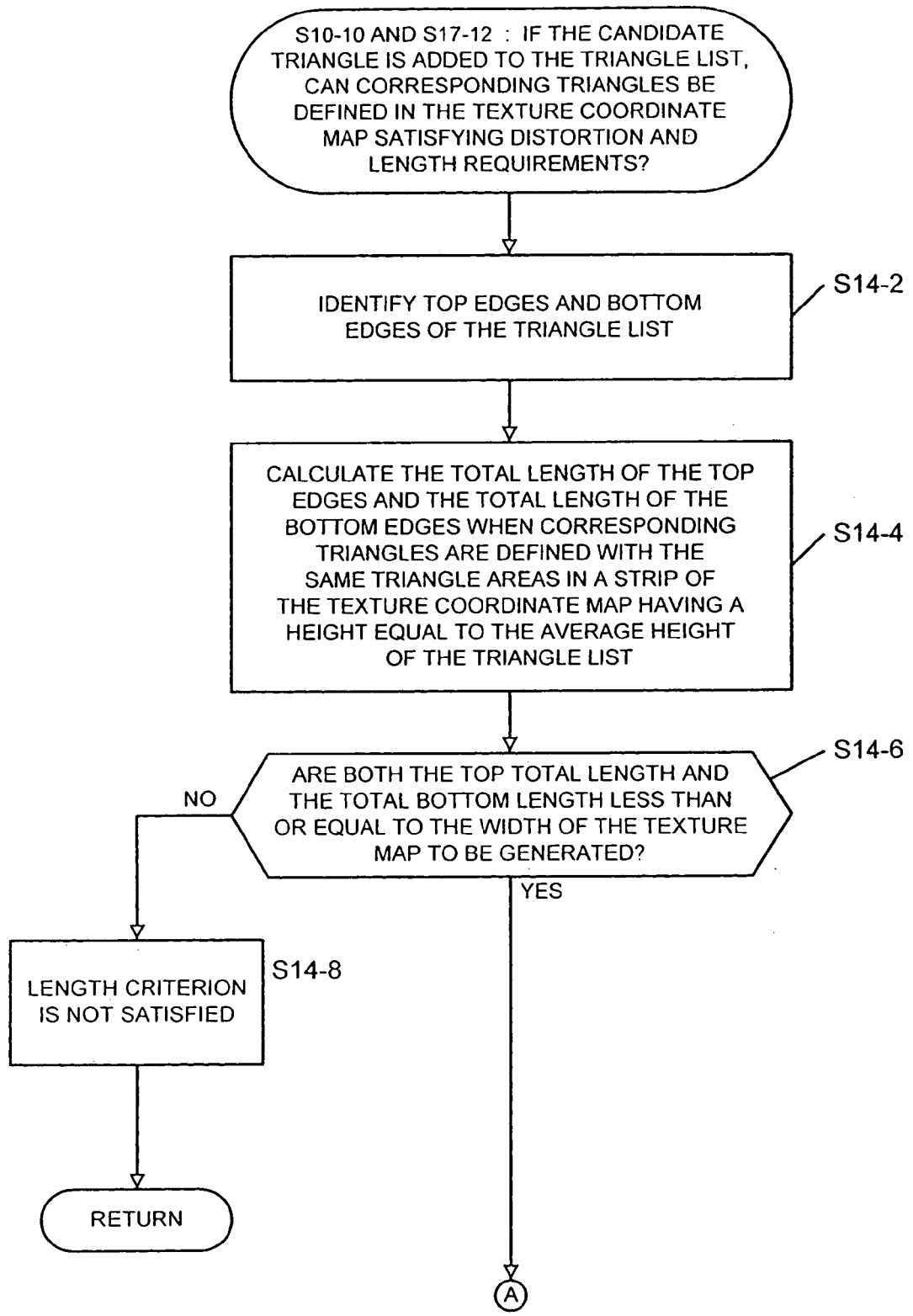

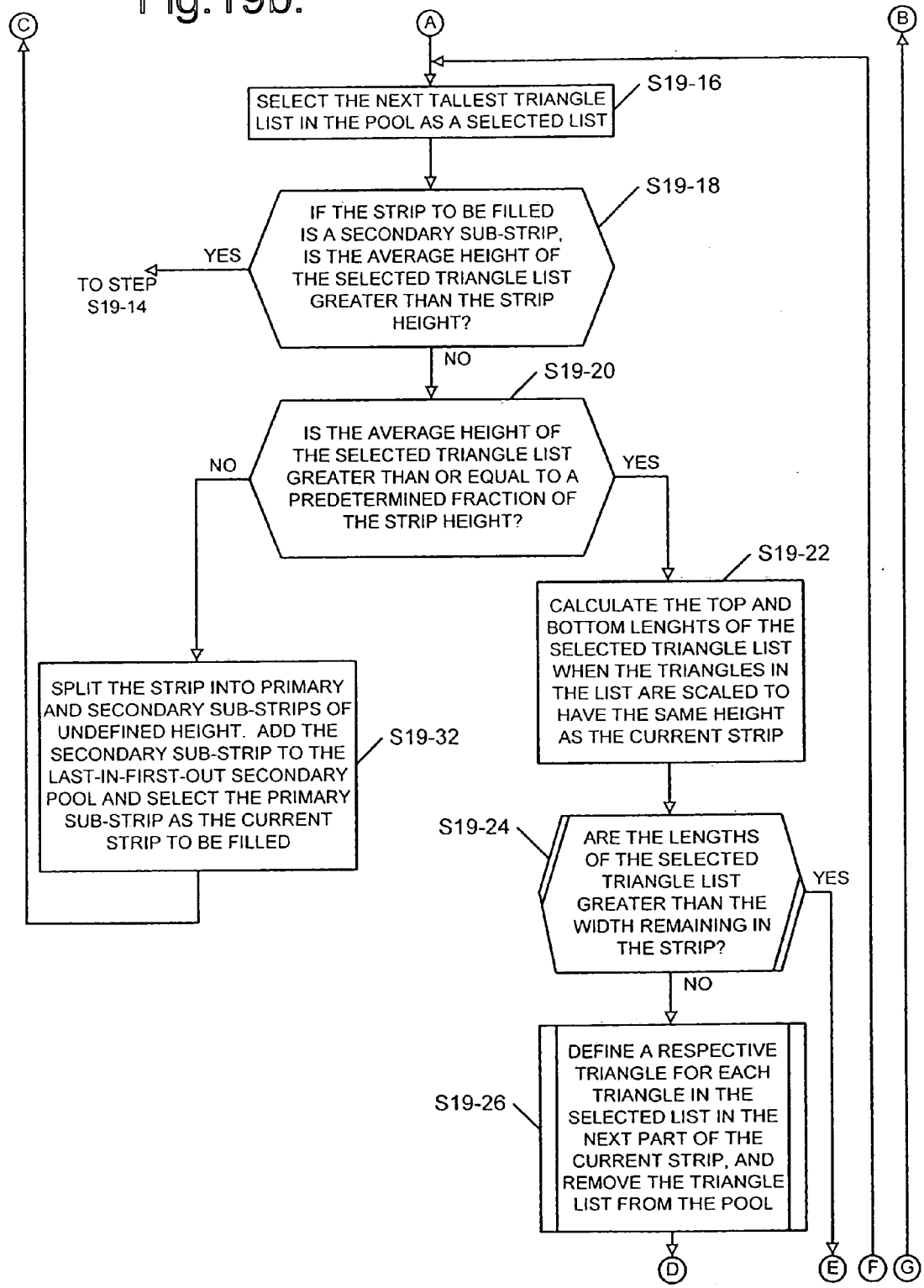

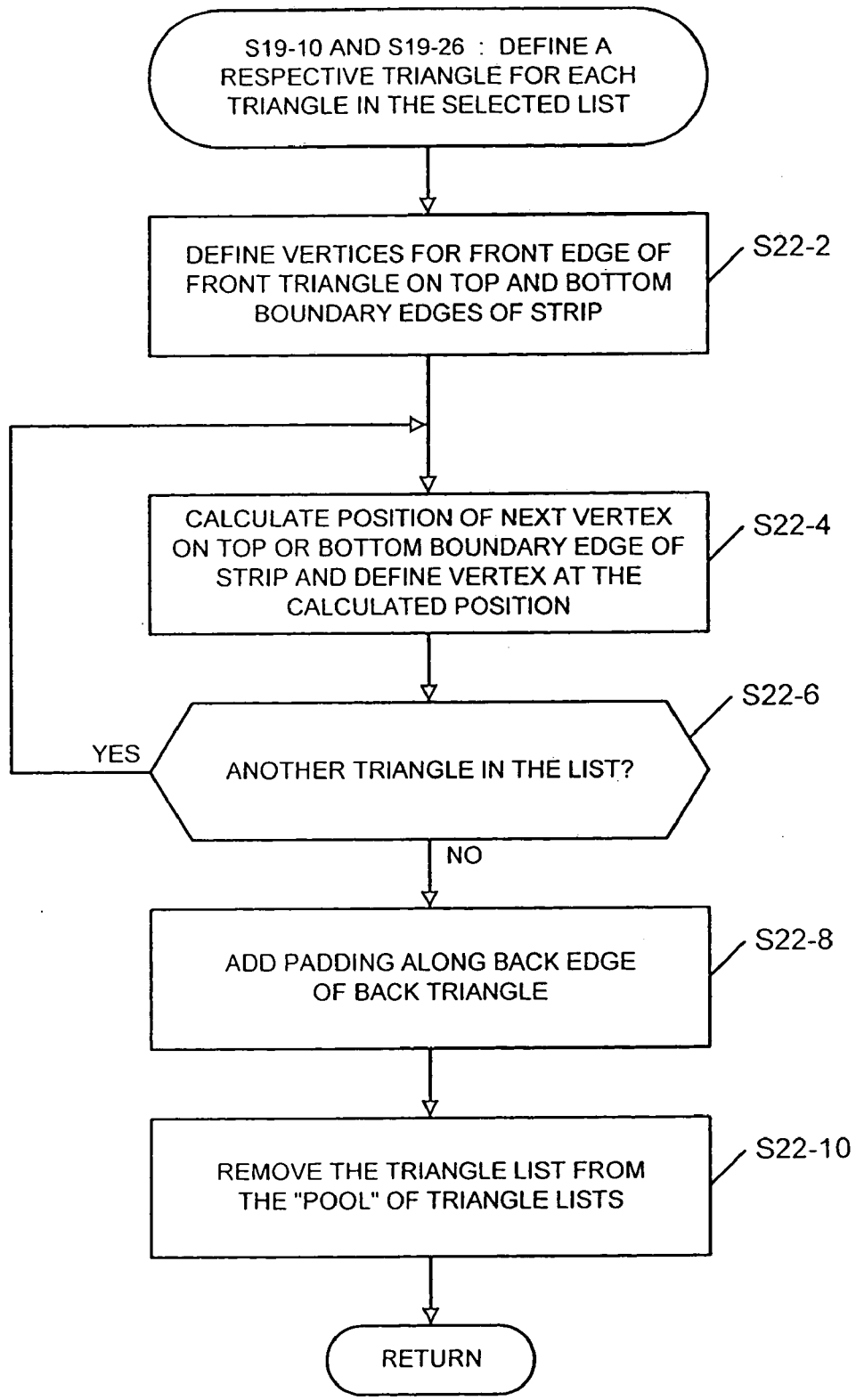

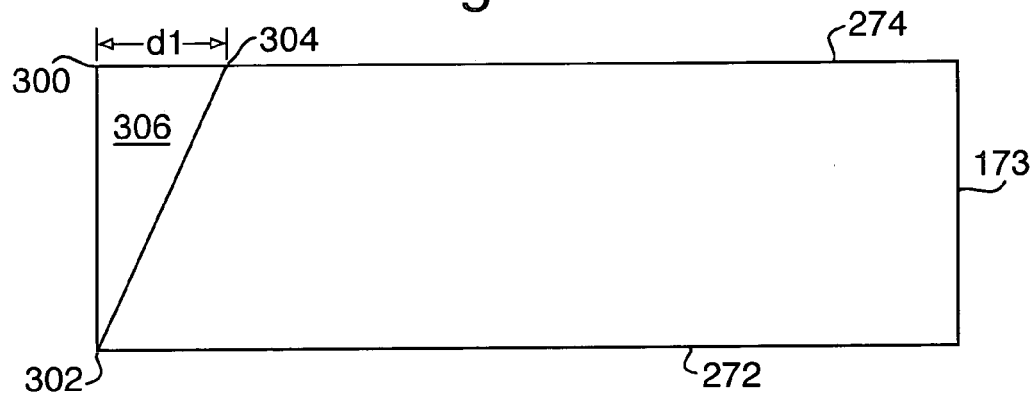
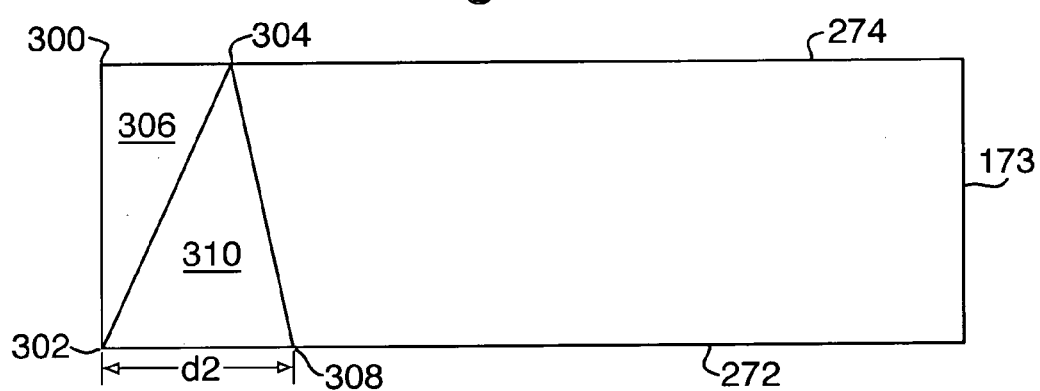
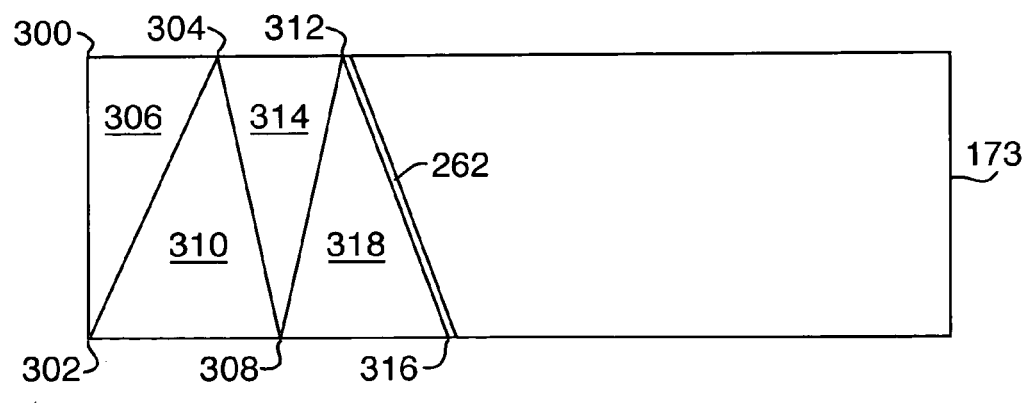

APPARATUS AND METHOD FOR GENERATING TEXTURE MAPS FOR USE IN 3D COMPUTER GRAPHICS

This application claims the right of priority under 35 USC § 119 based on British patent application number 0224449.9 filed 21 Oct. 2002, which is hereby incorporated by reference herein in its entirety as if fully set forth herein.

The present invention relates to the field of three-dimensional (3D) computer graphics, and more particularly to the generation of a texture map for use in rendering an image of a three-dimensional computer model.

The technique of texture mapping is well known in the field of 3D computer graphics. In this technique, an image (either digitised or synthesised) known as a "texture map" is stored and mapped on to one or more surfaces of a three-dimensional computer model during rendering to represent surface detail in the final image of the model. The texture map is made up of a two-dimensional matrix of individual elements known as "texels" (like the pixels of an image) and, typically, a respective red, green and blue value is stored for each texel to define the texture data in the texture map.

Coordinates defining a point in the texture map are assigned to each vertex of each polygon in the 3D computer model on to which texture data is to be mapped during rendering. In this way the assigned texture map coordinates for a polygon's vertices define a corresponding polygon in the texture map containing the texture data which is to be mapped on to the 3D model polygon during rendering.

Very often, it is necessary to texture map texture data onto every polygon in a 3D computer model (which may comprise 1,000s or 10,000s of polygons), and in many cases, the texture data for each polygon is different. Accordingly, since a respective polygon must be made available in the texture map to store the texture data for each polygon in the 3D model, and since the polygons in the texture map must be arranged to be non-overlapping, the size of the required texture map can be extremely large.

This problem is made worse because the polygons in the texture map must be separated by what is known as "padding". More particularly, when the value of an image pixel is to be calculated during rendering with a texture map, the pixel's corner points are mapped into the texture map to define a quadrilateral, and a value for the pixel is computed by summing all the texture data in all the texels which lie within the quadrilateral. However, a pixel intended to show the surface texture for part of a particular polygon in the 3D model may map to a quadrilateral in the texture map which extends outside the boundary of the polygon containing the texture data for the 3D computer model polygon. Therefore, to prevent pixels having incorrect values through the incorporation of texture data from incorrect polygons in the texture map, each polygon in the texture map is surrounded by "padding" in which texture data is defined based upon the texture data in the polygon, and which is sufficiently wide that a pixel intended to take texture data from the polygon is guaranteed to map to a quadrilateral in the texture map which does not extend outside the padding.

"Generating a Texture Map from Object-Surface Texture Data" by M Maruya in EUROGRAPHICS. '95, Volume 14, 1995, Nov. 3, pages C387 to C405 discloses a method of generating a texture map containing a respective triangle of texture data for each triangle in a 3D computer model. The method proceeds in two main steps. In a first step, it simplifies the triangle mesh of the 3D computer model. Then, in a second step, it arranges the triangles of the simplified mesh onto a plane, and generates a texture map from this arrangement. In the second step, each triangle of the 3D mesh is transformed into a right-angled triangle having one of four different sizes, namely a "standard" size, a ½ size (made by dividing the standard size triangle down the middle into two triangles of the same properties as the standard-size triangle and exactly half the area), a ¼ size, and a ⅛ size (each of the ¼ size and ⅛ size triangles similarly being the half-size of the triangle size preceding it). Each triangle is composed of two regions: an internal triangle to which a triangle from the 3D mesh is transformed and an auxiliary area of padding (one or two texels in width). After transforming each triangle into the internal triangle of one of the multi-size triangle blocks, the resulting blocks themselves are combined with one another. First, pairs of same-size blocks are combined to form next-larger size blocks. This combination process is repeated until the number of blocks in any one size other than the standard-size is no more than one. This will result in a number of standard-size blocks and the remaining ½ size and smaller blocks. Next, the remaining blocks are combined so as to fit into one standard-size block. Finally, the standard-size blocks are arranged in a plane.

This technique suffers from a number of problems, however. In particular, each triangle in the 3D computer model is transformed to a right-angled triangle having one of four different sizes. As a result, two triangles of similar size in the 3D computer model may be transformed into two right-angled triangles where one right-angled triangle is twice the size of the other, so that the texture data in the right-angled triangles is at different resolutions. This produces noticeable artefacts in an image showing the two triangles from the 3D computer model, especially if the triangles are adjacent in the 3D computer model. In addition, because each triangle in the 3D computer model is transformed to a right-angled triangle irrespective of its shape in the 3D computer model, significant distortion to the shape of the triangle may occur, with the result that distortion occurs to texture data stored in the right-angled triangle and subsequently mapped onto the triangle in the 3D computer model during rendering. A further problem with the technique disclosed in "Generating a Texture Map from Object-Surface Texture Data" is that a large proportion of the resulting texture map comprises padding because each internal triangle in a triangle block is surrounded by padding.

The present invention aims to address at least one of the problems above.

According to the present invention, there is provided an apparatus and method for processing data defining a three-dimensional computer model comprising a triangle mesh, to define a respective triangle on a two-dimensional plane for each triangle in the mesh so that texture data can be stored in the defined triangles to generate a texture map. Sequences of triangles which are connected in the mesh and which have similar geometric properties are identified. Triangles are then defined in the two-dimensional plane packed together based upon the identified sequences.

A sequence of triangles may be identified based upon geometric properties indicative of the distortion the shape of the triangles in the two-dimensional plane corresponding to the triangles in the sequences will have when the triangles in the two-dimensional plane are defined. In this way, the sequences of triangles can be generated to prevent significant shape distortion when triangles are defined in the texture map. As a result, less distortion occurs to texture data stored in the triangles and subsequently mapped on to the triangles in the 3D computer model during rendering.

The triangles may be defined in the two-dimensional plane such that the triangles have the same relative area in the two-dimensional plane as the triangles in the triangle mesh. In this way, texture data can be stored at the same resolution for triangles of the same area in the triangle mesh.

The triangles may be defined in the two-dimensional plane such that triangles corresponding to those in an identified sequence are defined in a connected sequence in the two-dimensional plane with no padding between the triangles. Padding may be provided to separate different sequences of triangles in the two-dimensional plane. In this way, the volume of padding is kept low.

The present invention also provides a computer program product, embodied for example as a storage medium carrying instructions or a signal carrying instructions, comprising instructions for causing a programmable processing apparatus to become operable to perform a method as set out above or to become configured as an apparatus as set out above.

Embodiments of the invention will now be described, by way of example only, with reference to the accompanying drawings, in which:

FIG. 1 schematically shows the components of an embodiment of the invention, together with the notional functional processing units and data stores into which the processing apparatus component may be thought of as being configured when programmed by programming instructions;

FIG. 2 shows an example to illustrate a 3D computer model comprising a triangle mesh defined in the input data processed by the apparatus in FIG. 1;

FIG. 3, which consists of FIGS. 3a, 3b, 3c and 3d, shows examples to illustrate images defined in the input data processed by the apparatus in FIG. 1;

Figure 7:
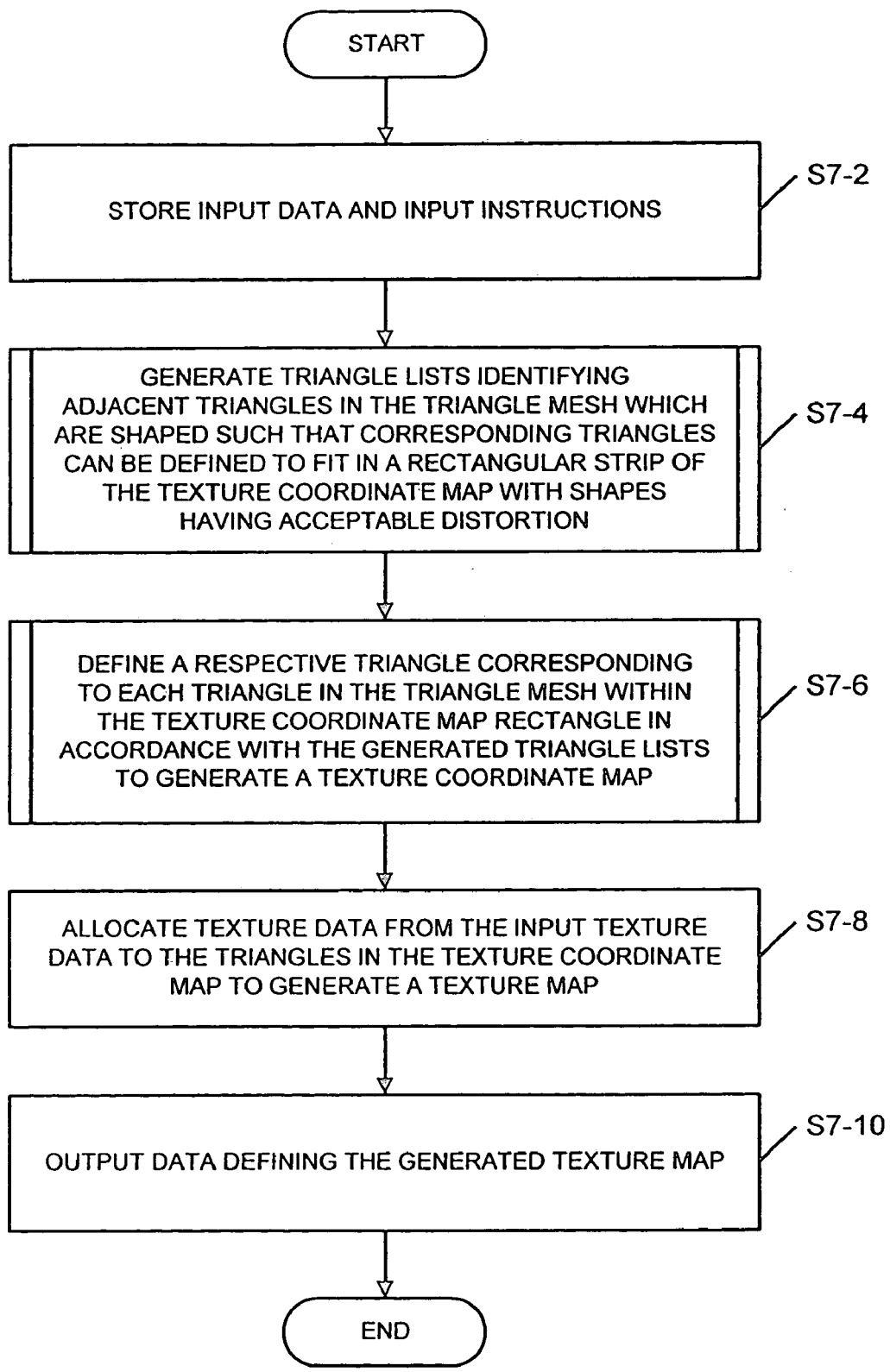
FIG. 7 shows the processing operations performed by the processing apparatus in FIG. 1.
Figure 9A:
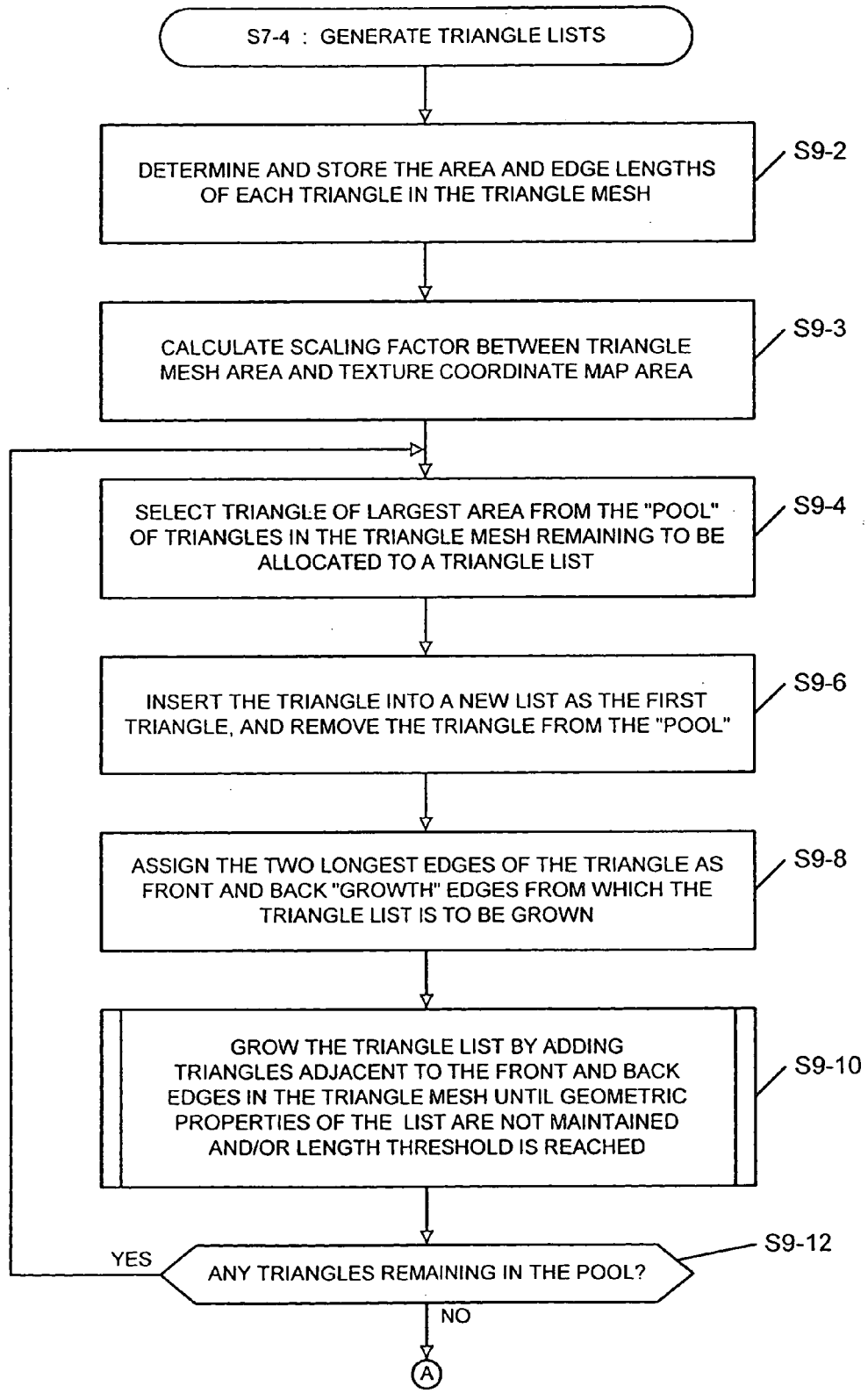
Figure 9B:
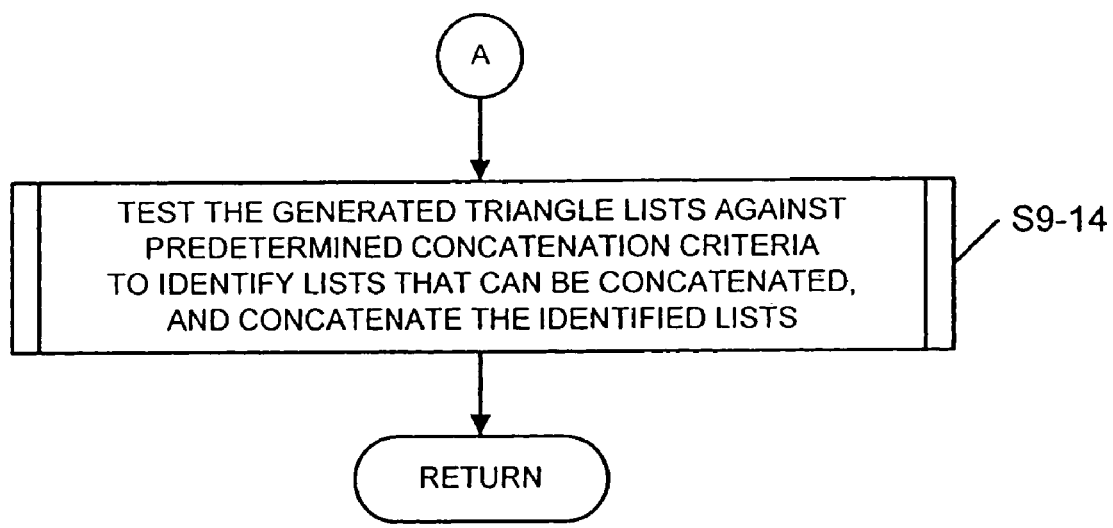
Figure 10A:
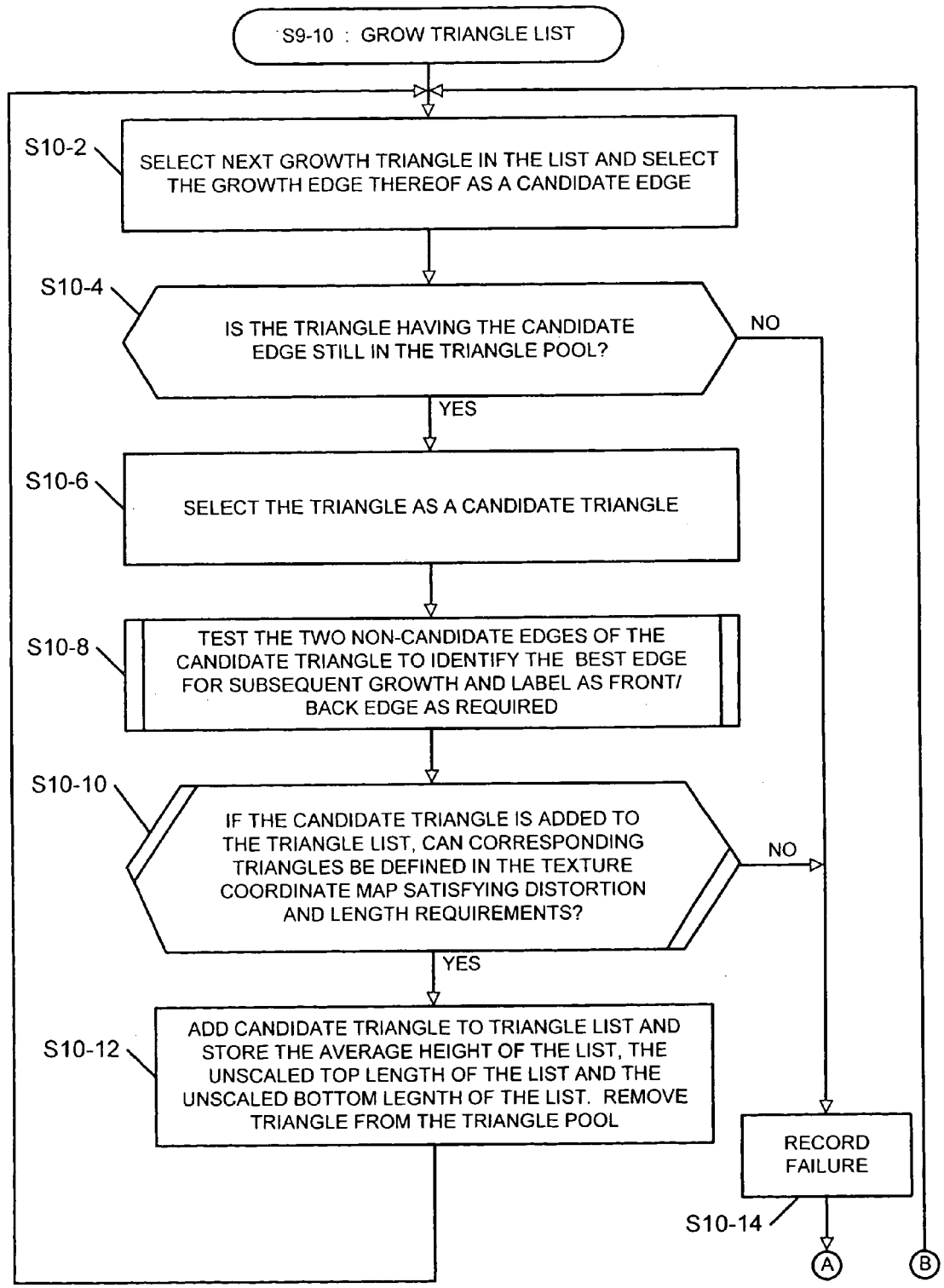
Figure 10B:
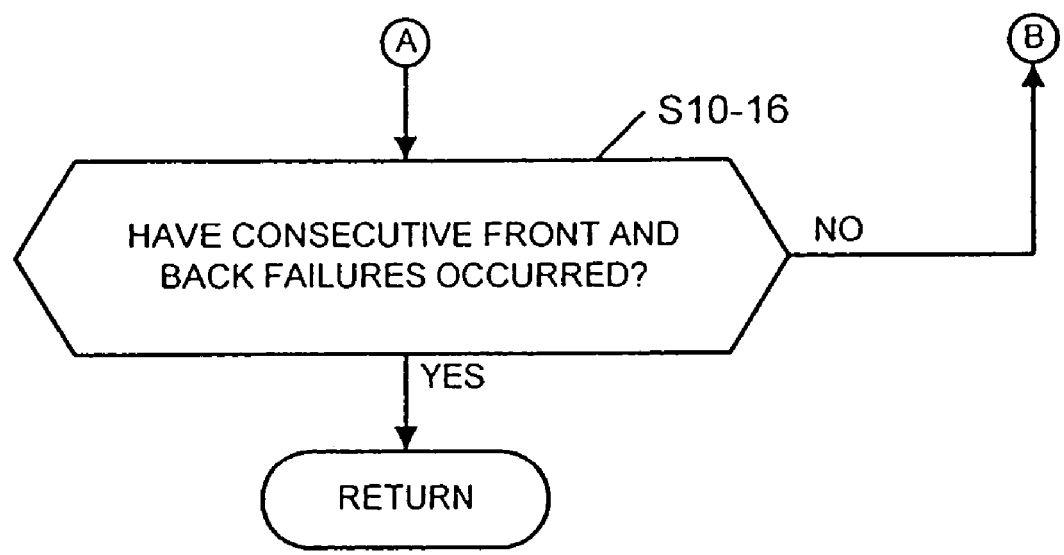
Figure 12A:
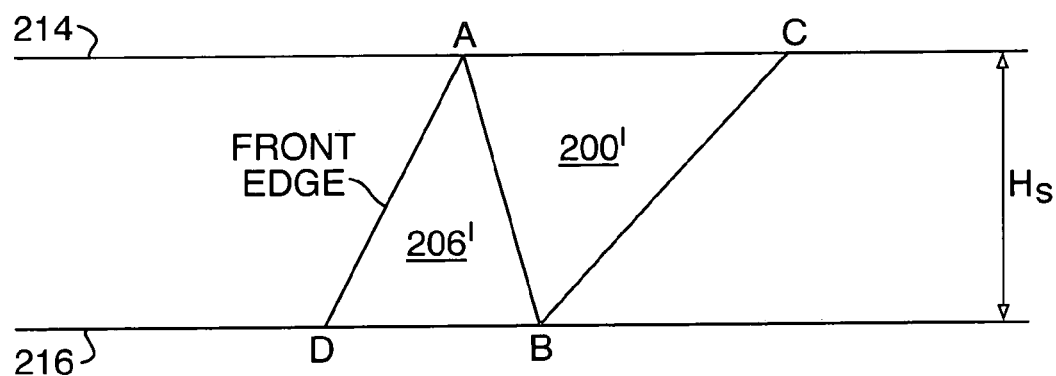
Figure 12B:
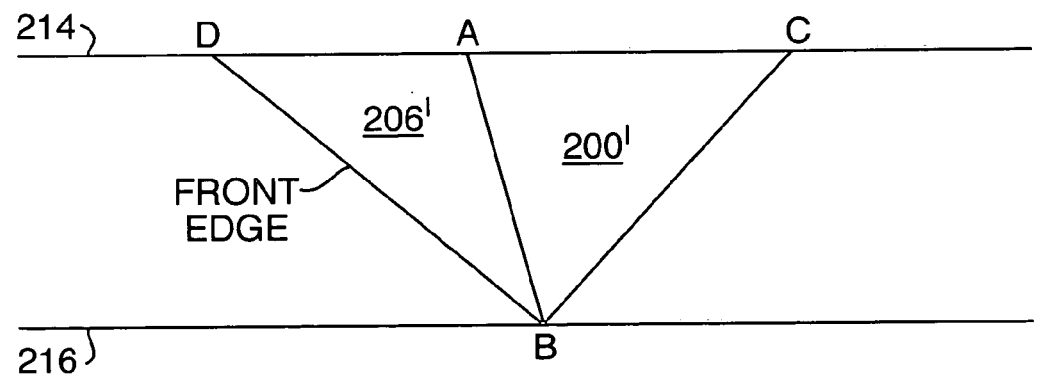
Figure 13A:
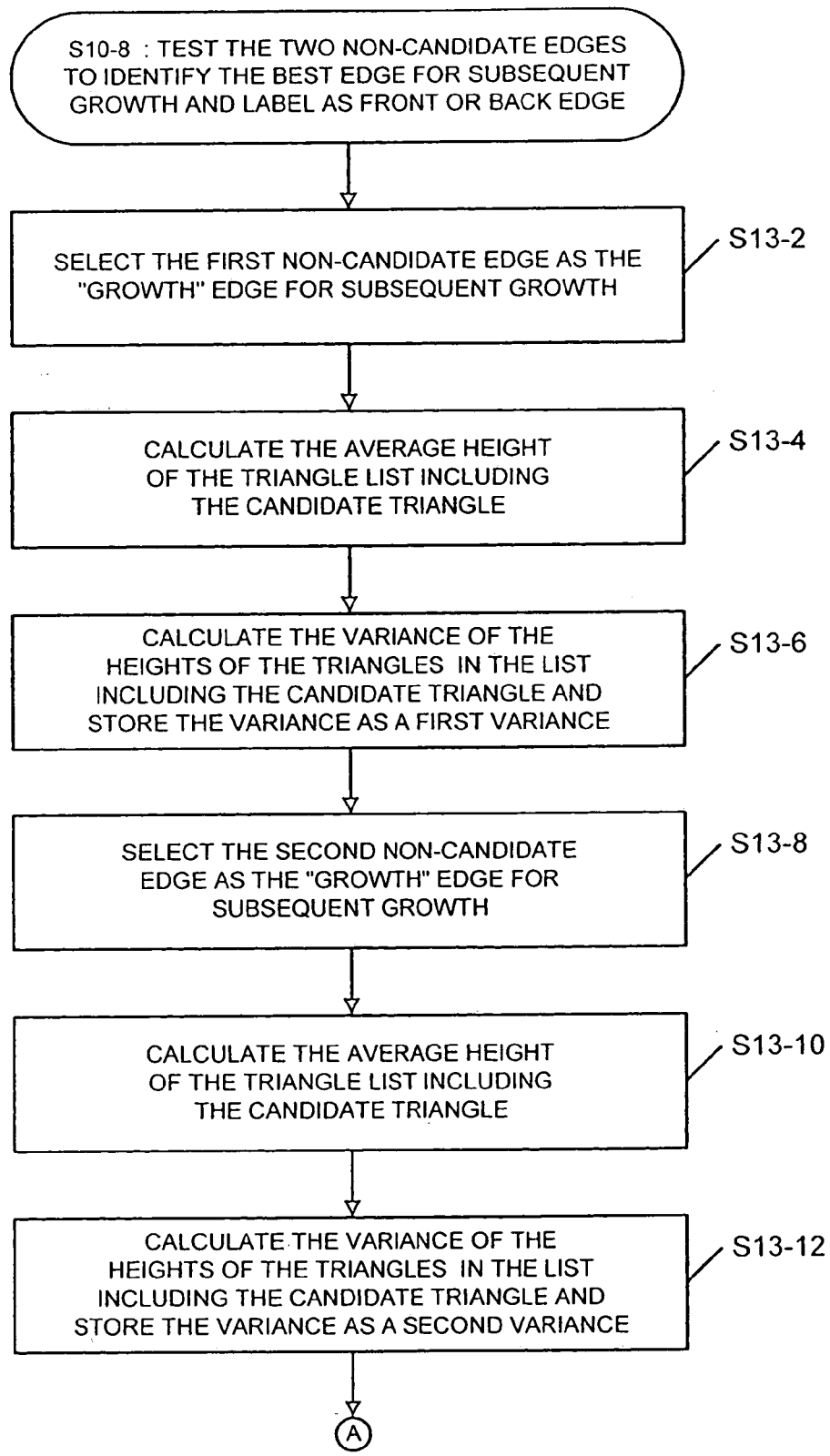
Figure 13B:
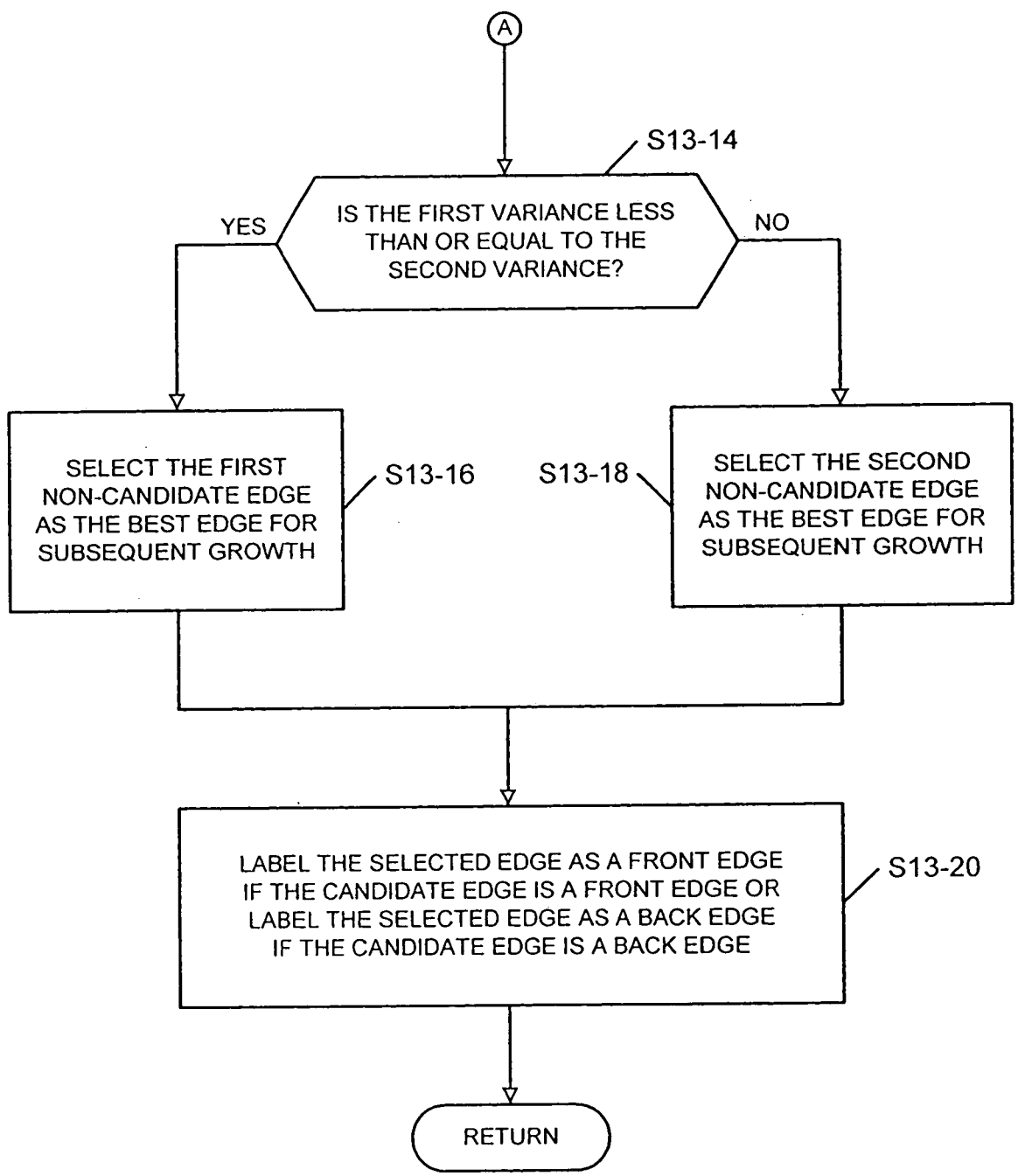
Figure 14B:
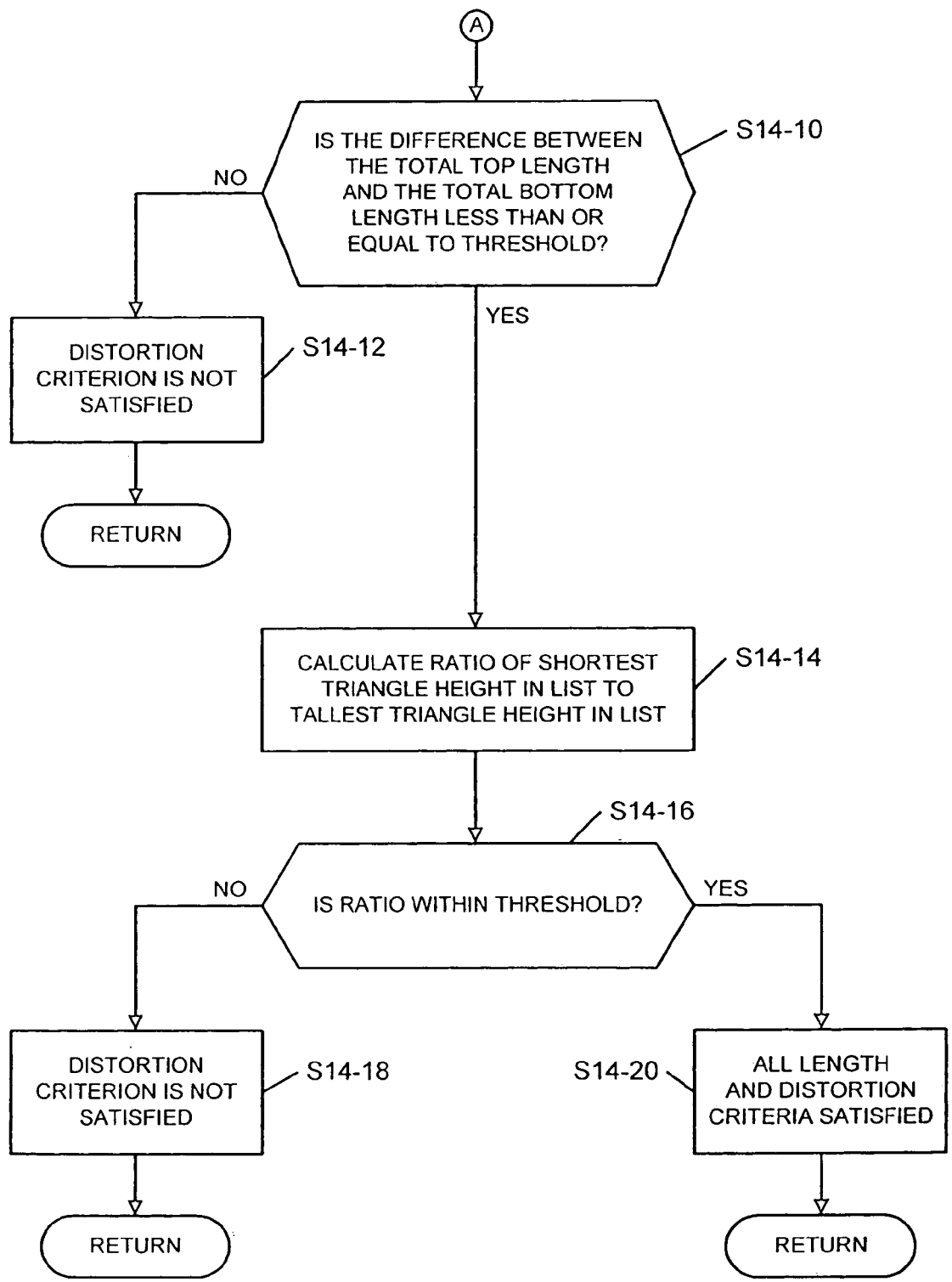
Figure 15:
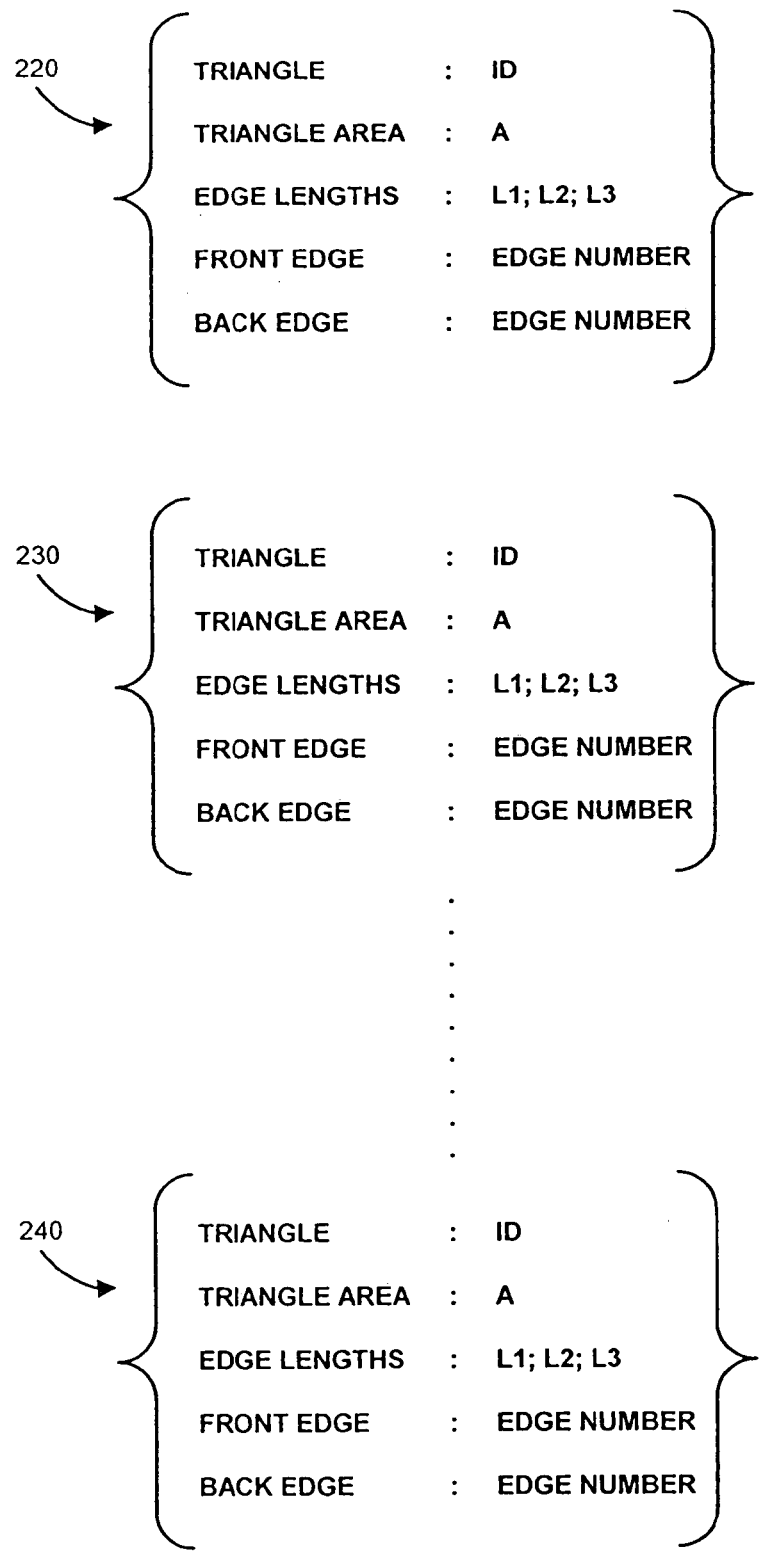
Figure 16:
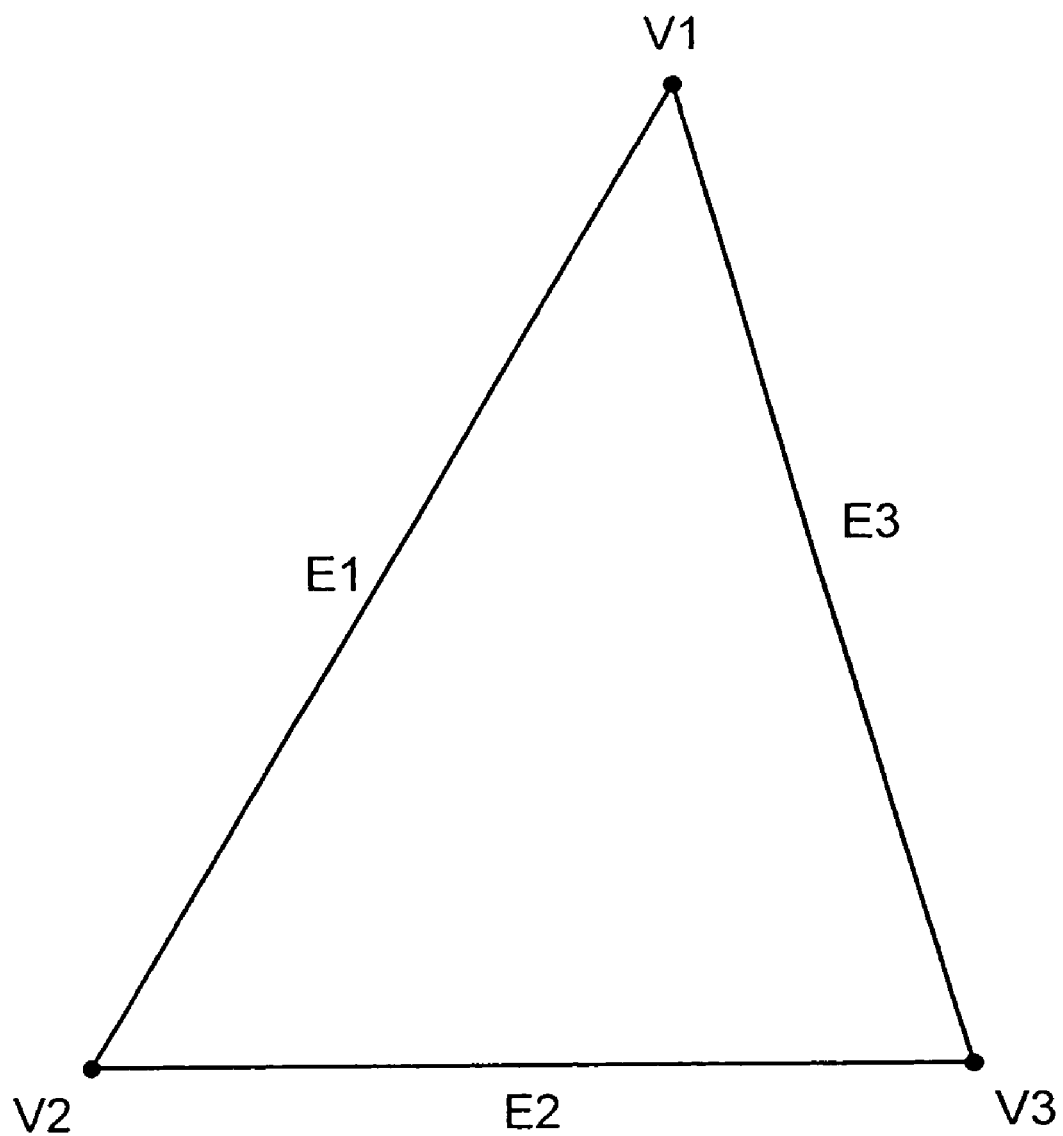
Figure 17A:
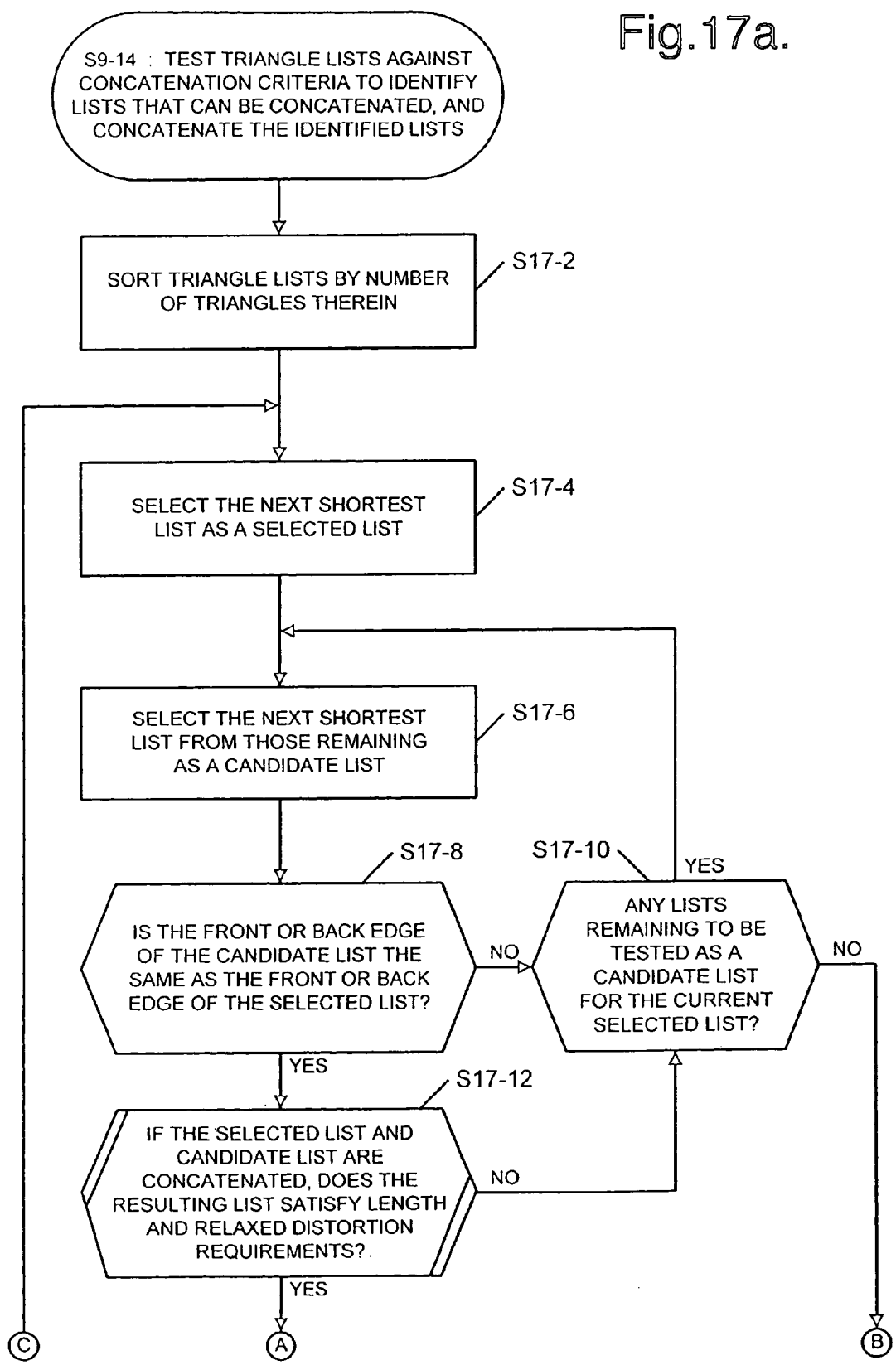
Figure 17B:
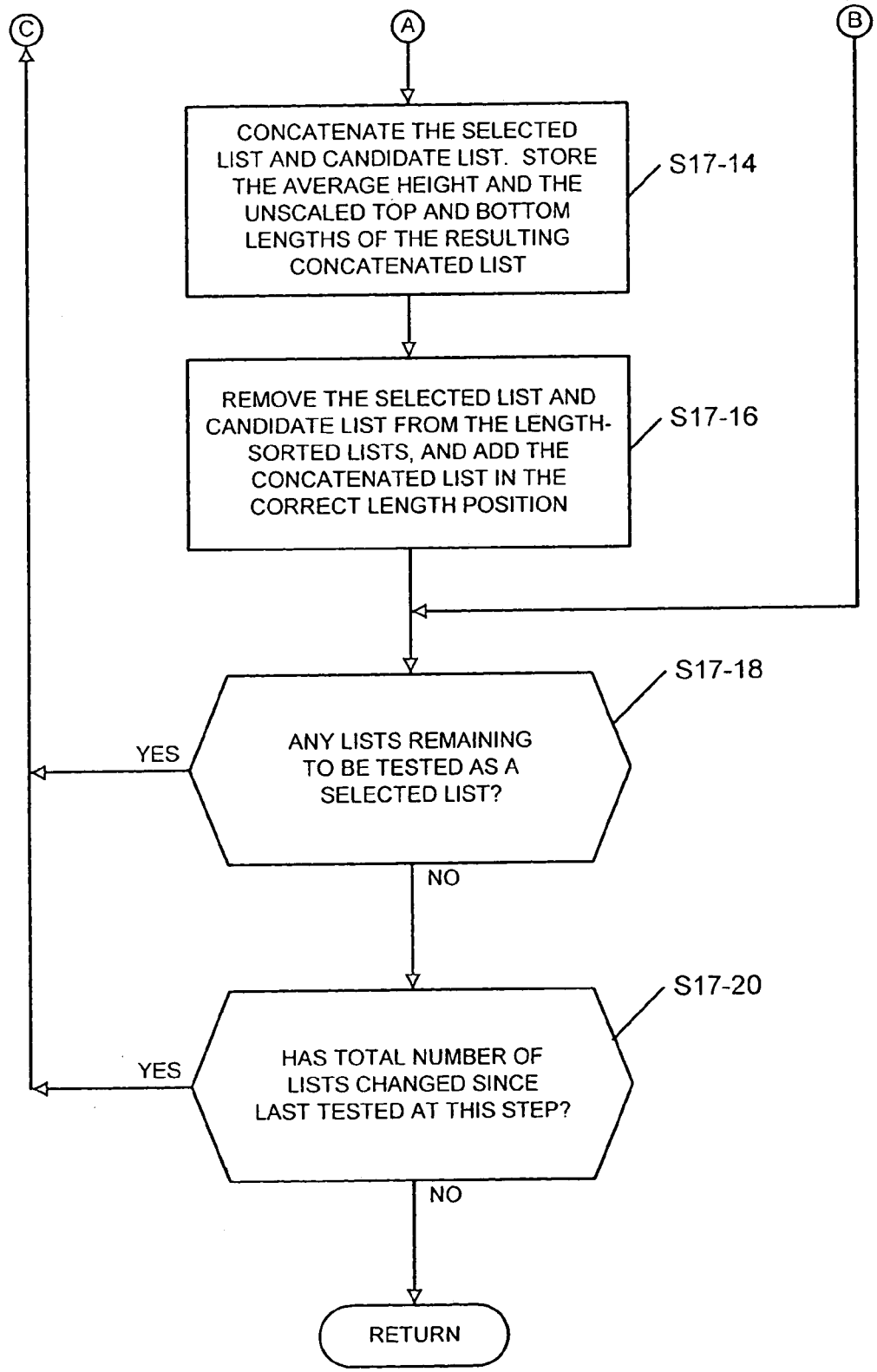
Figure 18:
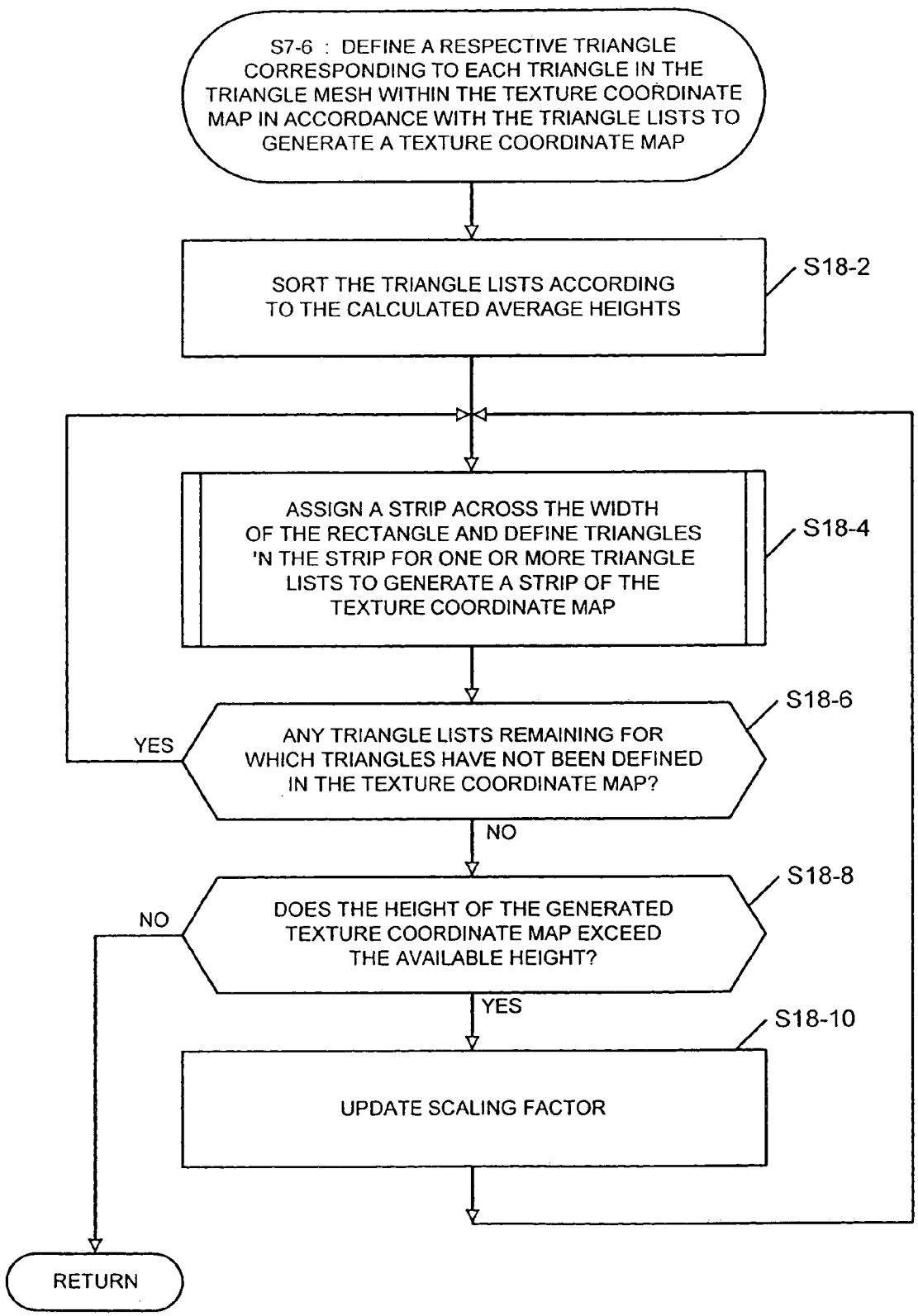
Figure 19A:
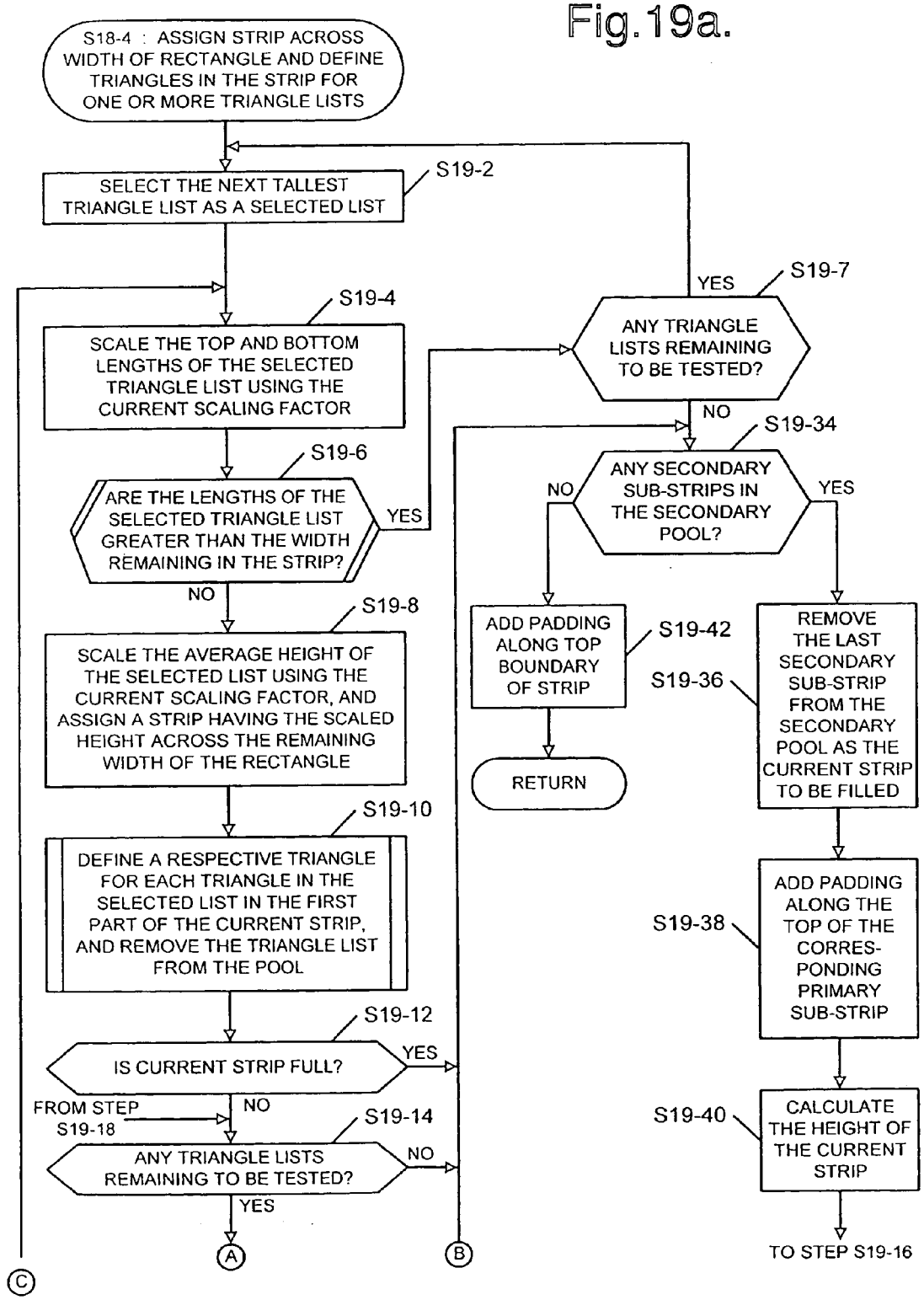
Figure 19C:
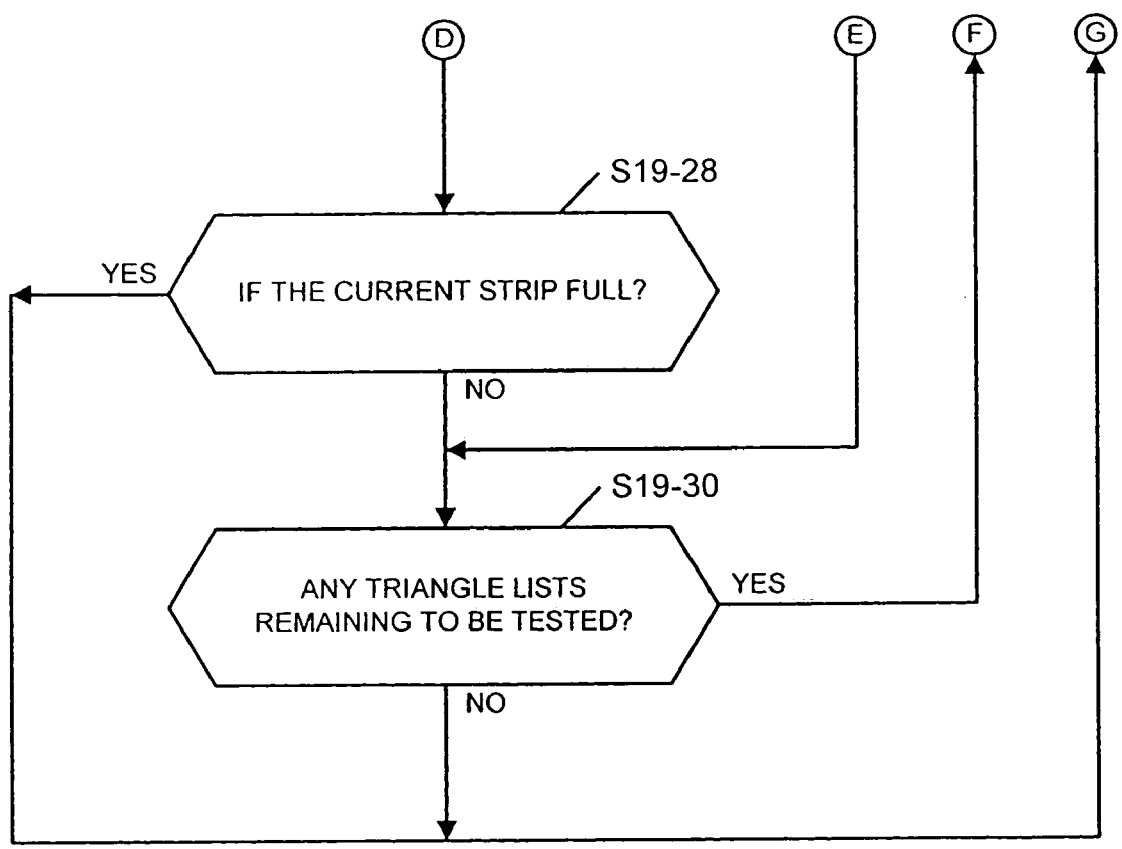
Figure 21A:
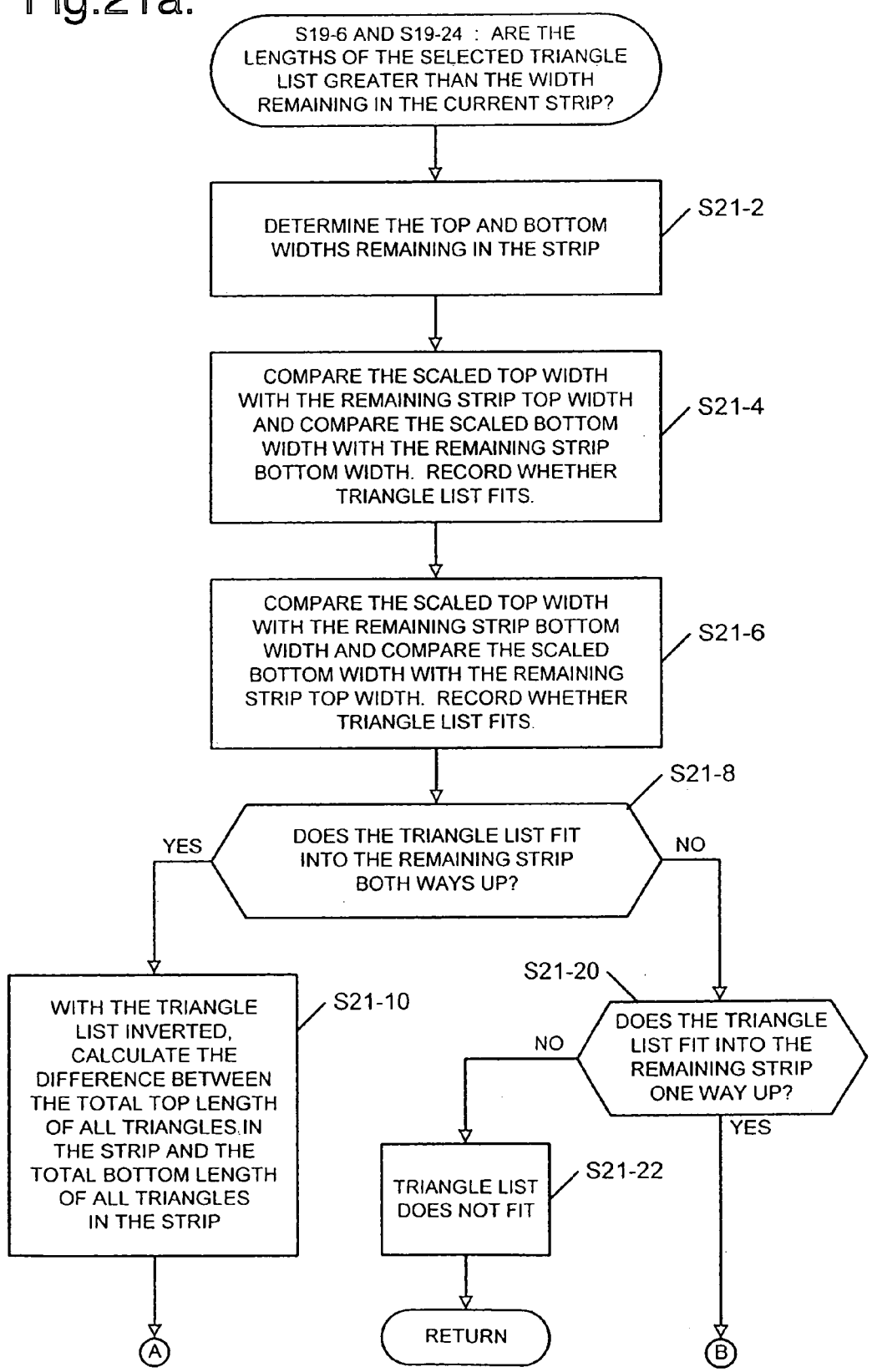
Figure 21B:
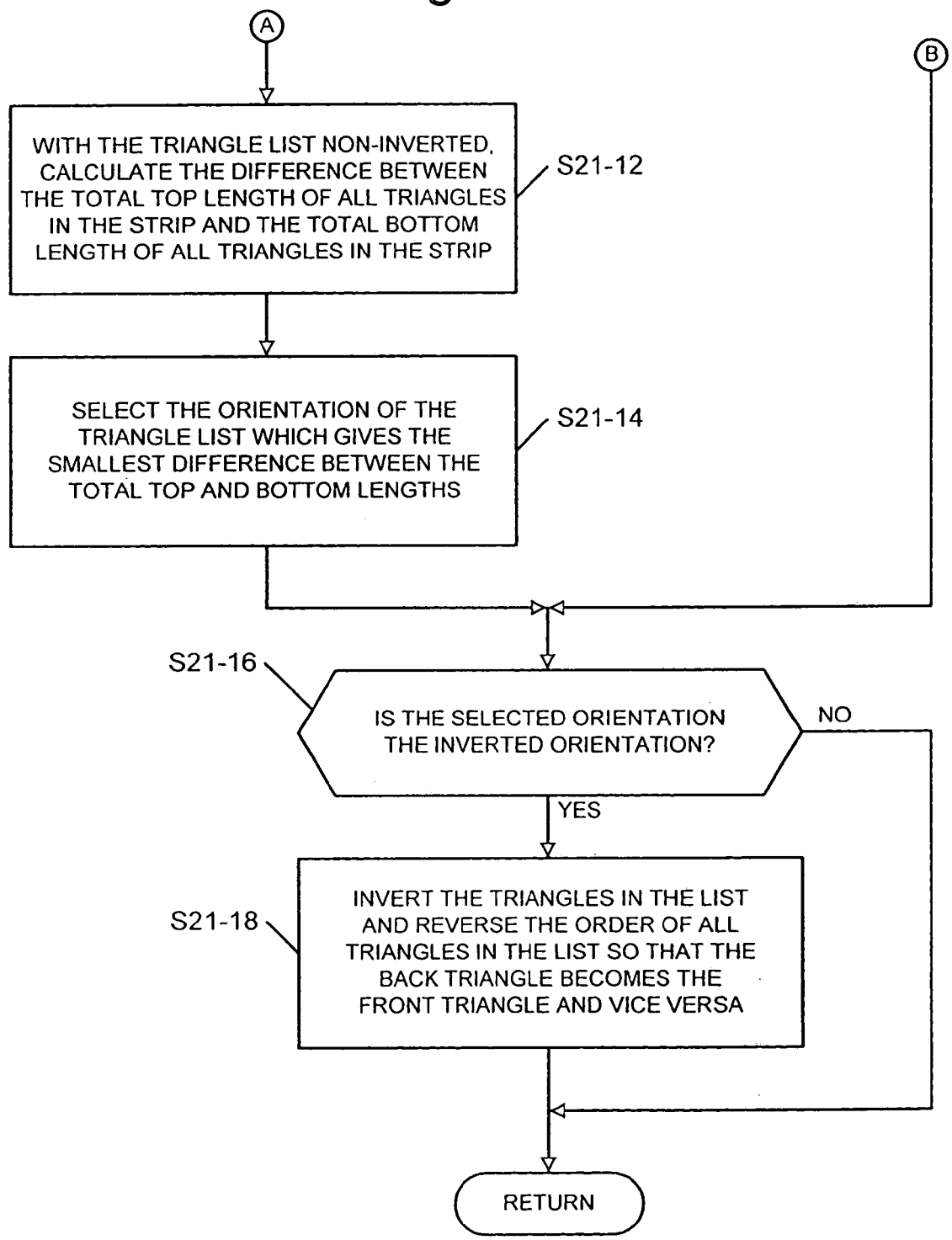
Figure 23D:
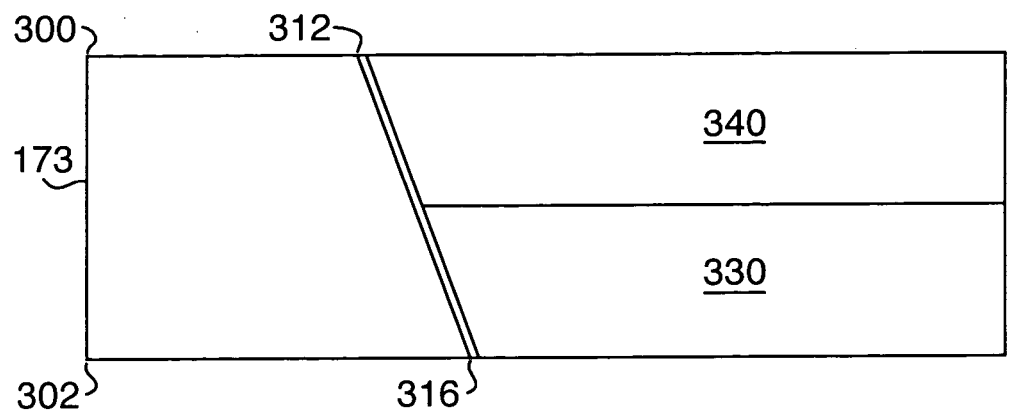
Figure 23E:
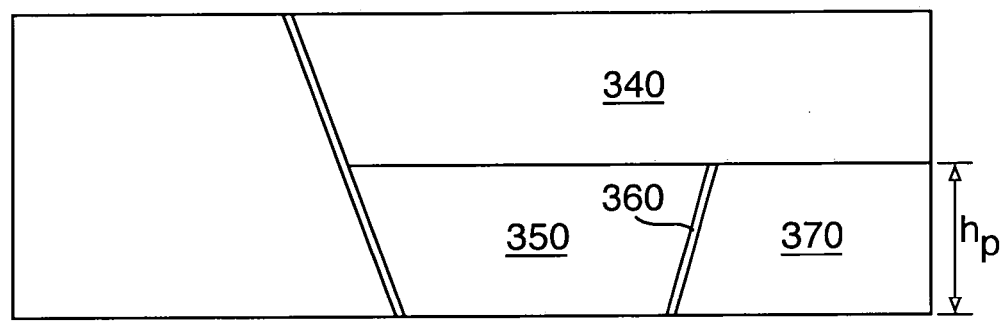
Figure 23F:
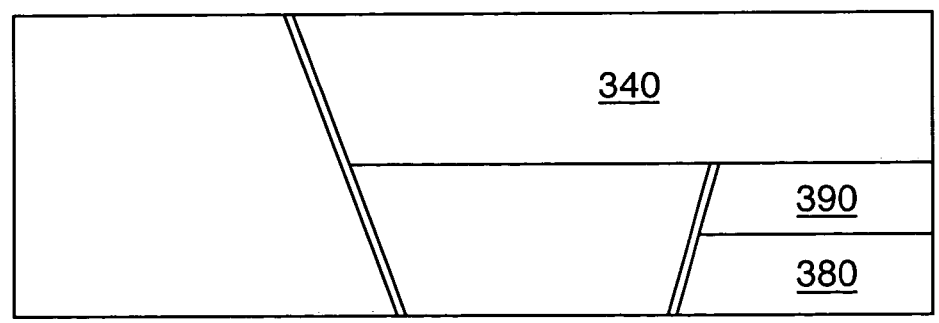
Figure 23G:
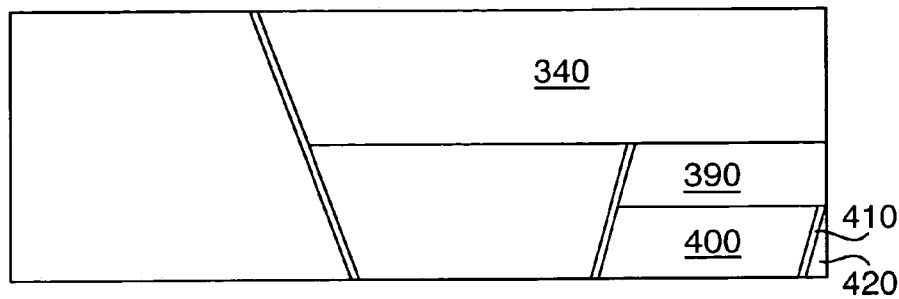
Figure 23H:
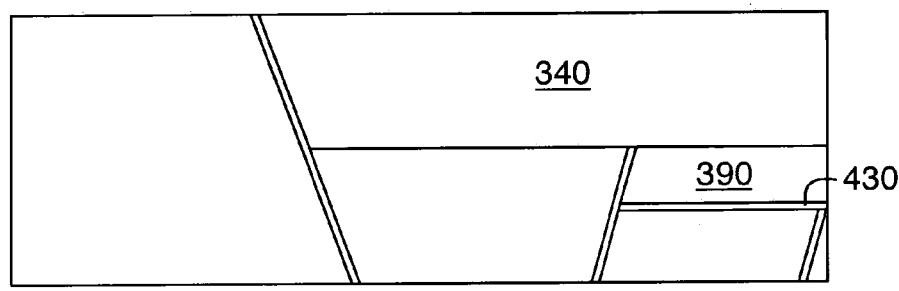
Figure 23I:
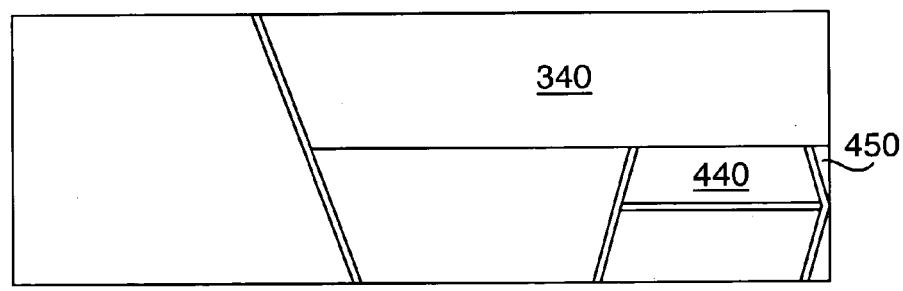
Figure 23J:
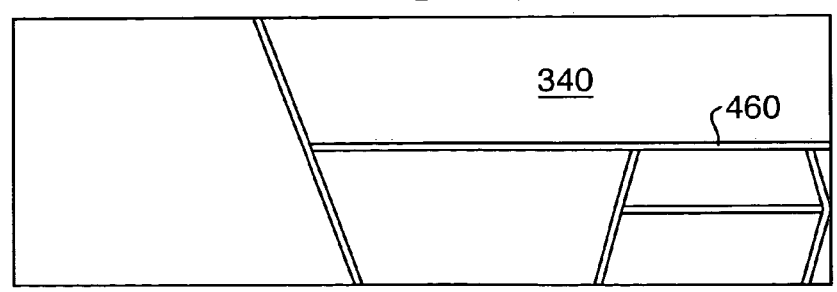
Figure 24:
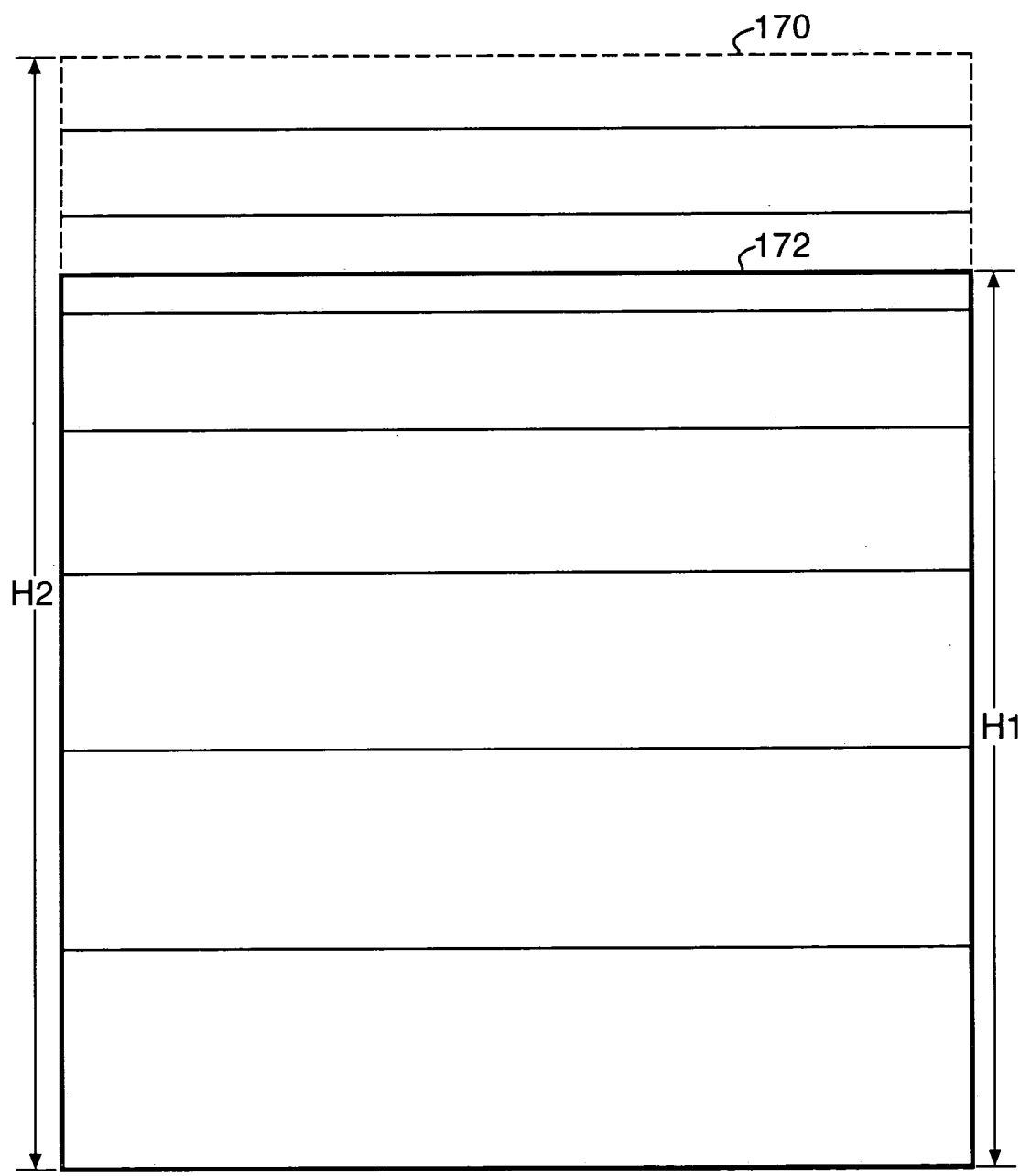

FIG. 9, which consists of FIGS. 9a and 9b, shows the processing operations performed at step S7-4 in FIG. 7;

FIG. 10, which consists of FIGS. 10a and 10b, shows the processing operations performed at step S9-10 in FIG. 9;

FIGS. 11a to 11d show an example to illustrate the processing performed at steps S10-2 to S10-8 in FIG. 10;

FIGS. 12a and 12b illustrate an example to show how triangles may be defined at step S7-6 in FIG. 7 in order to illustrate the processing performed at steps S10-8 and S10-10 in FIG. 10;

FIG. 13, which consists of FIGS. 13a and 13b, shows the processing operations performed at step S10-8 in FIG. 10;

FIG. 14, which consists of FIGS. 14a and 14b, shows the processing operations performed at step S10-10 in FIG. 10 and step S17-12 in FIG. 17;

FIG. 15 shows an example to illustrate the data stored to define a triangle list at step S10-12 in FIG. 10;

FIG. 16 shows an example to illustrate the data stored in the example of FIG. 15;

FIG. 17, which consists of FIGS. 17a and 17b, shows the processing operations performed at step S9-14 in FIG. 9;

FIG. 18 shows the processing operations performed at step S7-6 in FIG. 7;

FIG. 19, which consists of FIGS. 19a, 19b and 19c, shows the processing operations performed at step S18-4 in FIG. 18;

FIGS. 20a to 20d show an example to illustrate the processing performed at step S19-6 in FIG. 19;

FIG. 21, which consists of FIGS. 21a and 21b, shows the processing operations performed at step S19-6 and S19-24 in FIG. 19;

FIG. 22 shows the processing operations performed at step S19-10 and step S19-26 in FIG. 19;

FIGS. 23a to 23j show an example to illustrate the processing performed at steps S22-2 to S22-8 in FIG. 22; and FIG. 24 shows an example to illustrate the processing performed at steps S18-8 and S18-10 in FIG. 18.

Figure 1:
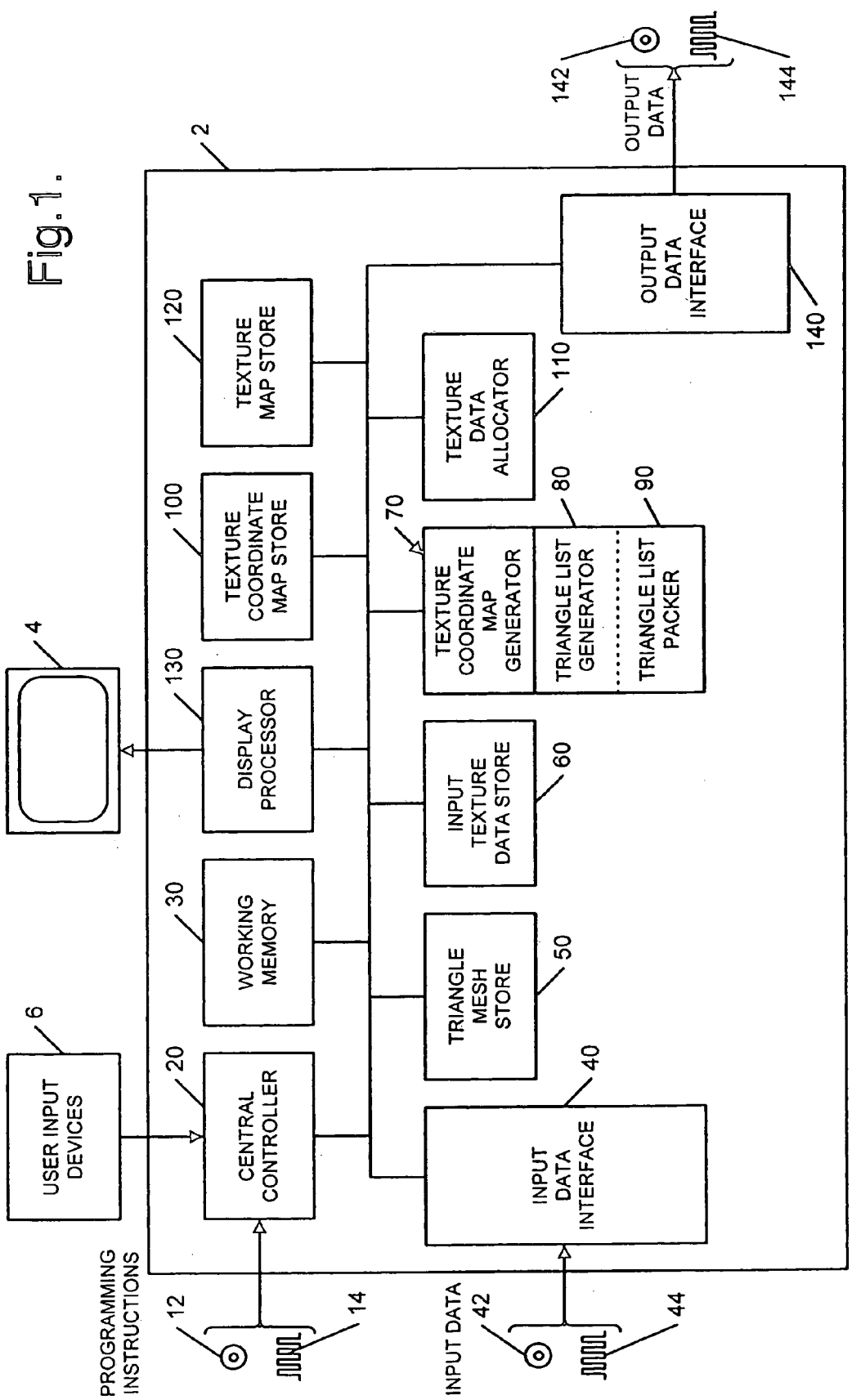

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, and user input devices 6, such as a keyboard, mouse etc.

The processing apparatus 2 is programmed to operate in accordance with programming instructions input, for example, as data stored on a data storage medium 12 (such as an optical CD ROM, semiconductor ROM, or magnetic recording medium, etc), and/or as a signal 14 (for example an electrical or optical signal input to the processing apparatus 2, for example from a remote database, by transmission over a communication network such as the Internet or by transmission through the atmosphere), and/or entered by a user via a user input device 6 such as a keyboard.

As will be described in more detail below, the programming instructions comprise instructions to cause the processing apparatus 2 to become configured to process input data defining a three-dimensional computer model of the surface shape of a subject object and data defining a plurality of images of the subject object recorded at different positions and orientations, to generate data defining a texture map for use in rendering images of the three-dimensional computer model. The three-dimensional computer model comprises a triangle mesh representing the surface shape of the subject object, and the processing to generate the texture map comprises processing to define a respective triangle within a two-dimensional area (which will subsequently become the texture map) for each triangle in the triangle mesh. The processing is carried out in a way which defines the triangles in the two-dimensional area so that the shape of each triangle is not distorted significantly from the shape of the corresponding triangle in the triangle mesh. In addition, the triangles are defined in sequences in the two-dimensional area so that triangles in a given sequence are adjacent in the two-dimensional area and correspond to triangles which are adjacent in the triangle mesh. In this way, the amount of padding required in the two-dimensional area is reduced because padding is not required between triangles which correspond to triangles adjacent in the triangle mesh and is only required between different sequences of triangles. When all of the triangles have been defined in the two-dimensional area, image data from the input images is mapped on to the triangles, thereby generating a texture map. Because the shapes of the triangles in the texture map have not been distorted significantly from the shapes of the corresponding triangles in the triangle mesh, when the image data from the texture map is used during rendering, the image data from the texture map can be texture mapped on to the triangles in the triangle mesh without significant distortion of the image data. Consequently, a realistic-looking image of the three-dimensional computer model can be generated.

When programmed by the programming instructions, processing apparatus 2 can be thought of as being configured as a number of functional units for performing processing operations and a number of data stores configured to store data. Examples of such functional units and data stores together with their interconnections are shown in FIG. 1. The functional units, data stores and interconnections illustrated in FIG. 1 are, however, notional, and are shown for illustration purposes only to assist understanding; they do not necessarily represent the units, data stores and connections into which the processors, memories etc of the processing apparatus 2 actually become configured.

Referring to the functional units shown in FIG. 1, a central controller 20 is arranged to process inputs from the user input devices 6, and also to provide control and processing for the other functional units. Working memory 30 is provided for use by central controller 20 and the other functional units.

Figure 2:
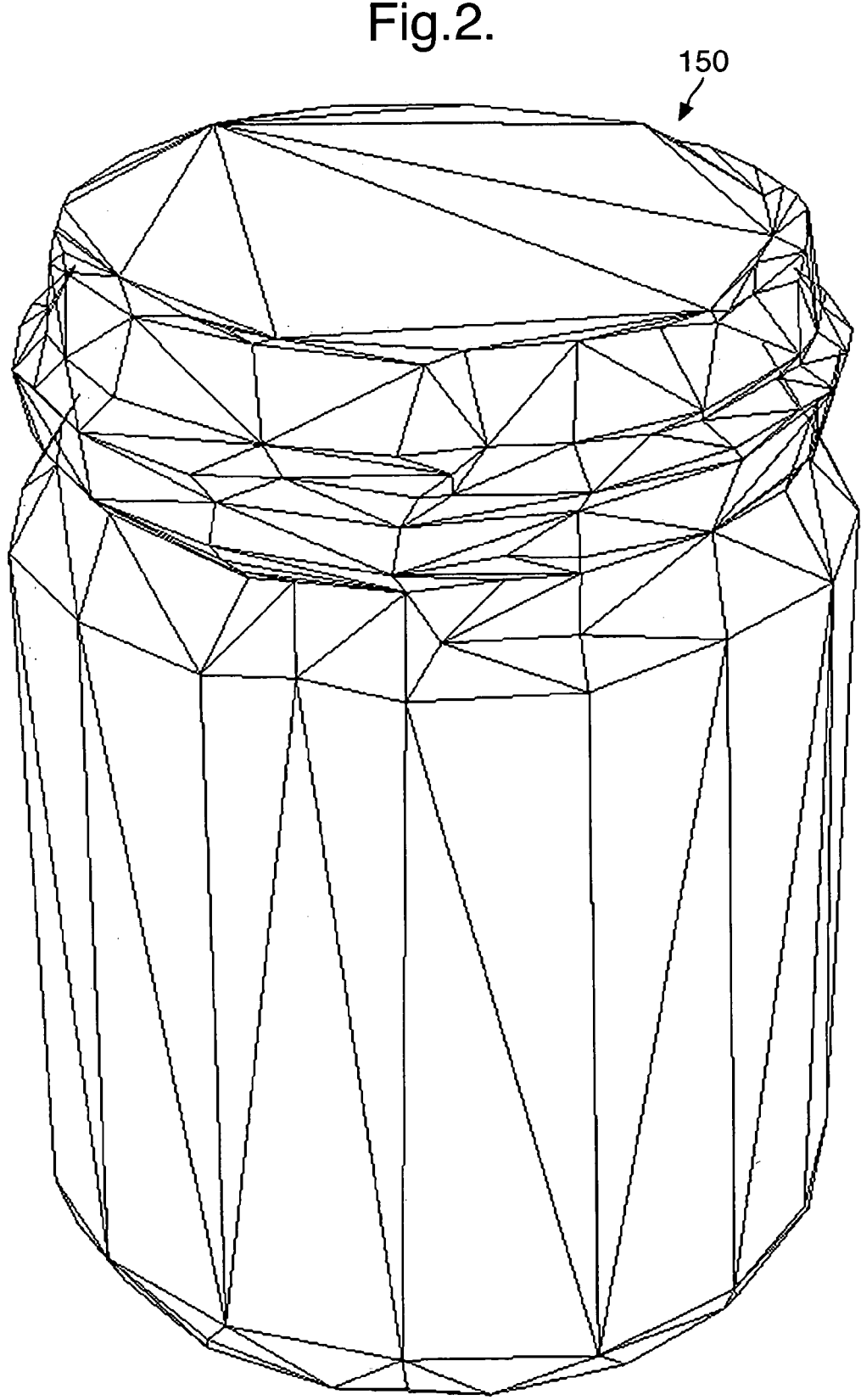
Figure 3A:
Figure 3B:
Figure 3C:
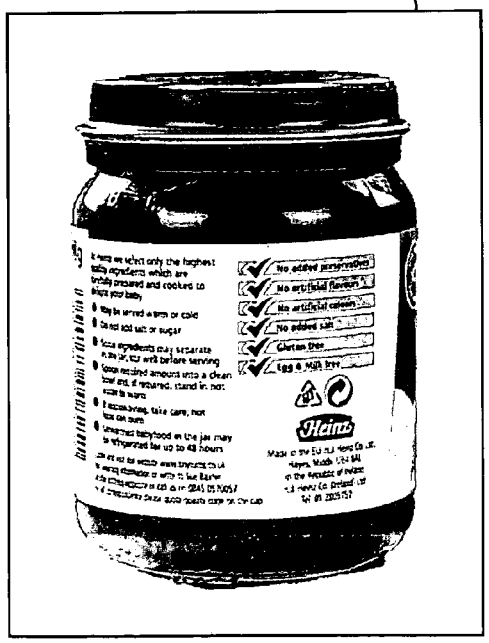
Figure 3D:

Input data interface 40 is arranged to receive, and write to memory, input data input to the processing apparatus 2, for example as data stored on a storage medium 42 or carried by a signal 44 transmitted to the processing apparatus 2. The input data comprises data defining a three-dimensional computer model comprising a triangle mesh representing the surface shape of a subject object, for example triangle mesh 150 shown in FIG. 2 representing the surface shape of a jar, and data defining texture data to be used to generate a texture map for the three-dimensional computer model. Referring to FIG. 3, in this embodiment, the input texture data to be used in the texture map comprises image data defining a plurality of images 160, 162, 164, 166 of the subject object recorded at different positions and orientations, together with data defining the positions and orientations at which the input images were recorded.

Triangle mesh store 50 is configured to store the input data defining the triangle mesh 150 representing the surface shape of the subject object.

Input texture data store 60 is configured to store the input texture data (in this embodiment, image data defining the input images 160-166 of the subject object and the data defining the positions and orientations at which the input images were recorded).

Figure 4:
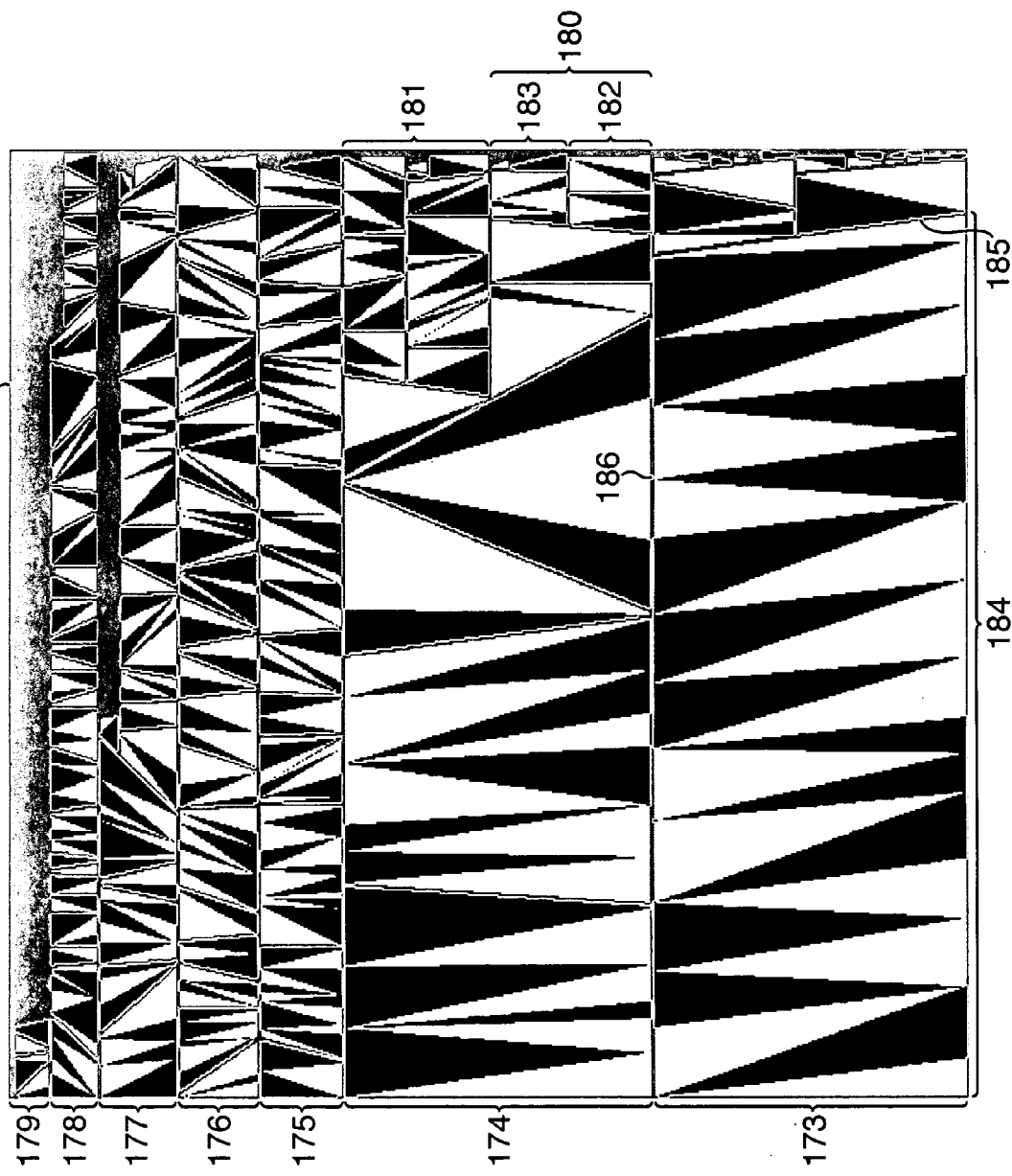
FIG. 4 shows an example to illustrate a texture coordinate map generated by the processing apparatus in FIG. 1.

Texture coordinate map generator 70 is operable to process the input data defining the triangle mesh to generate a texture coordinate map therefrom. Referring to FIG. 4 (which shows a texture coordinate map 170 for the triangle mesh 150 in FIG. 7), the texture coordinate map 170 comprises a two-dimensional (2D) rectangle 172 (which is a square in this embodiment) in which is defined a respective triangle for each triangle in the triangle mesh 150. As will be explained below, the processing to define each triangle in the texture coordinate map 170 is carried out in such a way that the shape of each triangle is not significantly geometrically distorted compared to the shape of the corresponding triangle in the triangle mesh 150. In the example of FIG. 4, adjacent triangles in the texture coordinate map 170 are shown in black and white for clarity. However, as will be described later, the data generated by texture coordinate map generator 70 comprises data defining the positions of the triangle vertices in the texture coordinate map 170 but not shading data.

More particularly, the triangles in the texture coordinate map 170 are defined to lie within a plurality of strips 173-179 extending parallel to two of the sides of the rectangle 172 (in the case of the example shown in FIG. 4, the strips 173-179 extend in the width direction of the rectangle 172). As will be explained in more detail later, each strip 173-179 may be split into sub-strips (for example sub-strips 180 and 181 of strip 174) and each sub-strip may be split into further sub-strips (for example sub-strips 182 and 183 of sub-strip 180). The triangles are defined in sequences within the strips 173-179, each sequence corresponding to triangles which are connected in the triangle mesh 150. Thus, for example, the triangles defined within the area 184 of strip 173 correspond to triangles which are connected in the triangle mesh 150. No padding is defined in the texture coordinate map 170 between the respective triangles in a given triangle sequence. However, padding is defined between different sequences of triangles (because the triangles of the different sequences are not connected in the triangle mesh 150). Thus, for example, the region 185 in strip 173 comprises padding and the region 186 between strips 173 and 174 comprises padding. Because the number of triangle lists is significantly fewer than the number of individual triangles in the triangle mesh 150, significantly less padding is required in the texture coordinate map 170 to separate the triangle lists than would be required to separate the individual triangles.

The texture coordinate map 170 therefore defines a respective 2D triangle for each triangle in the triangle mesh 150, to which input texture data can be allocated to generate a texture map for the triangle mesh 150.

Texture coordinate map generator 70 comprises a triangle list generator 80 and a triangle list packer 90.

Triangle list generator 80 is operable to process the data defining the input triangle mesh 150 to generate a plurality of triangle lists therefrom. Each triangle list defines a sequence of triangles comprising triangles which are connected in the triangle mesh 150 and which satisfy a number of geometric criteria such that a sequence of corresponding triangles can be defined within a strip 173-179 (or a sub-strip therein) of the texture coordinate map rectangle 172 without the shape of the defined triangles being distorted significantly from the shape of the triangles in the triangle mesh 150 which they represent.

Triangle list packer 90 is operable to define a triangle in the texture coordinate map rectangle 172 for each triangle in the triangle mesh 150. Triangle list packer 90 is configured to define the triangles in the rectangle 172 without any overlap of the triangles in accordance with the triangle lists generated by triangle list generator 80 such that, for each respective list, the triangles in the list are defined in a sequence in one of the strips 173-179 (or one of the sub-strips therein) so that they are adjacent to each other in accordance with the sequence defined by the list and such that there is no padding between the triangles. The padding is omitted between the triangles defined in the rectangle 172 for a given triangle list because the triangles represent triangles which are adjacent in the triangle mesh 150. By omitting the padding in this way, the area in the rectangle 172 available for occupation by the triangles is increased, so that the triangles can be defined with a larger area, thereby improving the resolution of the subsequently generated texture map.

Texture coordinate map store 100 is configured to store data defining the texture coordinate map 170 generated by texture coordinate map generator 70.

Texture data allocator 110 is operable to process the data defining the texture coordinate map 170 and the input texture data to allocate the pixel data from the input images 160-166 to the triangles in the texture coordinate map 170, thereby to generate a texture map.

Figure 5:
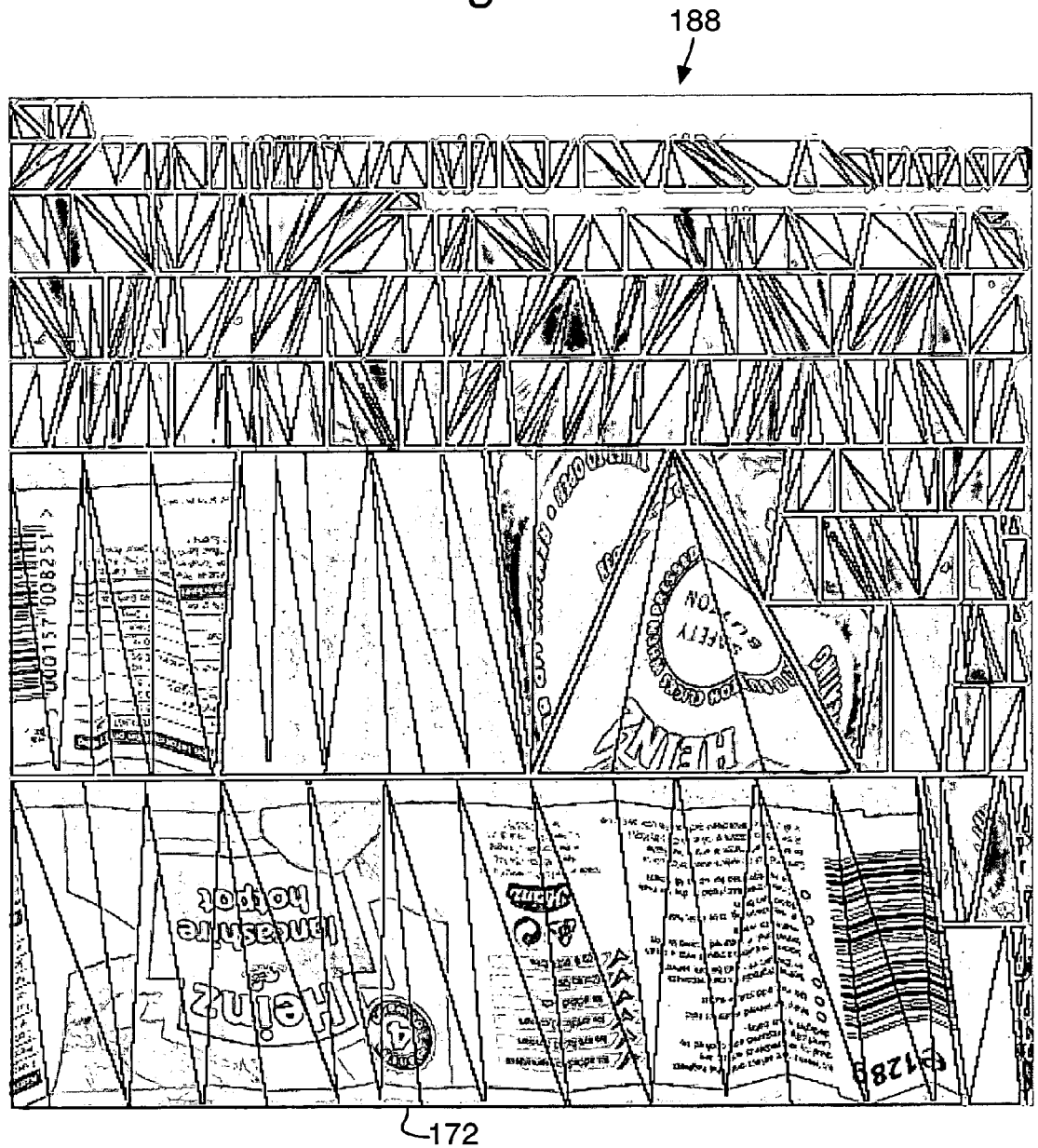
FIGS. 5 and 6 show an example to illustrate a texture map generated by the processing apparatus in FIG. 1.
Figure 6:
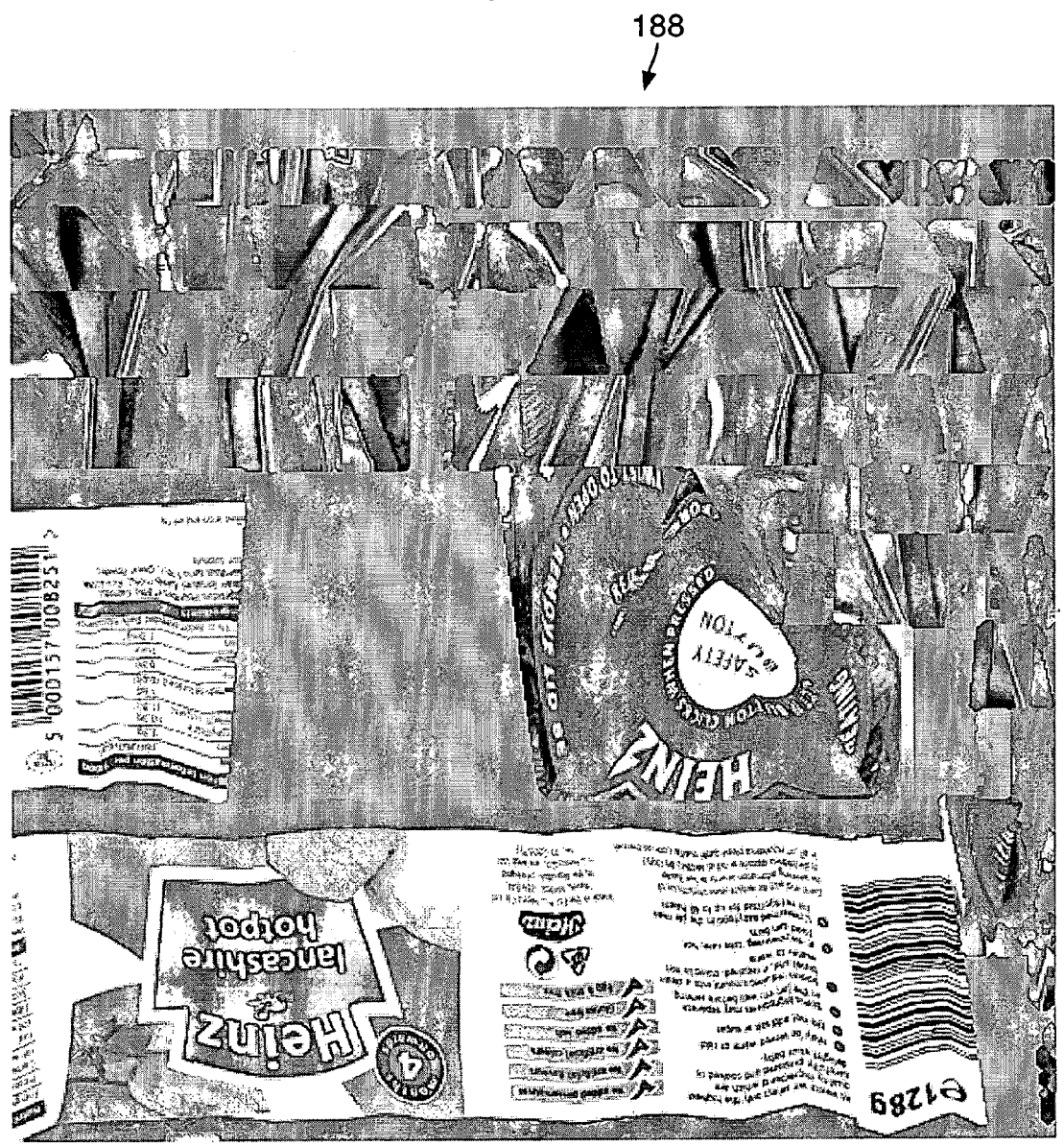

Referring to FIG. 5 (which shows a texture map 188 overlaid with the triangles of the texture coordinate map 170 to assist understanding) and FIG. 6 (which shows the same texture map 188 without the triangles overlaid), the texture map 188 generated by texture data allocator 110 comprises, in a conventional manner, image data assigned to the texels occupied by each triangle, so that, during rendering, the image data can be texture mapped on to the corresponding triangle in the triangle mesh 150 to generate a rendered image thereof.

Texture map store 120 is configured to store data defining the texture map 188 generated by texture data allocator 110.

Display processor 130, under the control of central controller 20, is operable to generate image data in a conventional way by rendering the input triangle mesh 150 from a user-selected viewpoint and texture mapping texture data thereon in accordance with the texture map 188 generated and stored in texture map store 120. Display processor 130 is further operable to control display device 4 to display the generated image data.

Output data interface 140 is operable to output data from processing apparatus 2 for example as data on a storage medium 142 (such as an optical CD ROM, semiconductor ROM or magnetic recording medium, etc) and/or as a signal 144 (for example an electrical or optical signal transmitted over a communication network such as an Internet or through the atmosphere). In this embodiment, the output data comprises data defining the input triangle mesh 150 and the texture map 188 generated and stored in texture map store 120.

A recording of the output data may be made by recording the output signal 144 either directly or indirectly (for example by making a subsequent copy) using recording apparatus (not shown).

FIG. 7 shows the processing operations performed by processing apparatus 2 in this embodiment.

At step S7-2, input data interface 40, under the control of central controller 20, stores the input data defining the triangle mesh 150 in triangle mesh store 50, and the input image data defining the input images 160-166 in the input texture data store 60, together with the input data defining the positions and orientations at which the images were recorded. In addition, in this embodiment, the user inputs input instructions (for example using a user input device 6 such as a keyboard) defining the size of the rectangle 172, thereby to define the size of the texture map 188 to be generated. In this embodiment, the user defines the size by specifying the height and width of rectangle 172 by number of texels. The data defining this size is stored in working memory 30.

At steps S7-4 and S7-6, texture coordinate map generator 70 processes the data defining the triangle mesh 150 stored in the triangle mesh store 50 to generate a texture coordinate map 170 comprising a rectangle 172 of the user-specified dimensions having defined therein a respective triangle for each triangle in the triangle mesh 150.

A triangle in the texture coordinate map 170 does not necessarily have the same shape as the corresponding triangle in the triangle mesh 150. However, as will be explained below, the processing is carried out so that the shape of each triangle in the texture coordinate map 170 is not distorted significantly compared to the shape of the corresponding triangle in the triangle mesh 150.

In this embodiment, the processing performed by texture coordinate map generator 70 to generate a texture coordinate map 170 comprises two stages.

Figure 8:
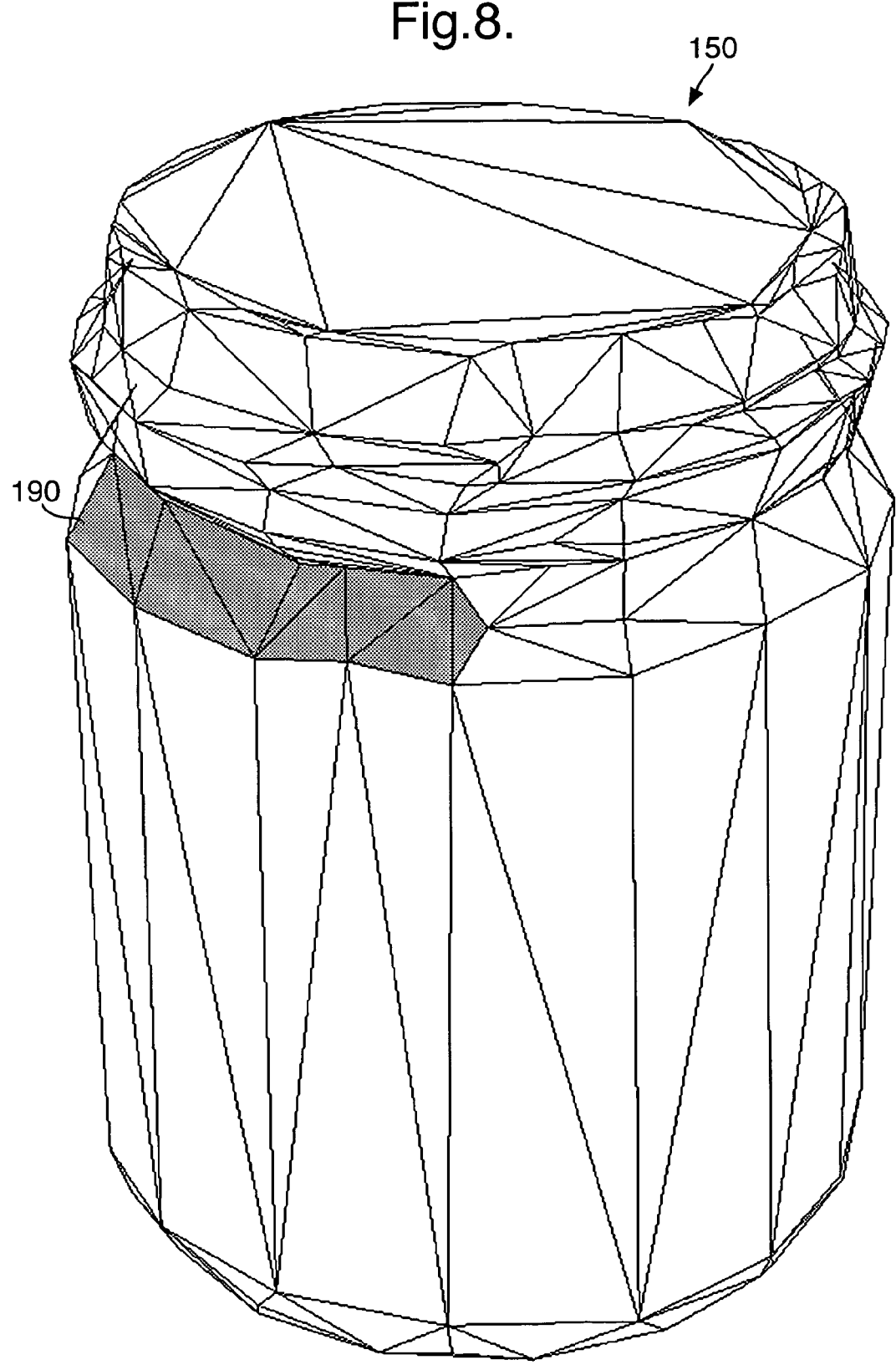
FIG. 8 shows an example to illustrate a sequence of connected triangles in a triangle mesh identified in the processing at step S7-4 in FIG. 7.

In the first stage (S7-4) triangle list generator 80 processes the data defining the triangle mesh 150 to generate a plurality of triangle lists, each list identifying triangles which are adjacent in the triangle mesh 150 (such as the sequence 190 of shaded triangles shown by way of example in FIG. 8) and which have shapes such that corresponding triangles can be defined adjacent each other in a strip 173-179 (or sub-strip) within the texture coordinate map rectangle 172 without significant geometric distortion to the shapes of the triangles. As a result of this processing every triangle in the triangle mesh 150 is assigned to a list (although, as will be explained below, some lists may contain only one triangle).

In the second stage (S7-6), triangle list packer 90 uses the results of the processing performed by triangle list generator 80 at step S7-4, to define triangles in the rectangle 172 of the texture coordinate map so that a respective triangle is defined for each triangle in the triangle mesh 150. This processing may be thought of as "packing" the triangles in each list into a strip 173-179 (or sub-strip) within the rectangle 172. Some geometric distortion to the shapes of the triangles occurs, but this is within an acceptable level as a result of the processing performed at step S7-4.

The processing operations performed by texture coordinate map generator 70 at steps S7-4 and S7-6 will now be described in detail.

FIG. 9 shows the processing operations performed by triangle list generator 80 at step S7-4.

Referring to FIG. 9, at step S9-2, triangle list generator 80 processes the data stored in triangle mesh store 50 defining the triangles in the triangle mesh 150 to determine the respective area of each triangle in the mesh 150 and the respective length of each edge in each triangle in the mesh 150. Triangle list generator 80 stores this data for subsequent use.

At step S9-3, triangle list generator 80 calculates a scaling factor relating lengths in the 3D space of the triangle mesh 150 to lengths in the 2D space of the rectangle 172 of the texture coordinate map 170.

More particularly, in this embodiment, the rectangle 172 is a square and, when step S7-6 is performed, a respective triangle is defined in the rectangle 172 for each triangle in the triangle mesh 150 such that the triangles in the rectangle 172 have the same relative size as the triangles in the triangle mesh 150. In addition, in the optimum case, the rectangle 172 is filled with triangles without any wasted space. Triangle list generator 80 therefore calculates the scaling factor at step S9-3 using the following equation:

$$\beta = \frac{N}{\sqrt{A_M}} \quad (1)$$

where:

β is the scaling factor;

N is the number of texels along one side of the rectangle 172 (defined at step S7-2);

$A_M$ is the total area of all of the triangles in the mesh 150 (obtained by calculating the sum of the individual triangle areas stored at step S9-2).

At step S9-4, triangle list generator 80 selects the triangle of largest area from the "pool" of triangles in the triangle mesh 150 remaining to be allocated to a triangle list (the "pool" comprising all of the triangles in the triangle mesh 150 the first time step S9-4 is performed), and, at step S9-6, inserts the selected triangle into a new list as the first triangle thereof, and removes the triangle from the "pool" of triangles remaining to be allocated.

At steps S9-8 and S9-10, triangle list generator 80 attempts to add further triangles to the first triangle assigned to the triangle list at step S9-6, to generate a list of triangles which are adjacent (that is, connected) in the triangle mesh 150 and which are all shaped such that the list satisfies a number of geometric shape and length criteria.

It has been found in practice that lists containing a relatively large number of triangles are generated during the first few iterations of steps S9-4 to S9-12. This is because, the number of triangles in the "pool" of triangles remaining to be allocated to a triangle list is relatively large during the first few iterations, but decreases on each iteration as triangles are removed from the "pool" and allocated to a triangle list. Consequently, on later iterations, the number of triangles available for selection from the triangle "pool" is reduced and the number of triangles in the lists generated at step S9-4 to S9-12 is relatively few. Indeed, on later iterations, each list may comprise a single triangle (that is, the first triangle allocated at step S9-6).

For this reason, each time step S9-4 is performed, triangle list generator 80 selects the triangle of largest area remaining in the "pool" of triangles as the first triangle for a new triangle list. In this way, during the first few iterations of steps S9-4 to S9-12, triangle lists containing the largest triangles in the mesh 150 are generated, leaving the triangles of smallest area in the "pool" to be allocated to triangle lists in subsequent iterations. As a result, the shortest lists generated, including the lists containing only a single triangle, contain triangles from the triangle mesh 150 having the smallest area. As will become apparent from later description, this reduces the volume of padding required in the texture coordinate map 170 because padding is required between triangles from different lists but not triangles within a given list, and more padding is required to surround a triangle of large area than to surround a triangle of small area. Consequently, the more large-area triangles that can be included in a list with other triangles (instead of being left to make up a list comprising a single triangle), the less padding will ultimately be required.

The processing performed at steps S9-8 and S9-10 to attempt to add triangles to the first triangle in a triangle list to increase the number of triangles in the list will now be described.

At step S9-8, triangle list generator 80 reads the data stored at step S9-2 for the triangle inserted into the triangle list as the first triangle at step S9-6, and assigns the two longest edges of the triangle as front and back "growth" edges. Each "growth" edge represents an edge which will subsequently be tested at step S9-10 to determine whether the triangle connected to that edge in the triangle mesh 150 can be added to the list. Consequently, each edge represents an edge from which the triangle list can be "grown".

The selection at step S9-8 between the two longest edges to assign one as the front edge and one as the back edge is arbitrary since "front" and "back" are merely used as labels to distinguish between the two longest edges.

By selecting the two longest edges as "growth" edges at step S9-8, the shortest edge of the first triangle is defined to be the triangle base, with the result that the triangle has the largest height available for the triangle (because the height of the triangle would be reduced if a longer edge was defined to be the base of the triangle). As will become apparent from the description of subsequent processing, by defining the height of the first triangle to be the largest available height, the average height of the resulting triangle list is increased, which provides advantages when triangles are defined in the rectangle 172 of the texture coordinate map 170 at step S7-6. More particularly, it provides the advantage that the geometric shape of each triangle is distorted less, and also the advantage that less padding is required in the texture coordinate map.

At step S9-10, triangle list generator 80 attempts to "grow" the current triangle list by adding triangles which are connected to the front and back edges of the list in the triangle mesh 150 until no further triangles can be added because the resulting list would not satisfy the required geometric shape distortion and length criteria.

FIG. 10 shows the processing operations performed by triangle list generator 80 at step S9-10.

Referring to FIG. 10, at step S10-2, triangle list generator 80 selects the next "growth" triangle in the triangle list and selects the growth edge thereof as a candidate edge.

The first time step S10-2 is performed, the first triangle inserted into the list at step S9-6 is selected as the "growth" triangle. Thus, referring to FIG. 11a by way of example, triangle 200 is selected. One of the front and back edges of the first triangle 200 defined at step S9-8 is then selected as the candidate edge. In this embodiment, the front edge 202 is selected.

At step S10-4, triangle list generator 80 determines whether the triangle sharing the candidate edge with the "growth" triangle remains in the "pool" of triangles comprising triangles in the triangle mesh 150 which have not yet been allocated to a triangle list.

Figure 11A:
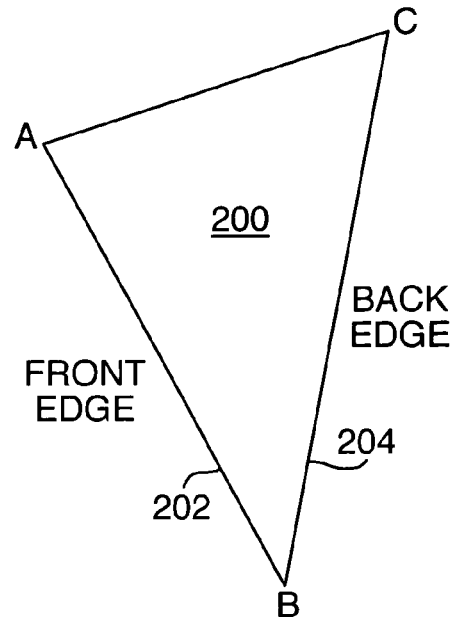
Figure 11B:
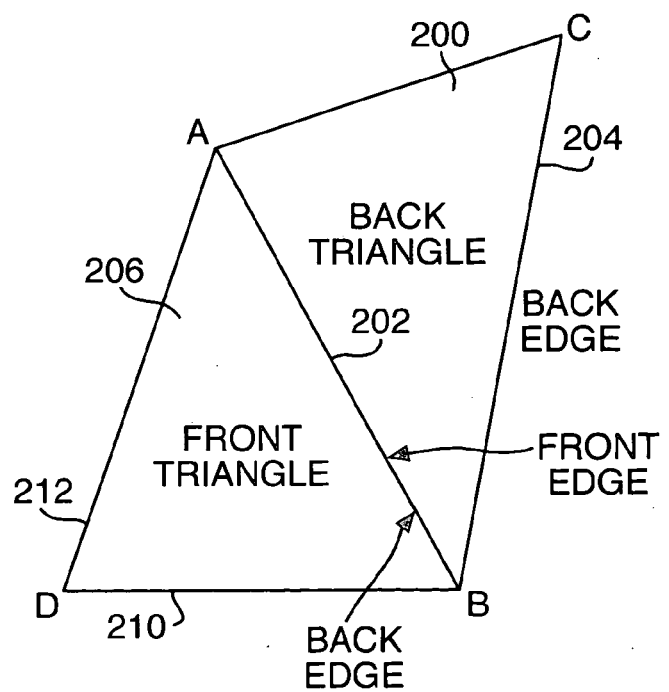
Figure 11C:
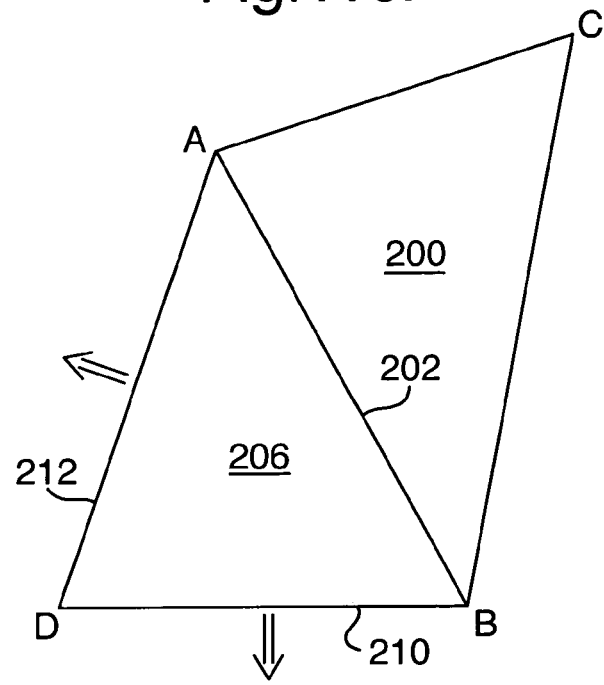

Thus, referring to the example in FIG. 11b, triangle list generator 80 determines whether triangle 206 is present in the "pool" of triangles (because triangle 206 shares candidate edge 202 with triangle 200).

If it is determined at step S10-4 that the triangle sharing the candidate edge is no longer in the triangle "pool", then processing proceeds to step S10-14, at which triangle list generator 80 records a failure in its attempt to grow the current triangle list.

On the other hand, if it is determined at step S10-4 that the triangle sharing the candidate edge remains in the triangle "pool", then processing proceeds to step S10-6, at which triangle list generator 80 selects the triangle as a candidate triangle. Thus, referring to the example in FIG. 11b, triangle 206 is selected as the candidate triangle at step S10-6.

At step S10-8, triangle list generator 80 tests the two edges of the candidate triangle which are not the candidate edge, to identify which of the two edges is the best edge for subsequent growth of the triangle list and labels the identified edge as a "front" or "back" edge as required. Thus, referring to the example in FIG. 11c, edges 210 and 212 are tested.

Before describing the processing carried out at step S10-8 in detail, an overview of the processing will be given to assist understanding.

As explained previously, when step S7-6 is performed to define triangles in the texture coordinate map 170, the rectangle 172 of the texture coordinate map is divided into strips 173-179, and triangles corresponding to those in the triangle lists generated at step S7-4 are defined within the strips or sub-strips therein. More particularly, referring to the example shown in FIGS. 12a and 12b, a triangle 200' is defined corresponding to triangle 200 in the example of FIGS. 11a to 11d, and a triangle 206' is defined corresponding to the triangle 206. Each vertex of each triangle in a list is defined to lie on one of the parallel lines 214, 216 defining the edges of a strip or sub-strip.

Because the vertices of each triangle lie on the strip edges 214, 216 in this embodiment, each triangle list generated at step S7-4 in this embodiment must be only one triangle "wide". More particularly, referring to FIG. 11c again, if the triangle in triangle mesh 150 sharing edge 212 with triangle 206 is added to the list as well as the triangle in the triangle mesh 150 sharing edge 210 with triangle 206, then the resulting list is more than one triangle "wide" because it is not possible to define the triangles between the two strip edges 214, 216 with each vertex of each triangle lying on the strip edges 214, 216.

Consequently, the processing at step S10-8 selects one, and only one, of the non-candidate edges of the candidate triangle as a "growth" edge. To determine which non-candidate edge to select, the processing at step S10-8 tests the two non-candidate edges to determine the one thereof which will act as the best "growth" edge.

Referring to FIGS. 12a and 12b, when triangle 200' is defined within a strip or sub-strip of the rectangle 172 of texture coordinate map 170 at step S7-6, the triangle is defined such that the two "growth" edges thereof (that is the edge between vertices A and B, and the edge between vertices B and C—corresponding to edges 202 and 204 in triangle 200) are defined to extend between the strip edges 214, 216. The non-growth edge (that is edge AC) lies along one of the strip edges (edge 214 in FIGS. 12a and 12b). Consequently, the selection from triangle 206 of the edge 210 or 212 as the growth edge will determine how the triangle 206' corresponding to triangle 206 is defined in the strip or sub-strip at step S7-6.

More particularly, referring to FIG. 12a, if edge AD is selected as the "growth" edge at step S10-8, then, in the corresponding triangle 206' generated at step S7-6, edge AD will extend between the two strip edges 214, 216, while edge BD will lie along one of the strip edges (strip edge 216 in the example of FIG. 12a).

On the other hand, referring to FIG. 12b, if edge 210 (that is, edge BD) is selected as the "growth" edge at step S10-8, then, when triangle 206' is defined at step S7-6, the edge BD thereof will extend between the two strip edges 214, 216, while the edge AD will lie along one of the strip edges (strip edge 214 in the example of FIG. 12b).

Clearly, therefore, the selection between the edge 210 and the edge 212 of triangle 206 to define a "growth" edge affects the shape of the resulting triangle 206' in the texture coordinate map 170, and therefore affects the difference in shape between the triangle 206 in the triangle mesh 150 and the triangle 206' (defining the geometric distortion of the shape of the triangle 206).

The processing performed by triangle list generator 80 at step S10-8 tests the two non-candidate edges 210 and 212 to determine the edge which will generate a triangle 206' in the texture coordinate map 170 which has the least geometric shape distortion from the original triangle 206 in the triangle mesh 150.

The way in which the triangle list generator 80 tests the two non-candidate edges of the candidate triangle to identify the best edge for subsequent growth will now be described in detail.

FIG. 13 shows the processing operations performed by triangle list generator 80 at step S10-8.

Referring to FIG. 13, at step S13-2, triangle list generator 80 selects the first non-candidate edge of the candidate triangle as the "growth" edge for subsequent growth of the triangle list, and at step S13-4, calculates the average height of the triangles in the triangle list when the candidate triangle is added to the triangle list with the first non-candidate edge defined to be the "growth" edge.

Figure 11D:
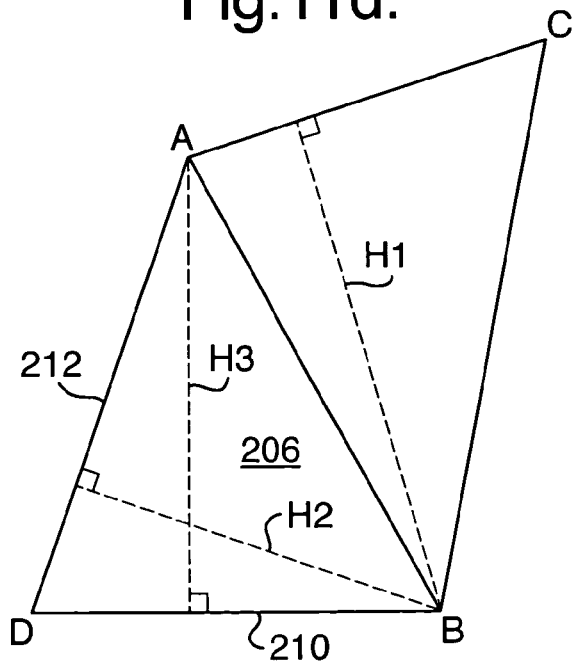

Referring to the example shown in FIG. 11d, if non-candidate edge 210 is selected as the "growth" edge at step S13-2, then the other non-candidate edge, that is edge 212, is defined to be the base of the triangle 206, with the result that the height of triangle 206 is H2.

In this embodiment, to perform the processing at step S13-4, triangle list generator 80 calculates the height of the candidate triangle using the following equation:

$$h = \frac{2S}{b} \quad (2)$$

where:
h is the height of the candidate triangle;
S is the area of the candidate triangle (stored at step S9-2);
b is the length of the base of the candidate triangle (stored at step S9-2).

Triangle list generator 80 then uses the calculated value to calculate a measure of the average height of the triangles in the list, including the candidate triangle, using the following equation:

$$h_{av} = \sum_i \frac{S_i h_i}{S_{total}} \quad (3)$$

where:
$h_{av}$ is the average height of the triangles in the list;
i is an index to the triangles in the list;
$h_i$ is the height of the "i"th triangle;
$S_i$ is the area of the "i"th triangle;
$S_{total}$ is the total area of all of the triangles in the list.

At step S13-6, triangle list generator 80 calculates a measure of the difference of the heights of the triangles in the triangle list. More particularly, in this embodiment, triangle list generator 80 calculates the variance, $\sigma^2$, of the heights of the triangles in the triangle list, including the candidate triangle, using the following equation:

$$\sigma^2 = \sum_i \frac{S_i}{S_{total}} [h_i - h_{av}]^2 \quad (4)$$

Triangle list generator 80 stores the calculated variance as a first variance.

At steps S13-8 to S13-12, triangle list generator 80 repeats the processing performed at step S13-2 to S13-6 but with the second non-candidate edge of the candidate triangle selected as the "growth" edge instead of the first non-candidate edge.

More particularly, at step S13-8, triangle list generator 80 selects the second non-candidate edge as the "growth" edge, and at step S13-10, calculates the average height of the triangle list when the candidate triangle is included therein with the second non-candidate edge defined as the "growth" edge.

Thus, referring again to the example shown in FIG. 11d, if non-candidate edge 212 is selected as the "growth" edge at step S13-8, then non-candidate edge 210 becomes the base of triangle 206 with the result that the height of triangle 206 (calculated using equation (2) above) is H3.

The average height of the triangles in the triangle list calculated at step S13-10 using equation (3) above is therefore different from the average height calculated at step S13-4.

At step S13-12, triangle list generator 80 calculates the variance of the heights of the triangles in the triangle list using equation (4) above, and stores the calculated variance as a second variance. Again, the variance calculated at step S13-12 will be different to the variance calculated at step S13-6 because the heights H2 and H3 in FIG. 11d are different.

At step S13-14, triangle list generator 80 tests whether the first variance stored at step S13-6 is less than or equal to the second variance stored in step S13-12.

If it is determined at step S13-14 that the first variance is less than or equal to the second variance, then, at step S13-16, triangle list generator 80 selects the first non-candidate edge as the best edge for subsequent growth because this edge results in a triangle list having the smallest difference between the heights of the triangles in the triangle list (as measured by the variance of the heights in this embodiment).

On the other hand, if it is determined at step S13-14 that the second variance is less than the first variance, then, at step S13-18, triangle list generator 80 selects the second non-candidate edge as the "growth" edge since, in this case, the second non-candidate edge results in a triangle list having the smallest difference between the heights of the triangles therein.

Following step S13-16 or step S13-18, processing proceeds to step S13-20, at which triangle list generator 80 labels the selected non-candidate edge as a front edge or a back edge.

More particularly, if the candidate edge selected at step S10-2 is a front edge, then the non-candidate edge selected at step S13-16 or S13-18 as the "growth" edge is also labelled as a front edge. Alternatively, if the candidate edge selected at step S10-2 is a back edge, then the non-candidate edge selected at step S13-16 or S13-18 as the "growth" edge is labelled as a back edge. In this way, referring to the example in FIG. 11b, because candidate edge 202 selected at step S10-2 is a front edge, then the non-candidate edge selected at step S13-16 or S13-18 (which in the example shown would be edge 212) would be labelled as a front edge at step S13-20.

Referring again to FIG. 10, at step S10-10 triangle list generator 80 tests whether, if the candidate triangle selected at step S10-6 is added to the triangle list, then triangles corresponding to those in the list can be defined within a strip or sub-strip of the texture coordinate map 170 such that the triangles satisfy acceptable geometric shape distortion and length criteria.

As explained above with reference to FIGS. 12a and 12b, when the processing at step S7-6 is performed to define the triangles for a given triangle list in a strip or sub-strip of the texture coordinate map 170, a corresponding triangle for each triangle in the list is defined to lie between the two parallel strip edges 214, 216. The processing performed at step S10-10 determines whether, when the corresponding triangles are defined in this way, the resulting triangles in the texture coordinate map 170 satisfy acceptable distortion and length criteria.

FIG. 14 shows the processing operations performed by triangle list generator at step S10-10.

Referring to FIG. 14, at step S14-2, triangle list generator 80 identifies the edges of the triangles in the triangle list for which the corresponding edges will lie along the top edge 214 of the strip in the texture coordinate map 170, and identifies the edges of the triangles in the triangle list which will lie along the bottom edge 216 of the strip in the texture coordinate map 170.

More particularly, referring again to the example shown in FIGS. 11 and 12, the edge AC of triangle 200 is the base of triangle 200, and accordingly the edge AC of the corresponding triangle 200' in the texture coordinate map 170 will lie along a strip edge in the texture coordinate map 170. Similarly, if edge 212 in triangle 206 is selected as a "growth" edge at step S10-8, then edge 210 will be the base of triangle 206, with the result that the edge BD of the corresponding triangle 206' in the texture coordinate map 170 will lie along a strip edge within the texture coordinate map 170.

At step S14-2, triangle list generator 80 therefore identifies bases of triangles which will result in corresponding edges lying along a top strip edge in the texture coordinate map 170 and identifies bases of triangles which will result in corresponding edges lying along the bottom strip edge in the texture coordinate map 170. It should be noted, however, that "top" and "bottom" are used here merely as labels to distinguish between the two strip edges 214, 216. This is because, as will be described later, when step S7-6 is performed, triangles for a given triangle list may be defined inverted within a strip or sub-strip. Thus, when step S14-2 is performed, it is not possible to determine which triangle bases will result in edges along the top strip edge 214 and which triangle bases will result in edges along the bottom strip edge 216. Instead, it is only possible to determine which triangle bases will result in edges on the same strip edge and which triangle bases will result in edges on the other strip edge.

At step S14-4, triangle list generator 80 calculates the total length of the edges lying along the first ("top") edge of the strip in the texture coordinate map 170 and the total length of the edges lying along the second ("bottom") edge of the strip in the texture coordinate map 170 when a respective triangle for each triangle in the current triangle list is defined within a strip or sub-strip which has a height equal to the current average height of the triangle list.

Thus, referring to the example shown in FIG. 12a, the height $H_s$ of the strip or sub-strip in the texture coordinate map 170 is defined to be equal to the current average height of the triangle list (calculated at step S13-4 or S13-10). Only edge AC lies along the strip edge 214 in the example shown, and accordingly the total length of the triangle edges lying along the strip edge 214 is the length of the edge AC. Similarly, only edge BD lies along the strip edge 216, and accordingly the total width of the triangle edges lying along the strip edge 216 is the length of edge BD.

In the example of FIG. 12b, on the other hand, both edge AC and edge AD lie on the strip edge 214, and therefore the total length of the triangle edges lying on the strip edge 214 is the sum of the length of edge AC and the length of edge AD. No triangle edges lie along the strip edge 216 in the example of FIG. 12b.

In this embodiment, triangle list generator 80 calculates the total length, $W_{Top}$, of the triangle edges lying along the first ("top") edge of the strip in accordance with the following equation:

$$W_{Top} = \beta \sum_{i \in T} \frac{2S_i}{h_{av}} \quad (5)$$

where:

T is the set of "top" edges identified at step S14-2;
$S_i$ is the area of the "i"th triangle;
$h_{av}$ is the average height of the triangle list;
$\beta$ is the scaling factor calculated at step S9-3.

Similarly, in this embodiment, triangle list generator 80 calculates the total length, $W_{Bottom}$, of the triangle edges lying along the second ("bottom") edge of the strip using the following equation:

$$W_{Bottom} = \beta \sum_{i \in B} \frac{2S_i}{h_{av}} \quad (6)$$

where:

B is the set of "bottom" edges identified at step S14-2.

At step S14-6, triangle list generator 80 tests whether the total length of the "top" edges (that is, the length of the edges lying along the first edge of the strip in the texture coordinate map 170) and the total length of the "bottom" edges (that is, the length of the edges lying along the other edge of the strip in the texture coordinate map 170) are both less than or equal to the width of the rectangle 172 of the texture coordinate map 170. This processing is carried out to ensure that, when step S7-6 is performed, a respective triangle can be defined for each triangle in the triangle list within a strip across the width of the rectangle 172 so that the triangles within the strip do not extend beyond the boundaries of the rectangle 172. Consequently, the processing performed at step S14-6 comprises processing to determine whether the triangles in the triangle list satisfy a predetermined length criterion.

If it is determined at step S14-6 that the addition of the candidate triangle results in either the total top length or the total bottom length being greater than the width of the rectangle 172, then processing proceeds to step S14-8, at which triangle list generator 80 records that the required length criterion has not been satisfied. Processing then returns to step S10-14 in FIG. 10.

On the other hand, if it is determined at step S14-6 that both the total top length and the total bottom length are less than or equal to the width of the rectangle 172, then triangle list generator 80 carries out further processing at steps S14-10 to S14-16 to determine whether the triangles in the triangle list have geometric properties such that, when the processing at step S7-6 is performed, the corresponding triangles defined in the strip or sub-strip of the texture coordinate map 170 will have shapes geometrically distorted beyond an acceptable level. As will be apparent from later description, the processing performed at steps S14-10 to S14-16 also has the advantage of reducing the volume of padding that needs to be included in the texture coordinate map 170 between the triangles of different triangle lists.

More particularly, at step S14-10, triangle list generator 80 tests whether the difference between the total top length calculated at step S14-4 in accordance with equation (5) above and the total bottom length calculated at step S14-4 in accordance with equation (6) above is less than or equal to a threshold value.

More particularly, in this embodiment, triangle list generator 80 determines whether the following inequality holds:

$$|W_{Top} - W_{Bottom}| \leq T \times h_{av} \quad (7)$$

where:

T is a constant, which is set to a value between 1 and 2 in this embodiment

If it is determined at step S14-10 that the inequality in equation (7) above does not hold (such that the difference between $W_{Top}$ and $W_{Bottom}$ is greater than the product of T and $h_{av}$) then processing proceeds to step S14-12, at which triangle list generator 80 determines that the first geometric property criterion (indicative of the shape distortion that will occur to the triangles in texture coordinate map 170) is not satisfied, and processing returns to step S10-14.

On the other hand, if it is determined at step S14-10 that the inequality in equation (7) does hold, then triangle list generator 80 determines that the first geometric property criterion is satisfied.

As explained above, when step S7-6 is performed, the top triangle edges in a list will result in edges lying along one boundary edge of the strip in a texture coordinate map (for example boundary edge 214 in the example of FIGS. 12a and 12b) and the bottom edges of the triangles in the list will result in edges lying along the other boundary edge of the strip (for example edge 216).

Consequently, by performing processing at step S14-10 in the way described above, triangle list generator 80 ensures that the triangles in the list have shapes which fit together such that, when step S7-6 is performed, the corresponding triangles in the texture coordinate map 170 do not have shapes significantly distorted because the edges of the triangles lying between the strip boundary edges 214, 216 are forced to lie at an angle closer to parallel to the strip boundary edges as a result of a large difference between the length of the edges lying along the top boundary edge of the strip and the length of the edges lying along the bottom boundary edge of the strip. In addition, it ensures that the shape distortion of the triangles in the next list to be defined in the strip is not increased. This is because, as will be explained below, the front edge of the front triangle in the next list is defined to be parallel to the back edge of the back triangle in the preceding list, with the result that a large difference between the lengths of the top and bottom edges of the triangles in a list will reduce the angle that the front edge of the front triangle in the next list is forced to make with the top and bottom strip edges (that is, it increases the amount that the front edge of the first triangle deviates way from being perpendicular to the top and bottom strip edges) and thereby increase the shape distortion of the triangles in the next list. Further, as will be apparent from later description, by carrying out the processing at step S14-10 to prevent the difference between the top and bottom edges of the triangle list exceeding a threshold, the volume of padding required in the texture coordinate map 170 is reduced.

If it is determined at step S14-10 that the inequality in equation (7) holds, then triangle list generator 80 carries out processing to determine whether a second geometric property criterion is satisfied based on the difference in heights of the shortest triangle in the list and the tallest triangle in the list. Again, the geometric property tested is indicative of the shape distortion that will occur to the triangles in texture coordinate map 170.

More particularly, at step S14-14, triangle list generator 80 calculates the ratio of the height of shortest triangle in the list to the height of the tallest triangle in the list, and at step S14-16 determines whether the ratio is within a threshold value.

More particularly, in this embodiment, triangle list generator 80 determines whether the following inequality holds:

$$\frac{h_{min}}{h_{max}} \geq R \tag{8}$$

where:
- $h_{min}$ is the height of the shortest triangle in the triangle list;
- $h_{max}$ is the height of the tallest triangle in the triangle list;
- R is a threshold value, which is set to ⅔ in this embodiment.

If it is determined at step S14-16 that the inequality in equation (8) above is not satisfied (that is $h_{min}/h_{max}$ is greater than the threshold value R) then processing proceeds to step S14-18, at which triangle list generator 80 determines that the second geometric property criterion is not fulfilled, and processing returns to step S10-14.

On the other hand, if it is determined at step S14-16 that the inequality in equation (8) does hold, then the triangles in the triangle list have passed the length criterion test at step S14-6, the first shape distortion test at step S14-10 and the second shape distortion test at step S14-16. Consequently, processing proceeds to step S14-20, at which triangle list generator 80 determines that all of the length and shape distortion criteria are satisfied, and processing returns to step S10-12.

By performing the processing at steps S14-14 and S14-16 in the way described above, triangle list generator 80 ensures that each triangle list comprises triangles of sufficiently similar height that, when step S7-6 is performed, the shapes of the corresponding triangles in the texture coordinate map 170 will not be distorted significantly. This is because the processing prevents large differences between the heights of triangles in a given list, which would result in significant shape distortion because each triangle in the list is defined to have the same height in the texture coordinate map so that the shapes would have to be distorted to equalise the heights.

Referring again to FIG. 10, if processing returns from step S14-20, then at step S10-12, triangle list generator 80 adds the candidate triangle selected at step S10-6 to the current triangle list. The candidate triangle is added to the list as the front triangle of the list if the "growth" edge selected at step S10-2 was the front edge of the triangle list, and is added to the triangle list as the back triangle thereof if the "growth" edge selected at step S10-2 was the back edge of the triangle list. In addition, triangle list generator 80 stores the average height of the triangles in the list (calculated at step S13-4 or S13-10), calculates and stores the un-scaled total length of the "top" edges (that is $W_{Top}/\beta$) and the un-scaled total length of the "bottom" edges (that is $W_{Bottom}/\beta$) using the lengths previously calculated at step S14-4 for the list, and removes the triangle from the "pool" of triangles remaining to be allocated to a triangle list.

FIG. 15 shows an example of the format of data defining a triangle list containing a plurality of triangles generated as a result of the processing at steps S10-2 to S10-12.

Referring to FIG. 15, data entry 220 defines the front triangle in the triangle list, data entry 230 defines a second triangle in the triangle list, and data entry 240 defines the back triangle in the triangle list. Each data entry 220, 230, 240 comprises:

- data identifying a triangle in the triangle mesh 150 by means of a unique identification number (ID);
- data defining the area "A" of the triangle;
- data defining the lengths L1, L2, L3, of the three edges of the triangle;
- data defining the front edge of the triangle by means of an edge number; and
- data defining the back edge of the triangle by means of an edge number.

Referring to FIG. 16, each triangle in the triangle mesh 150 is defined by three vertices V1, V2, V3, which are defined in a predetermined order for the triangle in a conventional way. Consequently, again in a conventional way, the edge between the vertices V1 and V2 is defined to be edge 1 (E1), the edge between vertices V2 and V3 is defined to be edge 2 (E2) and the edge between vertices V3 and V1 is defined to be edge 3 (E3).

Consequently, the edge numbers used in the data structures 220, 230, 240 to define the front edge and the back edge of each triangle comprise one of the edge numbers E1, E2, E3.

Referring again to FIG. 10, after step S10-12 has been performed, processing returns to step S10-2. The processing described above is then repeated to select a further growth triangle in the triangle list, to identify a further candidate triangle and to test whether the further candidate triangle can be added to the current triangle list.

As explained previously, in this embodiment, when step S10-2 is performed for the first time, the first triangle in the triangle list is selected as the "growth" triangle and the front edge of the first triangle is selected as the "growth" edge. When step S10-2 is performed for the second time, the first triangle is again selected as the "growth" triangle but the back edge of the first triangle is now selected as the "growth" edge. When step S10-2 is performed for the third time, the front triangle in the triangle list (which may now not be the first triangle but a further triangle added to the triangle list) is selected as the "growth" triangle and the front edge of the front triangle is selected as the "growth" edge. Similarly, when step S10-2 is performed for the fourth time, the back triangle of the triangle list is selected as the "growth" triangle and the back edge thereof is selected as the "growth" edge. Consequently, each growth triangle selected at step S10-2 comprises a triangle in the triangle list having two edges to which no triangles in the list are connected (that is, the front or back triangle in the list) and the selection comprises selecting the front and back edges of the triangle list as the current "growth" edge in an alternating manner.

Referring again to step S10-14, triangle list generator 80 records a failure for the attempt to add the candidate triangle to the current triangle list if it is determined at step S10-4 that the triangle having the candidate edge no longer remains in the triangle "pool", or if processing returns from step S10-10 via step S14-8, S14-12 or S14-18.

Following step S10-14, triangle list generator 80 determines at step S10-16 whether failures have been recorded at step S10-14 for consecutive attempts to add a candidate triangle to the triangle list.

If it is determined at step S10-16 that consecutive failures have been recorded, then an attempt to add a triangle to the front edge of the triangle list has failed and an attempt to add a triangle to the back edge of the triangle list has failed, and therefore no further triangles can be added to the current triangle list.

On the other hand, if it is determined at step S10-16 that consecutive failures have not been recorded at step S10-14, then it may still be possible to add triangles to the current triangle list, and processing returns to step S10-2.

It should be noted that, if an attempt to add a triangle to say the front edge of the triangle list results in a failure being recorded at step S10-14 because the triangle list fails the shape distortion test at step S14-10 or S14-16, but a triangle is added to the back edge of the triangle list on the next iteration of the processing, then it may subsequently be possible to add a triangle to the front edge of the triangle list (even though a failure had previously been recorded when the triangle list contained fewer triangles). This is because the addition of each triangle to the triangle list changes the lengths and heights used in the shape distortion tests at step S14-10 and S14-16.

Consequently, as described above, steps S10-2 to S10-16 are repeated until consecutive front and back failures are detected at step S10-16.

Referring again to FIG. 9, following step S9-10 described above, triangle list generator 80 determines at step S9-12 whether any triangles remain in the triangle "pool" to be allocated to a triangle list.

Steps S9-4 to S9-12 are repeated until each triangle in the triangle "pool" has been allocated to a triangle list.

In this way, each triangle in the triangle mesh 150 is allocated to a triangle list, although one or more of the triangle lists may contain only a single triangle.

At step S9-14, triangle list generator 80 tests the generated triangle lists using predetermined concatenation criteria to identify lists that can be concatenated, and concatenates the identified lists.

Because the triangle within each triangle list comprise triangles which are connected in the triangle mesh 150, when step S7-6 is performed, the corresponding triangles in the texture coordinate map 170 can be defined without padding between them. However, padding is required in the texture coordinate map 170 between the triangles from two different triangle lists. Accordingly, the processing in step S9-14 is carried out to try to increase the number of triangles in each triangle list thereby reducing the requirement for padding in the texture coordinate map 170.

FIG. 17 shows the processing operations performed at step S9-14.

Referring to FIG. 17, at step S17-2, triangle list generator 80 sorts the triangle lists previously generated at steps S9-4 to S9-12 into an order defined by the number of triangles in each list.

At step S17-4, triangle list generator 80 selects the next shortest list (that is, the triangle list with the fewest triangles therein) as a selected list. On the first iteration of step S17-4, the selected list is likely to be a list containing a single triangle.

At step S17-6, triangle list generator 80 selects the next shortest triangle list from those remaining as a candidate list.

At step S17-8, triangle list generator 80 determines whether the front or back edge of the candidate list selected at step S17-6 is the same as the front or back edge of the selected list selected at step S17-4.

If it is determined at step S17-8 that the front edge of the candidate list is not the same as the front or back edge of the selected list, and that the back edge of the candidate list is not the same as the front or back edge of the selected list, then the front triangle of the candidate list does not share a growth edge with either the front or back triangle of the selected list in the triangle mesh 150, and similarly the back triangle in the candidate list does not share a growth edge with either the front triangle or the back triangle of the selected list in the triangle mesh 150. Accordingly, the selected list and candidate list are not suitable for concatenation, and processing proceeds to step S17-10.

At step S17-10, triangle list generator 80 determines whether there are any lists remaining to be tested as a candidate list and, if there are, processing returns to step S17-6. On the other hand, if it is determined at step S17-10 that no lists remain to be tested as a candidate list, then proceeds to step S17-18.

When it is determined at step S17-8 that the front triangle of the candidate list shares a growth edge with the front or back triangle of the selected list in the triangle mesh 150, or that the back triangle in the candidate list shares a growth edge with the front or back triangle of the selected in the triangle mesh 150, then processing proceeds to step S17-12, at which triangle list generator 80 tests the selected list and candidate list to determine, if they were concatenated, whether the resulting concatenated list would satisfy required length and geometric property criteria.

The processing performed at step S17-12 is the same as the processing performed at step S10-10, which was described above with reference to FIG. 14. More particularly, steps S14-2 to S14-6 are performed with reference to the concatenated list to determine at step S14-6 whether the concatenated list will fit within the width of the rectangle 172 of the texture coordinate map 170. Steps S14-10 to S14-16 are then performed with reference to the concatenated triangle list to determine whether the concatenated triangle list satisfies the two geometric property criteria. However, the thresholds used in the tests at step S14-10 and step S14-16 are relaxed compared to the thresholds used when step S10-10 is performed, thereby to allow lists to be concatenated even if they do not meet the more strict thresholds used at step S10-10. More particularly, when step S14-10 is performed as part of the processing at step S17-12, the value of the constant "T" in equation (7) above is set to the value originally used in equation (7) at step S10-10 plus 0.25 (that is, the original value is increased by 0.25), and the threshold value "R" in equation (8) is set to ½ when the processing in step S14-16 is performed as part of the processing step S17-12.

If it is determined at step S17-12 that the concatenated list resulting from the concatenation of the selected list and candidate list does not satisfy the length criterion and relaxed geometric property criteria, then processing returns to step S17-10, at which triangle list generator 80 determines whether any lists remain to be tested as a candidate list.

On the other hand, if it is determined at step S17-12 that the concatenated list resulting from the selected list and candidate list does satisfy the length and relaxed geometric property criteria, then processing proceeds to step S17-14, at which triangle list generator 80 concatenates the selected list and candidate list. In addition, triangle list generator 80 calculates and stores the average height of the concatenated list, and calculates and stores the un-scaled total length of the "top" edges of the concatenated list (that is $W_{Top}/\beta$) and the un-scaled total length of the "bottom" edges of the concatenated list (that is $W_{Bottom}/\beta$) using the lengths previously calculated at step S14-4 when step S17-12 is performed.

At step S17-16, triangle list generator 80 removes the selected list and candidate list from the length-sorted lists, and adds the concatenated list to the length-sorted lists in the correct length position therein (that is, in the position determined by the number of triangles in the concatenated list).

At step S17-18, triangle list generator 80 determines whether any lists remain to be tested as a selected list and, if any such list does remain, then processing returns to step S17-4 to select the shortest remaining list as a selected list. It should be noted that, when the processing returns to step S17-4, the previous list selected as a selected list at step S17-4 is not re-selected as a new selected list if no concatenation was possible.

Steps S17-4 to S17-18 are repeated until no further lists remain to be tested as a selected list.

At step S17-20, triangle list generator 80 determines whether the total number of triangle lists has changed since last tested at this step.

If it is determined in step S17-20 that the total number of lists has changed, then processing returns to step S17-4, and all of the triangle lists become available for selection as a selected list again.

Steps S17-4 to S17-20 are repeated until it is determined at step S17-20 that there has been no change in the number of triangle lists since the test was last performed.

As a result of this processing, triangle list generator 80 concatenates triangle lists to generate longer triangle lists, where the resulting longer lists satisfy the required length and relaxed geometric property criteria indicative of the shape distortion that will occur to the triangles in texture coordinate map 170.

Referring again to FIG. 7, the processing at step S7-4 to generate triangle lists is now complete, and processing proceeds to step S7-6 to define triangles in the texture coordinate map 170 using the generated triangle lists.

FIG. 18 shows the processing operations performed by triangle list packer 90 at step S7-6.

Referring to FIG. 18, at step S18-2, triangle list packer 90 sorts the triangle lists previously generated at step S7-4 according to the respective average height of each triangle list (previously stored as part of the processing at step S10-12 or step S17-14).

At step S18-4, triangle list packer 90 assigns a rectangular strip across the width of the rectangle 172 of the texture coordinate map 170, and defines triangles in the strip corresponding to the triangles in one or more triangle lists. In this way, a strip 173-179 of the texture coordinate map 170 is generated.

FIG. 19 shows the processing operations performed by triangle list packer 90 at step S18-4.

Referring to FIG. 19, at step S19-2, triangle list packer 90 selects the next tallest triangle list from the sorted lists generated at step S18-2 as a selected list (this being the triangle list of tallest average height the first time step S19-2 is performed).

At step S19-4, triangle list packer 90 scales the top and bottom lengths of the selected triangle list using the current scaling factor.

When step S19-4 is performed as part of the first iteration of the processing at step S18-4, the current scaling factor is the scaling factor β calculated at step S9-3. Accordingly, triangle list packer 90 reads the un-scaled top and bottom lengths for the selected triangle list previously stored at step S10-12 or step S17-14, and multiplies the read lengths by the scaling factor β calculated at step S9-3.

At step S19-6, triangle list packer 90 determines whether the scaled lengths calculated at step S19-4 are greater than the width remaining in the current strip of the texture coordinate map 170 in which triangles are to be defined.

Before describing the processing performed at step S19-6 in detail, an overview of the processing will be given.

The first time step S19-6 is performed, the full width of the rectangle 172 is available because no triangles have been defined in the current strip at this stage. In addition, as a result of the processing previously performed at step S14-6, the triangle list selected at step S19-2 is guaranteed to fit within the width of the rectangle 172 (otherwise the length criterion tested at step S14-6 when each triangle list is generated will not be fulfilled).

On the other hand, referring to the example shown in FIG. 20a, when the processing is performed at step S19-6 for a second or subsequent time, triangles and padding will have been defined in the strip (labelled as strip 173 in the example of FIG. 20a) to fill the first part 260 of the strip (the padding being defined in region 262 along the back edge of the back triangle in each triangle list, as will be described later). Consequently, only the part 270 of the strip 173 remains available to have triangles defined therein. The processing performed at step S19-6 therefore tests whether a respective triangle for each triangle in the triangle list selected at step S19-2 can be defined to fit within the part 270.

Figure 20A:
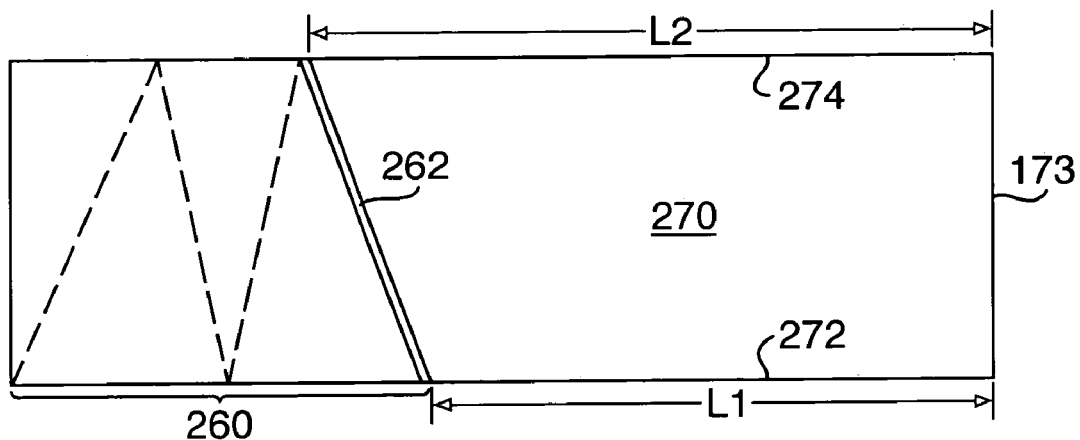

It will be seen from FIG. 20a that the length L1 of the bottom strip edge 272 of the part 270 is different from the length L2 of the top strip edge 274 of the part 270.

Figure 20B:
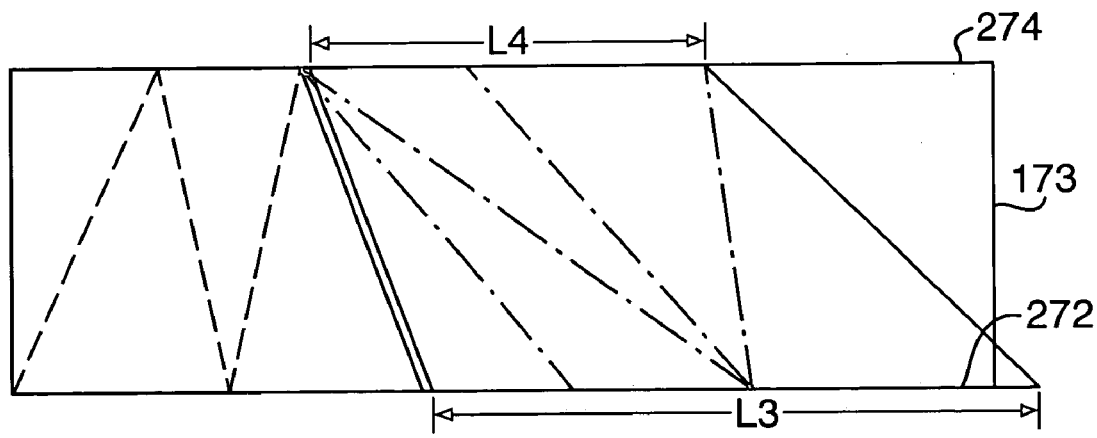

Referring to FIG. 20b, therefore, a triangle list selected at step S19-2 having a scaled bottom length L3 such that L3>L1 and a scaled top length L4 such that L4<L2, will not fit within the area 270 (as shown in FIG. 20b) if the corresponding triangles are defined in the area 270 such that the top edges of the triangles in the list (having length L4) lie along the top edge 274 of the area 270 and the bottom edges of the triangles in the list (having length L3) lie along the bottom edge 272 of the area 270.

Figure 20C:
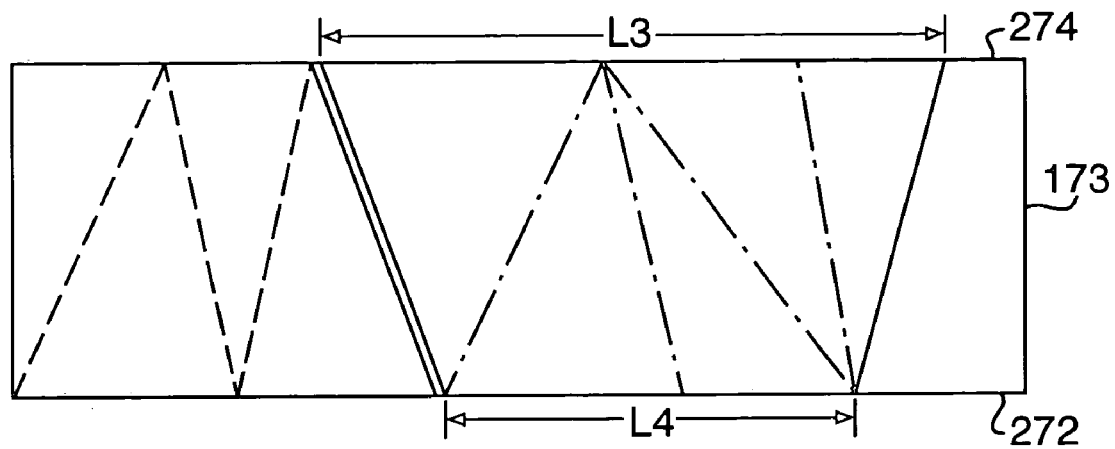

On the other hand, referring to FIG. 20c, if the scaled bottom length L3 of the triangle list is such that L3≦L2 and the scaled top length L4 of the triangle list is such that L4≦L1, then the triangle list will fit within the area 270 if the triangles in the list are inverted and defined in the area 270 such that the triangle edges having the length L3 lie along the strip edge 274, and the triangle edges having the length L4 lie along the strip edge 272.

Consequently, for the reasons above, the processing carried out at step S19-6 tests each triangle list in both orientations (that is, in the original orientation and in the inverted orientation) to determine whether the triangle list will fit within the area remaining to be filled in the current strip.

FIG. 21 shows the processing operations performed by triangle list packer 90 at step S19-6.

Referring to FIG. 21, at step S21-2, triangle list packer 90 determines the top and bottom widths of the area remaining in the strip (that is, in the example of FIG. 20a, the length L2 of edge 274 and the length L1 of edge 272 of the remaining area 270). It should be noted that the determination of the top and bottom widths at step S21-2 takes account of the padding already defined in the current strip (that is, the padding in region 262 of part 260 in the example of FIG. 20a).

At step S21-4, triangle list packer 90 compares the scaled top width of the triangle list previously calculated at step S19-4 with the remaining top width in the strip, and compares the scaled bottom width of the triangle list (also calculated at step S19-4) with the bottom width remaining in the strip. Triangle list packer 90 records that the triangle list will fit in its original orientation within the area remaining within the strip if the top width of the triangle list is less than or equal to the top width of the remaining strip and also that the bottom width of the triangle list is less than or equal to the bottom width remaining in the strip, otherwise triangle list packer 90 records that the triangle list will not fit in its original orientation.

At step S21-6, triangle list packer 90 compares the scaled top width of the triangle list with the bottom width remaining in the strip, and compares the scaled bottom width of the triangle list with the top width remaining in the strip. Triangle list packer 90 records that the triangle list will fit in its inverted orientation within the area remaining in the strip if the top width of the triangle list is less than or equal to the bottom width remaining in the strip and also that the bottom width of the triangle list is less than or equal to the top width remaining in the strip, otherwise triangle list packer 90 records the triangle list will not fit in its inverted orientation.

At step S21-8, triangle list packer 90 determines whether the triangle list will fit into the area of the remaining strip in both orientations (that is, whether it was determined both at step S21-4 and step S21-6 that the triangle list will fit within the remaining area).

If it is determined at step S21-8 that the triangle list will fit into the remaining area in both orientations, then triangle list packer 90 performs processing at steps S21-10 to S21-14 to select which of the two possible orientations of the triangles in the list result in the smallest geometric distortion to the shape of the corresponding triangles when they are defined in the strip 173, and also the smallest geometric distortion to the shape of the triangles from the next successive triangle list to be defined in the strip 173.

Figure 20D:
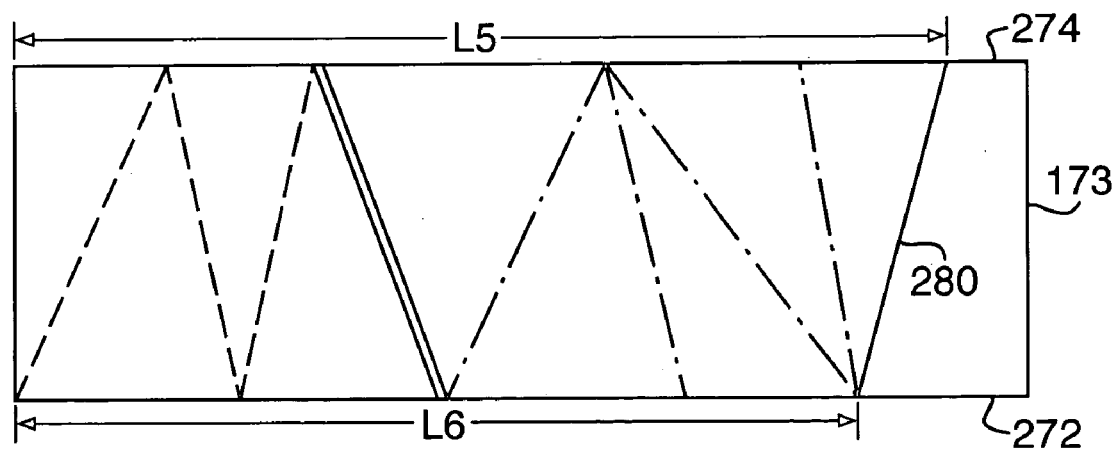

More particularly, at step S21-10, triangle list packer 90 calculates, if the triangle are defined in the remaining area 270 in an inverted orientation, the difference between the total top length of all triangles in the strip (including triangles and padding previously defined—that is, triangles and padding in the area 260 in the example of FIGS. 20a to 20c) and the total bottom length of all triangles in the strip. To illustrate this, reference will be made to FIG. 20d, which corresponds to FIG. 20c (although it is noted that, for the example shown, the processing at step S21-8 would actually determine that the triangle list does not fit in the strip 173 both ways up for the reasons explained above with reference to FIGS. 20b and 20c). Referring to FIG. 20d, triangle list packer 90 calculates the difference between the total top length L5 of all triangles and padding and the total bottom length L6 of all triangles and padding.

At step S21-12, triangle list packer 90 repeats the calculation performed at step S21-10 but this time with the triangles from the triangle list defined in the area 270 in their non-inverted orientation (which, for the reasons explained previously, will result in different total top and bottom lengths L5 and L6).

At step S21-14, triangle list packer 90 compares the values calculated at steps S21-10 and S21-12, and selects the orientation of the triangle list which gives the smallest difference between the total top and bottom lengths of all the triangles in the strip. This selection selects the orientation of the triangle list which results in the final, unconnected edge of the triangles in the area 270 (that is, edge 280 in the example of FIG. 20d) closest to perpendicular to the edges of the strip 272 and 274. As explained previously with reference to the processing performed at step S14-10, this reduces the geometric distortion to the triangles when they are defined in the current strip. In addition, it also reduces the geometric distortion to the triangles in the next list to be packed within the current strip because the first edge of the first triangle in the next list is defined to be parallel to the back edge 280 of the current list. Further, as will be explained later, it reduces the volume of padding which needs to be defined along edge 280 to separate the back triangle in the current list from the front triangle in the next list defined in strip 173.

At step S21-16, triangle list packer 90 determines whether the inverted orientation for the triangle list was selected at step S21-14.

If it is determined at step S21-16 that the inverted orientation was selected at step S21-14, then processing proceeds to step S21-18, at which triangle list packer 90 processes the data defining the triangle list to invert the orientation of the triangles in the list. Since the respective normal vector of each inverted triangle must point in the same direction as the normal vector of the non-inverted triangle, the processing performed at step S21-8 also reverses the order of the triangles in the list while maintaining the connectivity of the triangles so that the back triangle in the list becomes the front triangle, and vice versa.

On the other hand, if it is determined at step S21-16 that the non-inverted orientation was selected at step S21-14, then the processing at step S21-18 is omitted.

Returning again to step S21-8, if it is determined that the triangle list does not fit into the remaining area 270 of the current strip both ways up, then processing proceeds to step S21-20.

At step S21-20, triangle list packer 90 determines whether the processing performed at step S21-4 and S21-6 determined that the triangle list will fit into the remaining area 270 of the current strip at all.

If it is determined at step S21-20 that the triangle list will not fit into the remaining strip area in any orientation, then processing proceeds to step S21-2, at which triangle list generator 90 returns a result that the triangle list does not fit within the remaining area of the strip.

On the other hand, if it is determined at step S21-20 that the triangle list does fit in the area 270 remaining within the current strip, then processing proceeds to step S21-16, which has already been described above.

Referring again to FIG. 19, if it is determined in the processing at step S19-6 that the scaled top and bottom lengths of the selected triangle list are such that the triangle list will not fit within the remaining area of the strip, then processing proceeds to step S19-7, at which triangle list packer 90 determines whether there are any triangle lists remaining to be tested.

If it is determined at step S19-7 that at least one triangle list remains to be tested, then processing returns to step S19-2 to select and test the next tallest triangle list.

On the other hand, if it is determined at step S19-6 that the scaled top and bottom lengths of the selected triangle list are such that the triangle list will fit within the remaining area of the current strip, then processing proceeds to step S19-8.

At step S19-8, triangle list packer 90 scales the average height of the selected list using the current scaling factor and assigns a strip having the calculated scaled height across the remaining width of the rectangle 172.

On the first iteration of the processing at step S19-8, the current scaling factor will be the scaling factor $\beta$ previously calculated at step S9-3, and accordingly the scaled average height of the selected list is calculated by determining the product of the average height of the triangle list and the value of $\beta$.

In addition, the first time the processing at step S19-8 is performed, a strip having the calculated scaled height is defined across the full width of the rectangle 172 (whereas, on subsequent iterations, the processing comprises defining a sub-strip within an existing strip across the width of the remaining empty part of the strip, as will be described below).

At step S19-10, triangle list packer 90 defines a respective triangle for each triangle in the selected list to occupy the first part of the current strip (for example part 260 in the example shown in FIG. 20*a*) and removes the triangle list from the "pool" of triangle lists for which triangles are to be defined in the texture coordinate map 170.

FIG. 22 shows the processing operations performed at step S19-10.

Referring to FIG. 22, at step S22-2, triangle list packer 90 defines vertices for the front edge of the front triangle in the triangle list so that the vertices lie on the top and bottom boundary edges of the strip. When this processing is performed the first time step S19-10 is performed, the vertices for the front edge of the front triangle are defined to lie along the left-hand side of the rectangle 172 as well as on the top and bottom boundary edges of the current strip. Thus, referring to the example shown in FIG. 23*a*, vertex 300 is defined lying on the left-hand side of rectangle 172 and the top boundary edge 274 of the current strip 173, and vertex 302 is defined lying on the left-hand side of rectangle 172 as well as the bottom boundary edge 272 of the current strip 173. In this way, the front triangle is defined to be a right-angled triangle.

At step S22-4, triangle list packer 90 calculates the position of the next vertex along the top or bottom boundary edge 272, 274 of the current strip 173. Thus, the first time step S22-4 is performed, triangle list packer 90 calculates the position of the third vertex of the front triangle in the list (the positions of the first two vertices having been defined in step S22-2).

More particularly, in this embodiment, the triangles are defined within each strip 173 so that they have the same relative area as the triangles in the triangle mesh 150. Consequently, each triangle in the texture coordinate map 170 has an area equal to the area of the corresponding triangle in the triangle mesh 150 scaled in accordance with the current scaling factor.

Therefore, to calculate the position of the next vertex at step S22-4, triangle list packer 90 determines whether the next vertex is part of a top edge in the triangle list (in which case the vertex will lie on the top boundary edge 274) or whether the next vertex is part of a bottom edge in the triangle list (with the result that the vertex will lie on the bottom boundary edge 272). Triangle list packer 90 then calculates the distance of the next vertex along the identified strip boundary edge 272, 274 from the previous vertex on the same boundary edge in accordance with the following equation:

$$\text{Distance} = \frac{2S_i}{H_s} \quad (9)$$

where:

$S_i$ is the area of the triangle currently being defined in the strip to which the vertex belongs;

$H_s$ is the height of the strip assigned at step S19-8 (corresponding to the scaled average height of the triangle list).

Having calculated the distance in this way, triangle list packer 90 defines a new vertex in the texture coordinate map 170 at a position along the appropriate boundary strip edge 272, 274 having the calculated distance away from the previous vertex on that boundary edge. The triangle defined in strip 173 as a result has the same area as the corresponding triangle in the triangle mesh 150 (scaled in accordance with the current scaling factor).

Thus, referring to the example shown in FIG. 23*a*, assuming the next vertex will define a top edge in the triangle list (so that the next vertex will lie on the top boundary edge 274 of the strip 173), triangle list packer 90 calculates the distance d1 of the position of the next vertex away from the previous vertex 300 on the upper boundary edge 274 in accordance with equation (9), and defines a new vertex 304 at the calculated position. As a result, a triangle 306 is defined in the strip 173 of the texture coordinate map 170 corresponding to the first triangle in the current triangle list. The triangle 306 has the same area (subject to the current scaling factor) as the corresponding triangle in the triangle mesh 150, but has a different geometric shape compared to the corresponding triangle in the triangle mesh 150.

At step S22-6, triangle list packer 90 determines whether there is another triangle in the current triangle list. Steps S22-4 and S22-6 are repeated until each triangle in the current triangle list has been processed in the way described above.

Thus, referring to the example shown in FIG. 23*b*, the second time the processing at step S22-4 is performed (that is, for the second triangle in the current triangle list) triangle list packer 90 calculates the distance d2 in accordance with equation (9) above and defines vertex 308. As a result, a second triangle 310 is defined in the strip 173 corresponding to the second triangle in the current triangle list.

Similarly, referring to FIG. 23*c*, on subsequent iterations of the processing at step S22-4, triangle list packer 90 defines vertices 308, 312 and 316, thereby defining triangles 314 and 318 in the strip 173.

It will be seen, therefore, that each triangle defined within a strip for the triangles in a given triangle list has the same height (that is the strip height—because each triangle vertex lies on the top or bottom edge of the strip), even though the triangles in the list do not necessarily have the same height in the triangle mesh 150.

When it is determined at step S22-6 that a triangle has been defined in the strip 173 for each triangle in the triangle list, then processing proceeds to step S22-8 at which triangle list packer 90 adds padding along the back edge of the back triangle defined in the strip 173.

Thus, referring to the example shown in FIG. 23*c*, triangle list packer 90 adds padding along the edge defined by the vertices 312 and 316 to generate a region 262 of padding in the strip 173.

The padding is required because, when an image of the triangle mesh 150 is generated using texture mapping of texture data from the texture map 188, each pixel in the image maps to a quadrilateral in the texture map 188 from which the texture data is extracted to define the value of the pixel. However, the quadrilateral in the texture map may cover more than one texel and the boundaries of the quadrilateral may not lie along texel boundaries (with the result that the quadrilateral boundaries split texels). Accordingly, a pixel in the image which is intended to represent the surface detail from a single triangle in the triangle mesh 150 may actually map to a quadrilateral in the texture map 188 which covers texels (or parts thereof) for a number of triangles in the texture coordinate map 170 which correspond to different triangles in the triangle mesh 150. In this case, the texture data extracted from the texture map 188 to define the pixel value will comprise texture data from triangles corresponding to different triangles in the texture map 188 and not just the single triangle in the texture map 188 which the pixel is intended to represent. If the different triangles in the texture map 188 from which texture data is extracted for a given pixel in the image correspond to triangles which are adjacent in the triangle mesh 150, then the value of the pixel calculated using the extracted texture data is likely to be substantially correct. This is because the texture data for triangles adjacent in the triangle mesh 150 is likely to be substantially similar. On the other hand, if texture data for a given pixel is extracted from different triangles in the texture map 188 which correspond to separated triangles in the triangle mesh 150, then the texture data for the different triangles may be substantially different resulting in an incorrect pixel value and leading to artefacts in the displayed image.

For this reason, padding is defined in the texture coordinate map 170 between triangles from different triangle lists, but is not defined between the respective triangles of a given triangle list (because the triangles in each triangle list define triangles which are connected in the triangle mesh 150).

In this embodiment, triangle list packer 90 adds the padding for each row of texels within the strip 173 in turn. More particularly, for any given row of texels, triangle list packer 90 determines the intersection of the back edge of the back triangle (that is, the edge defined by vertices 312 and 316 in the example of FIG. 23c) with the texels of the row and then assigns padding to the row comprising each "partial" texel on the row (that is, each texel which is split because it is intersected by the back edge of the back triangle) together with two complete texels after the last partial texel intersected by the edge. These texels are identified as padding so that no other triangle can be defined in subsequent processing to occupy the texels. As will be explained later, when texture data is allocated to the triangles in the texture coordinate map, each "partial" texel (that is, a texel intersected by the back edge of the back triangle in a list) is assigned texture data based upon the texture data in the occupied part of the texel, and the empty padding texel adjacent the last partial texel on the same row thereof is assigned texture data the same as the texture data in the last partial texel. The next empty padding texel on the row (that is the second texel away from the last partial texel) is assigned texture data the same as the texture data in the third texel away from the last partial texel—that is, the texel which is the first texel in the front triangle of the next list. In this way, the texture data for the back triangle in a list is extended forward to fill the first complete empty texel in each row in the padding region, and the texture data for the front triangle in a list is extended back to fill the second complete empty texel on each row in the padding region.

It will therefore be appreciated that the closer the edge defined by vertices 312 and 316 is to being perpendicular to the boundary edges 272, 274 of the strip 173, the less padding is required. This is because the number of "partial" texels on each row will decrease the closer the back edge of the back triangle is to being perpendicular to the boundary edges of the strip. Consequently, the steps performed at step S14-10 and S14-16 to determine whether a triangle is added to a triangle list (that is, the test to determine whether the difference between the top edge length and the bottom edge length of the triangle list is less than or equal to a threshold, and the test to ensure that the heights of the individual triangles in the list are sufficiently similar) assist in reducing the volume of padding added at step S22-8. In addition, the volume of padding is reduced as a result of the processing performed at step S9-8 to assign the two longest edges of the first triangle in a triangle list as the "growth" edges. This is because a selection of the shortest triangle edge as a "growth" edge would reduce the average height of the triangle list, thereby reducing the height of the strip 173 and forcing each "growth" edge to lie between the two boundary edges 272, 274 of the strip 173 at an angle further away from the perpendicular (in order to maintain the area of each triangle).

Referring again to FIG. 22, at step S22-10, triangle list packer 90 removes the triangle list from the "pool" of triangle lists remaining to be processed.

Referring again to FIG. 19, following the definition of a respective triangle in the current strip of the texture coordinate map 170 for each triangle in the current triangle list, at step S19-12, triangle list packer 90 determines whether the current strip is full or whether part of the strip remains unfilled.

If it is determined at step S19-12 that the current strip is not full, processing proceeds to step S19-14, at which triangle list packer 90 determines whether any triangle lists remain in the "pool" of triangle lists to be processed.

If it is determined at step S19-14 that at least one triangle list remains to be processed, then processing proceeds to step S19-16, at which triangle list packer 90 selects the next tallest triangle list in the "pool" as a selected list.

At step S19-18, triangle list packer 90 performs processing if the current strip to be filled is a secondary sub-strip, to determine if the average height of the selected triangle list is greater than the height of the sub-strip.

If it is determined at step S19-18 that the average height of the selected triangle list is greater than the height of the strip then triangles for the selected triangle list are not defined in the strip, and instead processing returns to step S19-14 to determine whether any other triangle lists remain to be tested.

As a result of processing at step S19-18, the average height of a triangle list is never reduced to define triangles corresponding to the triangles in the list within the strip (although, as will be explained below, the average height may be increased to define triangles corresponding to the triangles in the list in the strip). If it is determined at step S19-18 that the current strip is not a secondary sub-strip, or if it is determined that the current strip is a secondary sub-strip but the average height of the selected triangle list is not greater than the height of the strip, then processing proceeds to step S19-20.

At step S19-20, triangle list packer 90 determines whether the average height of the selected triangle list is greater than or equal to a predetermined fraction of the height of the current strip. More particularly, in this embodiment, triangle list packer 90 determines whether the average height of the selected triangle list is greater than or equal to three quarters of the height of the current strip.

If it is determined at step S19-20 that the average height of the selected triangle list is greater than or equal to the predetermined fraction of the strip height, then processing proceeds to step S19-22, at which triangle list packer 90 calculates the lengths of the top and bottom edges of the selected triangle list when the triangles in the list are scaled to have the same height as the current strip.

More particularly, this processing is carried out using equations (5) and (6) described above with the value of $h_{av}$ set to be equal to the height of the current strip.

At step S19-24, triangle list packer 90 determines whether the top and bottom lengths calculated at step S19-22 are such that the selected triangle list will fit within the width of the remaining space in the current strip. The processing performed at step S19-24 is the same as the processing performed at step S19-6. This processing was described above with reference to FIG. 21, and accordingly will not be described again here.

If it is determined at step S19-24 that the top and bottom lengths of the selected triangle list are such that the triangle list will not fit within the width of the area remaining in the current strip, then processing proceeds to step S19-30, to determine whether any further triangle lists remain to be processed.

On the other hand, if it is determined at step S19-24 that the top and bottom lengths of the selected triangle list are such that the triangle list will fit within the width of the area remaining in the current strip, then processing proceeds to step S19-26, at which triangle list packer 90 defines a respective triangle for each triangle in the selected list in the next part of the current strip, and removes the triangle list from the pool.

The processing performed at step S19-26 is the same as the processing performed at step S19-10. This processing was described above with reference to FIG. 22, and accordingly will not be described again here. However, it is noted that the front triangle defined in the strip will have a front edge parallel to the back edge of the preceding padding region (region 262 in the example of FIG. 23c) and will therefore be substantially parallel to the back edge of the back triangle in the preceding triangle list (that is, the edge defined by vertices 312 and 316 in the example of FIG. 23c). Consequently, the first triangle will not be a right-angled triangle unless the back edge of the back triangle in the preceding list is perpendicular to the strip edges 272, 274.

At step S19-28, triangle list packer 90 determines whether the current strip is full and, if it is not, processing proceeds to step S19-30 to determine whether any triangle lists remain to be processed.

If it is determined at step S19-30 that at least one triangle list remains to be processed, then processing returns to step S19-16 to select the next tallest triangle list in the pool as a selected list.

On the other hand, if it is determined at step S19-28 that the current strip is full, or if it is determined at step S19-30 that no triangle list remains to be processed, then processing returns to step S19-34 (to be described below).

As a result of performing the processing at steps S19-22 to S19-26 in the way described above, triangles are defined in the current strip such that each triangle has a height equal to the height of the strip. When triangles are defined for two or more triangle lists, then padding is provided between the triangles of the different lists.

Returning to step S19-20, if it is determined that the average height of the selected triangle list is less than the predetermined fraction of the strip height, then processing proceeds to step S19-32.

At step S19-32, triangle list packer 90 splits the current strip into primary and secondary sub-strips which, at this point in the processing, are of undefined height. Triangle list packer 90 adds the secondary sub-strip to a last-in-first-out secondary pool, and selects the primary sub-strip as the current strip to be filled. Processing then returns to step S19-4.

Steps S19-4 to S19-32 are then repeated. Because the processing performed at these steps has already been described above, it will not be described again here. However, it is noted that the effect of the processing performed at step S19-8 when the current strip is a sub-strip is to define the height of the sub-strip (which remained undefined in the processing of step S19-32).

The result of the processing performed at step S19-20 (and subsequent steps) is that triangles are not defined in a strip of the texture coordinate map with a height extended beyond an allowable threshold (set by the threshold value used in the test at step S19-20), and instead a sub-strip of reduced height is created in which the triangles are defined. This assists in preventing the shapes of the triangles in the texture coordinate map 170 being distorted significantly compared to the shapes of the triangles in the triangle mesh 150.

FIGS. 23d to 23g extend the example shown in FIGS. 23a to 23c to illustrate the processing performed at steps S19-32 and S19-4 to S19-20 when it is determined at step S19-20 that the average height of the selected triangle list is less than the predetermined fraction of the strip height.

Referring to FIG. 23d, the processing at step S19-32 splits the current strip 173 into a primary sub-strip 330 and a secondary sub-strip 340. The height of each sub-strips 330, 340 is undefined at this stage, and secondary sub-strip 340 is added to a last-in-first-out secondary pool. The primary sub-strip 330 becomes the current strip to be filled.

Referring to FIG. 23e, in the example shown, the subsequent processing at steps S19-4 and S19-6 determines that the triangle list selected at step S19-16 will fit within the primary sub-strip 330. Accordingly, at step S19-8, the height $h_p$ of the primary sub-strip 330 is defined to be equal to the average height of the selected list.

At step S19-10, triangles are defined in the primary sub-strip 330 to fill a trapezoid area 350 and padding is defined in the region 360 along the back face of the back triangle in the area 350.

The processing at steps S19-12 and S19-14 determines that the current strip (that is sub-strip 330) is not full because area 370 remains to be filled, and determines that further triangle-lists remain to be tested.

At step S19-16, the next tallest triangle list is selected as a triangle list and then the processing at step S19-18 determines that the current strip as not a secondary sub-strip, so the processing to step S19-20.

Referring to FIG. 23f, in the example shown, the processing at step S19-20 determines that the average height of the selected triangle list is less than the predetermined fraction of the strip height, with the result that processing proceeds to step S19-32, at which a further primary sub-strip 380 is defined together with a further secondary sub-strip 390. Secondary sub-strip 390 is added to the last-in-first-out secondary pool, and primary sub-strip 380 becomes the current strip to be filled, with processing then returning to step S19-4.

Referring to FIG. 23g, in subsequent processing at steps S19-4 to S19-10, triangles are defined in sub-strip 380 to fill a trapezoid area 400, together with padding in region 410 along the back face of the back triangle in the trapezoid area 400.

The processing at step S19-12 then determines that the current strip 380 is not full because area 420 remains to be filled.

However, subsequent processing determines that area 420 is so small that no remaining triangle lists will fit within the area 420. Consequently, the processing of all current primary sub-strips is complete, and only secondary sub-strips remain to be processed.

The processing performed by triangle list packer 90 to deal with secondary sub-strips will now be described. This processing comprises steps S19-34 to S19-42, and will be illustrated with reference to the example shown in FIGS. 23h to 23j.

Processing proceeds to step S19-34 if it is determined at step S19-7 that no triangle lists remain to be tested, if it is determined at step S19-12 that the current strip is full, if it is determined at step S19-14 that no triangle lists remain to be tested, if it is determined at step S19-28 that the current strip is full, or if it is determined at step S19-30 that no triangle lists remain to be tested.

At step S19-34, triangle list packer 90 determines whether at least one secondary sub-strip is present in the last-in-first-out secondary pool. In the example shown in FIGS. 23a to 23g, secondary sub-strips 390 and 340 are present in the secondary pool, with secondary sub-strip 390 being the last secondary sub-strip in the pool.

If it is determined at step S19-34 that at least one secondary sub-strip is present in the secondary pool, then processing proceeds to step S19-36, at which triangle list packer 90 removes the last secondary sub-strip from the secondary pool (that is, secondary sub-strip 390 in the example of FIG. 23), and the removed secondary sub-strip becomes the current strip to be filled.

At step S19-38, triangle list packer 90 adds padding along the top edge of the primary sub-strip corresponding to the secondary sub-strip which is now the current strip to be filled. Thus, referring to the example in FIG. 23h, triangle list packer 90 adds padding in the region 430 along the top edge of the primary sub-strip 380.

In this embodiment, the region 430 has a thickness of two texels plus part of a texel if the top edge of primary sub-strip 380 splits texels in the width direction (that is, the part of the texel lying above the top edge of the primary sub-strip 380).

At step S19-40, triangle list packer 90 calculates the height of the current strip to be filled (that is, secondary sub-strip 390 in the example of FIG. 23h). The height is calculated by subtracting the height of the primary sub-strip 380 (defined at step S19-8) together with the thickness of the padding in region 430 (defined at step S19-38) from the height of the primary sub-strip 330.

Processing then proceeds to step S19-16, at which the next tallest triangle list remaining in the pool of triangle lists to be tested is selected as a selected list.

Subsequent processing is the same as the processing described above, and accordingly will not be described again here, but will be illustrated by way of example with reference to FIGS. 23i and 23j.

Referring to FIG. 23i, subsequent processing defines triangles and padding in the secondary sub-strip 390 to fill a trapezoid area 440, leaving an area 450 within secondary sub-strip 390 to be filled.

It is then determined that area 450 is so small that no remaining triangle lists will fit within the area 450. As a result, the processing of secondary sub-strip 390 is now complete.

Referring to FIG. 23j, therefore, at step S19-34, secondary sub-strip 340 is selected as the remaining secondary sub-strip to be processed, and at step S19-36 becomes the current strip to be filled.

At step S19-38, padding is added in the region 460 along the top of primary sub-strip 330.

The secondary sub-strip 340 is then processed in the way already described (and not illustrated in the example of FIG. 23j).

Referring again to step S19-34, when it is determined that no secondary sub-strips remain to be processed, then the definition of triangles within the overall strip 173 of the texture coordinate map 170 is complete, and processing proceeds to step S19-42.

At step S19-42, triangle list packer 90 adds padding along the top boundary of the overall strip 173. This is because, as will be described below, a further strip will be defined on top of strip 173 and triangles will be defined within the further strip corresponding to triangles in different triangle lists from those in strip 173.

In this embodiment, the padding defined along the top of each strip at step S19-42 has a height of two texels plus part of a texel if the top edge of the strips splits texels in the texture coordinate map (the part comprising the part of the split texel lying above the top edge of the strip 173).

Referring again to FIG. 18, at step S18-6, triangle list packer 90 determines whether any triangle lists remain for which triangles have not been defined in the texture coordinate map. Steps S18-4 and S18-6 are repeated, each time to define a new strip in the texture coordinate 170 with triangles therein, until a respective triangle has been defined in the texture coordinate map 170 for each triangle in the triangle mesh 150.

At step S18-8, triangle list packer 90 determines whether the height of the generated texture coordinate map exceeds the available height within the rectangle 172.

More particularly, referring to the example shown in FIG. 24, the processing at step S19-8 assigns strips across the rectangle 172 without regard to the height of the rectangle 172. As a result, it is likely that the total height H2 of the strips within the texture coordinate map 170 will be greater than the height H1 of the rectangle 172.

If the height H2 is greater than the height H1, then some of the triangles in the texture coordinate map will lie outside the rectangle 172, and further processing is required to ensure that all triangles fit within the rectangle 172.

In this embodiment, as will now be described, this processing comprises re-defining all of the triangles in the texture coordinate map 170 using a different scaling factor until all the triangles fit within the rectangle 172.

More particularly, if it is determined at step S18-8 that the height of the generated texture coordinate map H2 exceeds the available height of that H1 of the rectangle 172, then processing proceeds to step S18-10, at which triangle list packer 90 updates the current scaling factor in accordance with the following equation:

$$\beta' = \beta \frac{H1}{H2} \qquad (10)$$

where:
β' is the updated scaling factor;
β is the current scaling factor;
H1 is the height of the rectangle 172;
H2 is the current height of the texture coordinate map 170.
Following step S18-10, processing returns to step S18-4.

Steps S18-4 to S18-10 are then repeated until it is determined at step S18-8 that the height of the generated texture coordinate map H2 is less than or equal to the height of rectangle 172. It has been found in practice that, typically, four or five iterations of step S18-4 to S18-10 are required in order to achieve a texture coordinate map 170 having a height H2 less than or equal to the height H1 of the rectangle 172.

At this stage, the generation of the texture coordinate map 170 is complete. Referring again now to FIG. 7, at step S7-8, texture data allocator 110 processes the data stored in input texture data store 60 to allocate texture data from the input images 160-166 to the triangles in the texture coordinate map 170 so as to generate data defining a texture map 188.

More particularly, in this embodiment, texture data allocator 100 performs processing in a conventional manner to select each triangle in the triangle mesh 150 in turn and to identify the image "i" from the input images 160-166 which is most front-facing to the selected triangle. That is, the input image is found for which the value n̂t.v̂i is largest, where n̂t is the triangle normal, and v̂i is the viewing direction for the "i"th image (defined by the input data defining the positions and orientations at which the images were recorded). This identifies the input image 160-162 in which the selected triangle has the largest projected area.

The selected triangle from the triangle mesh 150 is then projected into the identified input image, and the vertices of the projected triangle are used to define a triangle within the input image. The image data lying within the triangle in the input image is then allocated to the corresponding texels of the corresponding triangle in the texture coordinate map 170.

In addition, at step S7-8, texture data allocator 100 defines texture data for each padding texel in the texture coordinate map 170. As discussed previously, the padding texels on each row of texels within a padding region comprise "partial" texels (that is, each texel split by the back edge of the back triangle in the list preceding the padding region) together with two complete texels after the last "partial" texel on the row. At step S7-8, texture data allocator 110 allocates texture data to each "partial" texel based upon the texture data in the occupied part of the texel, and allocates texture data to the padding texel adjacent the last "partial" texel on the same row which is the same as the texture data in the last partial texel. Texture data allocator 110 allocates texture data to the next padding texel on the row (that is, the second texel away from the last "partial" texel on the row) so that the texture data is the same as the texture data in the third texel away from the last "partial" texel—that is, the texel which is the first texel in the front triangle of the next list. In this way, the texture data for the back triangle in the list preceding the padding region is extended forward to fill the first complete empty texel in each row in the padding region, and the texture data for the front triangle in the next list after the padding region is extended back to fill the second complete empty texel on each row in the padding region.

In the processing above, image data from only one input image 160-166 is allocated to any given triangle in the texture coordinate map 170. However, image data from more than one input image 160-166 may be allocated. For example, texture data allocator 110 may perform processing as described in co-pending UK Patent Applications 0026331.9 (GB-A-2369541) and 0026347.5 (GB-A-2369260), co-pending European Patent Application 01308441.3 (EP-A-1204073) and co-pending U.S. patent application Ser. No. 09/981,844 (U.S. 20020085748A1) the full contents of which are incorporated herein by cross-reference.

The result of performing the processing described above is a texture map 188 having therein a respective triangle for each triangle in the triangle mesh 150 and image data for each triangle in the texture map 188.

At step S7-10, central controller 20 controls output data interface 140 to output data defining the triangle mesh 150 and the texture map 188, for example as data stored on a storage medium 142 or as data carried by a signal 144.

Many modifications and variations can be made to the embodiment described within the scope of the claims.

For example, in the embodiment described above, data is input to processing apparatus 2 and stored at step S7-2 defining the positions and orientations at which the input images 160-166 were recorded. However, instead, processing apparatus 2 may calculate the positions and orientations of the input images, for example by carrying out processing as described in EP-A-0898245 or WO-A-01/39124.

In the embodiment described above, the input texture data allocated to the texture coordinate map 170 at step S7-8 to generate the texture map 188 comprises image data. However, other types of image data may be input and allocated to the texture coordinate map. For example, synthetic texture data (such as texture data drawn by a human artist) may be input and allocated to texture coordinate map 170.

In the embodiment described above, the input data includes texture data (that is, in the embodiment, input images 160-166 together with data defining the positions and orientations at which the input images were recorded), and processing is performed by processing apparatus 2 at step S7-8 to allocate texture data from the input texture data to each triangle in the texture coordinate map 170. However, instead, processing apparatus 2 may omit the processing at step S7-8 and output data defining the texture coordinate map 170. Processing may then be carried out by a separate apparatus to allocate texture data to the texture coordinate map 170 to generate a texture map 188.

In the embodiment above, at step S19-8, each strip in the texture coordinate map 170 is defined across the width of the rectangle 172. However, instead, each strip could be defined across the height of the rectangle 172.

In the embodiment described above, the processing performed at step S7-4 does not necessarily generate the longest triangle list that can be constructed from all of the triangles remaining in the "pool" of triangles available for allocation to the triangle list. More particularly, if a different triangle is selected as the first triangle, then a different list of different length might be constructed. Consequently, instead of starting a new list once the current list is complete, multiple lists may be constructed from the "pool" of triangles using a different triangle as the first triangle for each list. The lists constructed in this way may then be compared and the longest list (that is, the list having the most triangles) retained. If the total number of triangles in the "pool" is small, it is possible to perform this processing exhaustively, that is to construct all possible lists by using every triangle in the "pool" as the first triangle of a list. When the total number of triangles in the "pool" is large, however, exhaustive processing will require a considerable amount of processing resources and time. However, the number of triangles in the "pool" reduces as more lists are built (and therefore as more triangles are taken out of the "pool"). Consequently, the number of lists constructed could be increased as the number of triangles left in the "pool" decreases.

In the embodiment described above, the processing at step S10-2 to select the next "growth" triangle is carried out so that the front triangle in the list and the back triangle in the list are selected on alternate iterations at step S10-2. However, the "growth" triangle may be selected at step S10-2 in different ways. For example, step S10-2 may be performed so that the front triangle (or back triangle) is repeatedly selected at step S10-2 until it is determined at step S10-10 that the candidate triangle should not be added to the triangle list. Processing may then return to step S10-2 to select repeatedly the back triangle (or front triangle) in the list until it is again determined at step S10-10 that the candidate triangle should not be added to the triangle list. Other selection schemes are, of course, possible.

In the embodiment described above, processing is performed at steps S18-8 and S18-10 to perform repeated iterations of the processing at steps S18-2 to S18-6 until the height of the generated texture coordinate map is less than or equal to the height of the rectangle 172. However, if the height of the texture coordinate map is unimportant (that is, it is not required that all of the triangles fit within the rectangle 172), then the processing at steps S18-8 and S18-10 may be omitted.

In the embodiment described above, a 3D computer model comprising a triangle mesh 150 is processed to generate a texture coordinate map 170 and a texture map 188 comprising triangles. However, as will be understood by the skilled person, the processing may be readily modified to process a 3D computer model comprising a mesh of polygons other than triangles to generate a texture coordinate map and texture map made up of non-triangular polygons.

In the embodiment described above, processing is performed by a computer using processing routines defined by programming instructions. However, some, or all, of the processing could, of course, be performed using hardware.

The invention claimed is:

1. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:
   testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;
   generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and
   rendering an image of a three-dimensional computer model based on the texture coordinate map,
   wherein the triangles in the mesh are tested to generate the plurality of triangle lists such that each list identifies a sequence of connected triangles in the mesh satisfying at least one predetermined geometric criterion or identifying a single triangle in the mesh, with at least one list identifying a sequence of connected triangles,
   wherein the processing to test the triangles in the mesh to generate each triangle list comprises:
   selecting a triangle from the mesh which is not already part of a list as the first triangle in the list;
   selecting a triangle connected to the first triangle in the mesh as a candidate triangle;
   adding the candidate triangle to the triangle list if the resulting list satisfies the predetermined geometric criterion, otherwise not adding the candidate triangle to the list;
   identifying a triangle in the list which has two edges to which triangles are not connected in the list and selecting a triangle connected in the mesh to the identified triangle as a candidate triangle;
   adding the candidate triangle to the triangle list if the resulting list satisfies the predetermined geometric criterion, otherwise not adding the candidate triangle to the list;
   repeating the processing to select a candidate triangle and to add or not add the candidate triangle to the triangle list in dependence upon the predetermined geometric criterion until no further triangles can be added to the list.

2. A method according to claim 1, wherein the triangle selected as the first triangle in a list is the triangle of largest area from the triangles which are not already part of a list.

3. A method according to claim 1, wherein:
   a first edge of the first triangle is identified as a front edge of the triangle list and a second edge of the first triangle is identified as a back edge of the triangle list; and
   if not already part of a list, at least one of the triangle connected to the first edge in the mesh and the triangle connected to the second edge in the mesh is selected as a candidate triangle and tested for inclusion in the list, but the triangle connected in the mesh to the third edge of the first triangle is not selected as a candidate triangle and tested.

4. A method according to claim 3, wherein the edges of the first triangle identified as the front and back edges of the triangle list comprise the two longest edges of the first triangle.

5. A method according to claim 1, wherein:
   for each triangle added to a triangle list, the two edges of the triangle which are unconnected in the mesh to triangles already in the list are tested to select one of the unconnected edges as a growth edge for the triangle list and the other edge as a triangle base; and
   in the processing to select a candidate triangle, a triangle in the list which has two edges to which triangles are not connected in the list is selected as a growth triangle, and the triangle connected in the mesh to the growth edge of the growth triangle is selected as a candidate triangle, but the triangle connected in the mesh to the triangle base of the growth triangle is not selected as a candidate triangle.

6. A method according to claim 5, wherein the processing to test the two unconnected edges of each triangle added to a list to select one of the edges as a growth edge comprises:
   defining the first unconnected edge as the growth edge and the second unconnected edge as the triangle base, and calculating a predetermined measure of the difference between the heights of the triangles in the triangle list;
   defining the second unconnected edge as the growth edge and the first unconnected edge as the triangle base, and calculating the predetermined measure of the difference between the heights of the triangles in the triangle list;
   and selecting as the growth edge the unconnected edge which gives the predetermined measure indicating the smallest difference in the triangle heights.

7. A method according to claim 6, wherein the predetermined measure of the difference between the heights of the triangles comprises the variance of the triangle heights.

8. A method according to claim 1, wherein a candidate triangle is added to a list only if the heights of the triangles in the resulting list satisfy a predetermined geometric criterion.

9. A method according to claim 8, wherein a candidate triangle is added to a list only if the height of the shortest triangle in the list and the height of the tallest triangle in the list satisfy a predetermined relationship.

10. A method according to claim 1, wherein a candidate triangle is added to a list only if the lengths of predetermined edges of the triangles in the resulting list satisfy a predetermined geometric criterion.

11. A method according to claim 10, wherein a candidate triangle is added to a list only if the difference between the length of the triangle edges defining the top edge of the sequence of triangles in the list and the length of the triangle edges defining the bottom edge of the sequence of triangles in the list is less than a threshold.

12. A method according to claim 1, wherein a candidate triangle is added to a list only if the resulting list satisfies at least one predetermined length criterion in addition to the at least one geometric criterion.

13. A method according to claim 12, wherein a candidate triangle is added to a list only if the length of the triangle edges defining the top edge of the sequence of triangles in the list and the length of the triangle edges defining the bottom edge of the sequence of triangles in the list will both fit within the two-dimensional area of the texture coordinate map.

14. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to generate the plurality of triangle lists comprises:

generating a plurality of initial triangle lists, with each initial triangle list comprising a sequence of connected triangles in the mesh satisfying at least one first predetermined geometric criterion or comprising a single triangle in the mesh, with at least one list comprising a sequence of connected triangles;

testing the initial triangle lists to identify lists which can be concatenated to generate concatenated triangle lists, with each concatenated triangle list comprising a sequence of connected triangles in the mesh satisfying at least one second predetermined geometric criterion; and concatenating the identified triangle lists, wherein the processing to test the initial triangle lists to identify lists which can be concatenated comprises:

sorting the initial triangle lists by length; and testing the lists in length order, starting with the shortest list.

15. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to generate the plurality of triangle lists comprises:

generating a plurality of initial triangle lists, with each initial triangle list comprising a sequence of connected triangles in the mesh satisfying at least one first predetermined geometric criterion or comprising a single triangle in the mesh, with at least one list comprising a sequence of connected triangles;

testing the initial triangle lists to identify lists which can be concatenated to generate concatenated triangle lists, with each concatenated triangle list comprising a sequence of connected triangles in the mesh satisfying at least one second predetermined geometric criterion; and concatenating the identified triangle lists, wherein each second predetermined geometric criterion for a concatenated triangle list is the same as a first predetermined geometric criterion for an initial triangle list, but with a relaxed threshold allowing greater shape distortion.

16. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to define triangles in the two-dimensional area to generate the texture coordinate map comprises defining the triangles for each respective list in turn, wherein the triangles for the respective lists are defined in the two-dimensional space in an order determined by the respective average height of each triangle list.

17. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to define triangles in the two-dimensional area to generate the texture coordinate map comprises defining the triangles within a plurality of rectangular strips, each strip having the same length so that the plurality of rectangular strips with the triangles defined therein define the texture coordinate map, wherein the processing to define triangles in each rectangular strip comprises setting the height of the strip in dependence upon the average height of the triangles in a list to be packed into the strip.

18. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to define triangles in the two-dimensional area to generate the texture coordinate map comprises defining the triangles within a plurality of rectangular strips, each strip having the same length so that the plurality of rectangular strips with the triangles defined therein define the texture coordinate map, wherein the processing to define triangles in each rectangular strip comprises:

defining a respective triangle in the strip for each triangle in a first triangle list so that the defined triangles in the strip are in the sequential order defined by the first list;

testing a further triangle list to determine whether triangles defined therefor will fit in the area remaining within the strip;

defining a respective triangle in the strip for each triangle in the further triangle list if it is determined that the triangles will fit within the remaining area, otherwise testing another triangle list to determine whether triangles defined therefor will fit into the area remaining within the strip; and repeating the processing to test triangle lists and define triangles in the strip until the strip is full or until all triangle lists have been tested, wherein the processing to test each further triangle list to determine whether triangles defined therefor will fit in the area remaining within the strip comprises:

determining whether the heights of the triangles in the list and the height of the strip satisfy a predetermined relationship;

splitting the strip into two sub-strips in the height direction if the predetermined relationship is not satisfied, otherwise maintaining the strip; and testing whether triangles defined for the triangles in the list will fit within the area of a predetermined one the sub-strips or the maintained strip as the case may be, wherein the processing to determine whether the heights of the triangles in the list and the height of the strip satisfy a predetermined relationship comprises determining whether the average height of the triangles in the list is greater than a predetermined fraction of the strip height.

19. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to define triangles in the two-dimensional area to generate the texture coordinate map comprises defining the triangles within a plurality of rectangular strips, each strip having the same length so that the plurality of rectangular strips with the triangles defined therein define the texture coordinate map, wherein the processing to define triangles in each rectangular strip comprises:

defining a respective triangle in the strip for each triangle in a first triangle list so that the defined triangles in the strip are in the sequential order defined by the first list;

testing a further triangle list to determine whether triangles defined therefor will fit in the area remaining within the strip;

defining a respective triangle in the strip for each triangle in the further triangle list if it is determined that the triangles will fit within the remaining area, otherwise testing another triangle list to determine whether triangles defined therefor will fit into the area remaining within the strip; and repeating the processing to test triangle lists and define triangles in the strip until the strip is full or until all triangle lists have been tested, wherein the processing to test each further triangle list to determine whether triangles defined therefor will fit in the area remaining within the strip comprises:

determining whether the heights of the triangles in the list and the height of the strip satisfy a predetermined relationship;

splitting the strip into two sub-strips in the height direction if the predetermined relationship is not satisfied, otherwise maintaining the strip; and testing whether triangles defined for the triangles in the list will fit within the area of a predetermined one of the sub-strips or the maintained strip as the case may be, wherein, when a strip is split into two sub-strips, the strip is split to give the predetermined sub-strip a height determined in dependence upon the heights of the triangles in the list, wherein, when a strip is split, the strip is split to give the predetermined sub-strip a height equal to the average height of the triangles in the list.

20. A method, performed in a processing apparatus, of processing data defining a three-dimensional mesh of planar triangles representing the surface shape of a three-dimensional object, to generate data defining a texture coordinate map comprising a two-dimensional area in which triangles corresponding to the triangles from the mesh are defined, the method comprising:

testing the triangles in the mesh to generate a plurality of triangle lists, each triangle list identifying a sequence of connected triangles in the mesh or identifying a single triangle in the mesh, with at least one of the generated triangle lists identifying a sequence of connected triangles;

generating a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list; and rendering an image of a three-dimensional computer model based on the texture coordinate map, wherein the processing to define triangles in the two-dimensional area to generate the texture coordinate map comprises defining the triangles within a plurality of rectangular strips, each strip having the same length so that the plurality of rectangular strips with the triangles defined therein define the texture coordinate map, wherein the processing to define triangles in each rectangular strip comprises:

defining a respective triangle in the strip for each triangle in a first triangle list so that the defined triangles in the strip are in the sequential order defined by the first list;

testing a further triangle list to determine whether triangles defined therefor will fit in the area remaining within the strip;

defining a respective triangle in the strip for each triangle in the further triangle list if it is determined that the triangles will fit within the remaining area, otherwise testing another triangle list to determine whether triangles defined therefor will fit into the area remaining within the strip; and repeating the processing to test triangle lists and define triangles in the strip until the strip is full or until all triangle lists have been tested, wherein the processing to test whether triangles defined for the triangles in a triangle list will fit within an area comprises defining and testing triangles for the list inverted and non-inverted.

21. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:

a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the triangle list generator is operable to test the triangles in the mesh to generate the plurality of triangle lists such that each list identifies a sequence of connected triangles in the mesh satisfying at least one predetermined geometric criterion or identifying a single triangle in the mesh, with at least one list identifying a sequence of connected triangles, wherein the triangle list generator is operable to test the triangles in the mesh to generate each triangle list by:

selecting a triangle from the mesh which is not already part of a list as the first triangle in the list;

selecting a triangle connected to the first triangle in the mesh as a candidate triangle;

adding the candidate triangle to the triangle list if the resulting list satisfies the predetermined geometric criterion, otherwise not adding the candidate triangle to the list;

identifying a triangle in the list which has two edges to which triangles are not connected in the list and selecting a triangle connected in the mesh to the identified triangle as a candidate triangle;

adding the candidate triangle to the triangle list if the resulting list satisfies the predetermined geometric criterion, otherwise not adding the candidate triangle to the list;

repeating the processing to select a candidate triangle and to add or not add the candidate triangle to the triangle list in dependence upon the predetermined geometric criterion until no further triangles can be added to the list.

22. Apparatus according to claim 21, wherein the triangle list generator is operable to select the first triangle in a list by selecting the triangle of largest area from the triangles which are not already part of a list.

23. Apparatus according to claim 21, wherein the triangle list generator is operable to:

identify a first edge of the first triangle as a front edge of the triangle list and identify a second edge of the first triangle as a back edge of the triangle list; and select, if not already part of a list, at least one of the triangle connected to the first edge in the mesh and the triangle connected to the second edge in the mesh as a candidate triangle and test the selected triangle for inclusion in the list, and wherein the triangle list generator is arranged not to select as a candidate triangle and test the triangle connected in the mesh to the third edge of the first triangle.

24. Apparatus according to claim 23, wherein the triangle list generator is operable to identify the two longest edges of the first triangle as the front and back edges of the triangle list.

25. Apparatus according to claim 21, wherein the triangle list generator is operable to:
for each triangle added to a triangle list, test the two edges of the triangle which are unconnected in the mesh to triangles already in the list to select one of the unconnected edges as a growth edge for the triangle list and the other edge as a triangle base; and
select a candidate triangle by selecting a triangle in the list which has two edges to which triangles are not connected in the list as a growth triangle, and selecting the triangle connected in the mesh to the growth edge of the growth triangle as a candidate triangle, and wherein the triangle list generator is arranged not to select the triangle connected in the mesh to the triangle base of the growth triangle as a candidate triangle.

26. Apparatus according to claim 25, wherein the triangle list generator is operable to perform the processing to test the two unconnected edges of each triangle added to a list to select one of the edges as a growth edge by:
defining the first unconnected edge as the growth edge and the second unconnected edge as the triangle base, and calculating a predetermined measure of the difference between the heights of the triangles in the triangle list;
defining the second unconnected edge as the growth edge and the first unconnected edge as the triangle base, and calculating the predetermined measure of the difference between the heights of the triangles in the triangle list;
and selecting as the growth edge the unconnected edge which gives the predetermined measure indicating the smallest difference in the triangle heights.

27. Apparatus according to claim 26, wherein the predetermined measure of the difference between the heights of the triangles comprises the variance of the triangle heights.

28. Apparatus according to claim 21, wherein the triangle list generator is arranged to add a candidate triangle to a list only if the heights of the triangles in the resulting list satisfy a predetermined geometric criterion.

29. Apparatus according to claim 28, wherein the triangle list generator is arranged to add a candidate triangle to a list only if the height of the shortest triangle in the list and the height of the tallest triangle in the list satisfy a predetermined relationship.

30. Apparatus according to claim 21, wherein the triangle list generator is arranged to add a candidate triangle to a list only if the lengths of predetermined edges of the triangles in the resulting list satisfy a predetermined geometric criterion.

31. Apparatus according to claim 30, wherein the triangle list generator is arranged to add a candidate triangle to a list only if the difference between the length of the triangle edges defining the top edge of the sequence of triangles in the list and the length of the triangle edges defining the bottom edge of the sequence of triangles in the list is less than a threshold.

32. Apparatus according to claim 21, wherein the triangle list generator is arranged to add a candidate triangle to a list only if the resulting list satisfies at least one predetermined length criterion in addition to the at least one geometric criterion.

33. Apparatus according to claim 32, wherein the triangle list generator is arranged to add a candidate triangle to a list only if the length of the triangle edges defining the top edge of the sequence of triangles in the list and the length of the triangle edges defining the bottom edge of the sequence of triangles in the list will both fit within the two-dimensional area of the texture coordinate map.

34. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:
a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and
a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list,
wherein the triangle list generator is operable to generate the plurality of triangle lists by:
generating a plurality of initial triangle lists, with each initial triangle list comprising a sequence of connected triangles in the mesh satisfying at least one first predetermined geometric criterion or comprising a single triangle in the mesh, with at least one list comprising a sequence of connected triangles;
testing the initial triangle lists to identify lists which can be concatenated to generate concatenated triangle lists, with each concatenated triangle list comprising a sequence of connected triangles in the mesh satisfying at least one second predetermined geometric criterion; and
concatenating the identified triangle lists,
wherein the triangle list generator is operable to test the initial triangle lists to identify lists which can be concatenated by:
sorting the initial triangle lists by length; and
testing the lists in length order, starting with the shortest list.

35. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:
a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and
a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the triangle list generator is operable to generate the plurality of triangle lists by:

generating a plurality of initial triangle lists, with each initial triangle list comprising a sequence of connected triangles in the mesh satisfying at least one first predetermined geometric criterion or comprising a single triangle in the mesh, with at least one list comprising a sequence of connected triangles;

testing the initial triangle lists to identify lists which can be concatenated to generate concatenated triangle lists, with each concatenated triangle list comprising a sequence of connected triangles in the mesh satisfying at least one second predetermined geometric criterion; and concatenating the identified triangle lists, wherein the triangle list generator is operable to perform the concatenation tests such that each second predetermined geometric criterion for a concatenated triangle list is the same as a first predetermined geometric criterion for an initial triangle list, but with a relaxed threshold allowing greater shape distortion.

36. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:

a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the texture coordinate map generator is operable to define triangles in the two-dimensional area to generate the texture coordinate map by defining the triangles for each respective list in turn, wherein the texture coordinate map generator is operable to define the triangles for the respective lists in the two-dimensional space in an order determined by the respective average height of each triangle list.

37. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:

a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the texture coordinate map generator is operable to define triangles in the two-dimensional area to generate the texture coordinate map by defining the triangles within a plurality of rectangular strips, each strip having the same length so that the plurality of rectangular strips with the triangles defined therein define the texture coordinate map, wherein the texture coordinate map generator is operable to define triangles in each rectangular strip by setting the height of the strip in dependence upon the average height of the triangles in a list to be packed into the strip.

38. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:

a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the texture coordinate map generator is operable to define triangles in the two-dimensional area to generate the texture coordinate map by defining the triangles within a plurality of rectangular strips, each strip having the same length so that the plurality of rectangular strips with the triangles defined therein define the texture coordinate map, wherein the texture coordinate map generator is operable to define triangles in each rectangular strip by:

defining a respective triangle in the strip for each triangle in a first triangle list so that the defined triangles in the strip are in the sequential order defined by the first list;

testing a further triangle list to determine whether triangles defined therefor will fit in the area remaining within the strip;

defining a respective triangle in the strip for each triangle in the further triangle list if it is determined that the triangles will fit within the remaining area, otherwise testing another triangle list to determine whether triangles defined therefor will fit into the area remaining within the strip; and repeating the processing to test triangle lists and define triangles in the strip until the strip is full or until all triangle lists have been tested, wherein the texture coordinate map generator is operable to test each further triangle list to determine whether triangles defined therefor will fit in the area remaining within the strip by:

determining whether the heights of the triangles in the list and the height of the strip satisfy a predetermined relationship;

splitting the strip into two sub-strips in the height direction if the predetermined relationship is not satisfied, otherwise maintaining the strip; and testing whether triangles defined for the triangles in the list will fit within the area of a predetermined one of the sub-strips or the maintained strip as the case may be, wherein the texture coordinate map generator is operable to determine whether the heights of the triangles in the list and the height of the strip satisfy a predetermined relationship by determining whether the average height of the triangles in the list is greater than a predetermined fraction of the strip height.

39. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:

a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the texture coordinate map generator is operable to define triangles in the two-dimensional area to generate the texture coordinate map by defining the triangles within a plurality of rectangular strips, each strip having the same length so that the plurality of rectangular strips with the triangles defined therein define the texture coordinate map, wherein the texture coordinate map generator is operable to define triangles in each rectangular strip by:

defining a respective triangle in the strip for each triangle in a first triangle list so that the defined triangles in the strip are in the sequential order defined by the first list;

testing a further triangle list to determine whether triangles defined therefor will fit in the area remaining within the strip;

defining a respective triangle in the strip for each triangle in the further triangle list if it is determined that the triangles will fit within the remaining area, otherwise testing another triangle list to determine whether triangles defined therefor will fit into the area remaining within the strip; and repeating the processing to test triangle lists and define triangles in the strip until the strip is full or until all triangle lists have been tested, wherein the texture coordinate map generator is operable to test each further triangle list to determine whether triangles defined therefor will fit in the area remaining within the strip by:

determining whether the heights of the triangles in the list and the height of the strip satisfy a predetermined relationship;

splitting the strip into two sub-strips in the height direction if the predetermined relationship is not satisfied, otherwise maintaining the strip; and testing whether triangles defined for the triangles in the list will fit within the area of a predetermined one of the sub-strips or the maintained strip as the case may be, wherein the texture coordinate map generator is operable to split a strip into two sub-strips by splitting the strip to give the predetermined sub-strip a height determined in dependence upon the heights of the triangles in the list, wherein the texture coordinate map generator is operable to split a strip by splitting the strip to give the predetermined sub-strip a height equal to the average height of the triangles in the list.

40. Apparatus for processing data defining a three-dimensional mesh of planar triangles representing the surface shape of a three-dimensional object, to generate data defining a texture coordinate map comprising a two-dimensional area in which triangles corresponding to the triangles from the mesh are defined, the apparatus comprising:

a triangle list generator operable to test the triangles in the mesh to generate a plurality of triangle lists, each triangle list identifying a sequence of connected triangles in the mesh or identifying a single triangle in the mesh, with at least one of the triangle lists identifying a sequence of connected triangles; and a texture coordinate map generator operable to generate a texture coordinate map by defining a respective triangle in a two-dimensional area for each triangle in the mesh in accordance with the generated triangle lists, such that, for each respective list, the triangles in the list are defined in the two-dimensional area in accordance with the sequence defined by the list, wherein the texture coordinate map generator is operable to define triangles in the two-dimensional area to generate the texture coordinate map by defining the triangles within a plurality of rectangular strips, each strip having the same length so that the plurality of rectangular strips with the triangles defined therein define the texture coordinate map, wherein the texture coordinate map generator is operable to define triangles in each rectangular strip by:

defining a respective triangle in the strip for each triangle in a first triangle list so that the defined triangles in the strip are in the sequential order defined by the first list;

testing a further triangle list to determine whether triangles defined therefor will fit in the area remaining within the strip;

defining a respective triangle in the strip for each triangle in the further triangle list if it is determined that the triangles will fit within the remaining area, otherwise testing another triangle list to determine whether triangles defined therefor will fit into the area remaining within the strip; and repeating the processing to test triangle lists and define triangles in the strip until the strip is full or until all triangle lists have been tested, wherein the texture coordinate map generator is operable to test whether triangles defined for the triangles in a triangle list will fit within an area by defining and testing triangles for the list inverted and non-inverted.

* * * * *

UNITED STATES PATENT AND TRADEMARK OFFICE
CERTIFICATE OF CORRECTION

| | | |
|---|---|---|
| PATENT NO. | : 7,280,106 B2 | Page 1 of 1 |
| APPLICATION NO. | : 10/685606 | |
| DATED | : October 9, 2007 | |
| INVENTOR(S) | : Qi He Hong et al. | |

It is certified that error appears in the above-identified patent and that said Letters Patent is hereby corrected as shown below:

Drawings

SHEET 24:

FIG. 18, " 'N" should read --IN--.

Signed and Sealed this

Third Day of February, 2009

JOHN DOLL
*Acting Director of the United States Patent and Trademark Office*